(12) United States Patent
Samsudin et al.

(10) Patent No.: US 9,976,051 B2
(45) Date of Patent: May 22, 2018

(54) SELF HEALING POLYMER COMPOSITIONS

(71) Applicant: Petroliam Nasional Berhad (Petronas), Kuala Lumpur (MY)

(72) Inventors: M. Shamsul Farid Samsudin, Kuala Lumpur (MY); M. Azizol A. Wahab, Kuala Lumpur (MY); Kok Hoong Leong, Kuala Lumpur (MY); Zulkifli Ahamid, Kuala Lumpur (MY); Russell John Varley, Victoria (AU); Carmelo Dell'olio, Victoria (AU); Stuart Arthur Bateman, Victoria (AU); Qiang Yuan, Victoria (AU)

(73) Assignee: Petroliam Nasional Berhad (Petronas), Kuala Lumpur (MY)

( * ) Notice: Subject to any disclaimer, the term of this patent is extended or adjusted under 35 U.S.C. 154(b) by 0 days. days.

(21) Appl. No.: 14/417,137

(22) PCT Filed: Jul. 23, 2013

(86) PCT No.: PCT/MY2013/000133
§ 371 (c)(1),
(2) Date: Jan. 23, 2015

(87) PCT Pub. No.: WO2014/017899
PCT Pub. Date: Jan. 30, 2014

(65) Prior Publication Data
US 2015/0166822 A1  Jun. 18, 2015

(30) Foreign Application Priority Data
Jul. 24, 2012 (MY) ............................... 2012003340

(51) Int. Cl.
| C09D 151/00 | (2006.01) |
| C09D 123/08 | (2006.01) |
| C08L 23/08 | (2006.01) |
| C08L 51/06 | (2006.01) |

(52) U.S. Cl.
CPC ...... *C09D 151/003* (2013.01); *C08L 23/0869* (2013.01); *C08L 51/06* (2013.01); *C09D 123/0869* (2013.01)

(58) Field of Classification Search
None
See application file for complete search history.

(56) References Cited

U.S. PATENT DOCUMENTS

| 6,414,082 B1 | 7/2002 | Rajagopalan et al. |
| 2003/0032758 A1* | 2/2003 | Harris ................ A63B 37/0003 528/62 |
| 2013/0267636 A1* | 10/2013 | Satpathy ................ C08L 23/12 524/126 |

FOREIGN PATENT DOCUMENTS

| JP | H02299840 A | 12/1990 |
| KR | 20090034632 A | 4/2009 |
| KR | 100981391 B1 | 9/2010 |

OTHER PUBLICATIONS

Nakamura, STN AN:1991:104001, abstracting JP 0229984, Dec. 1990.*
Ho et al., partial electronic translation of KR 100981391, Sep. 2010.*
International Search Report and Written Opinion dated Nov. 18, 2013 for International Application No. PCT/MY2013/000133 filed Jul. 23, 2013.

* cited by examiner

*Primary Examiner* — Jeffrey C Mullis
(74) *Attorney, Agent, or Firm* — Snell & Wilmer L.L.P.

(57) ABSTRACT

There is provided a polymer composition comprising a first polymer phase and a second polymer phase, wherein: a) the first polymer phase comprises a thermoplastic polymer matrix modified with an adhesive functional group or a group which is a precursor of an adhesive functional group; and b) the second polymer phase comprises a thermoplastic polymer capable of acting as a self-healing agent and being chemically reactive on healing of the polymer composition.

19 Claims, 31 Drawing Sheets a)   b)

1. Three layer coating with healing agent.
   1. In primer
   2. In adhesive
   3. Between both

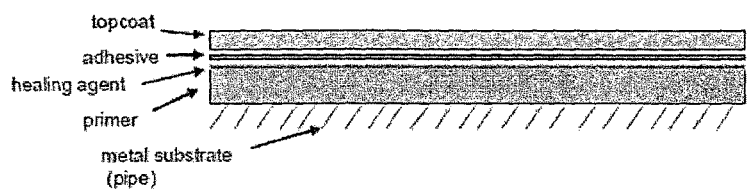

topcoat
adhesive
healing agent
primer
metal substrate (pipe)

2. Failure between primer topcoat interface

3. Thermally activated healing thermal healing

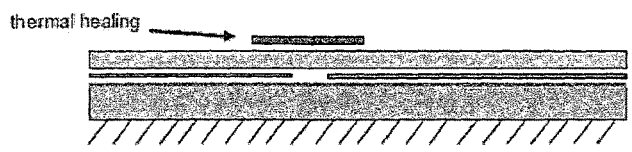

4. polyethylene-co methacrylic acid healing agent
   1. pushed into cavity via pressure delivery mechanism
   2. Adhesive interaction between primer AND topcoat layers

Fig. 28
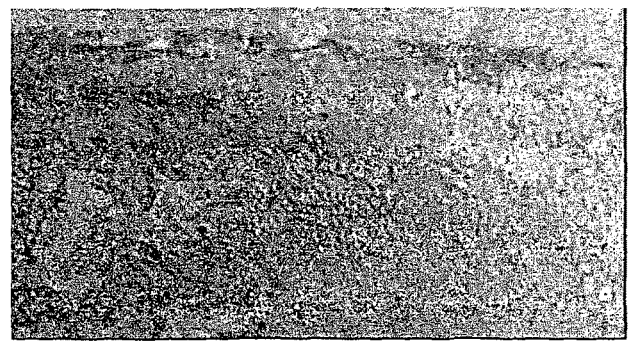
a) 10wt% citric acid.
b) 10wt% pimelic.
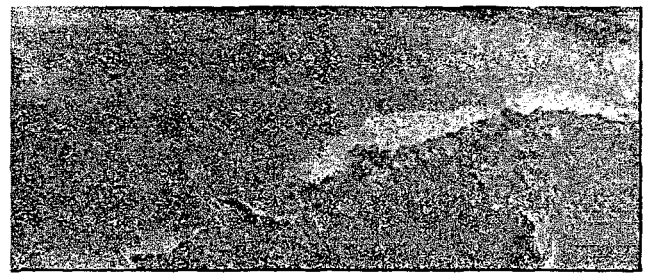
c) un-modified.

Fig. 30
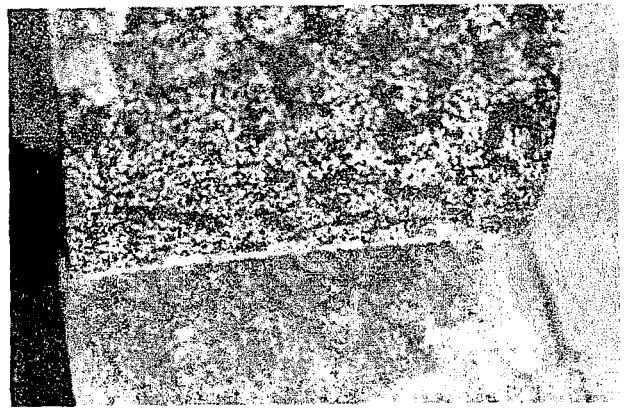
a) Unmodified adaptive adhesive
b) 2% modified citric acid
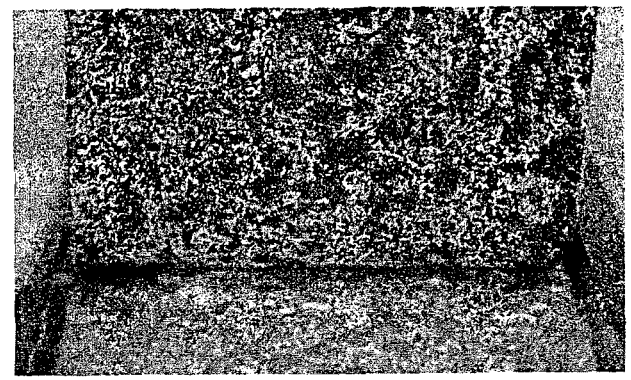
c) 2% modified pimelic acid.

Fig. 34
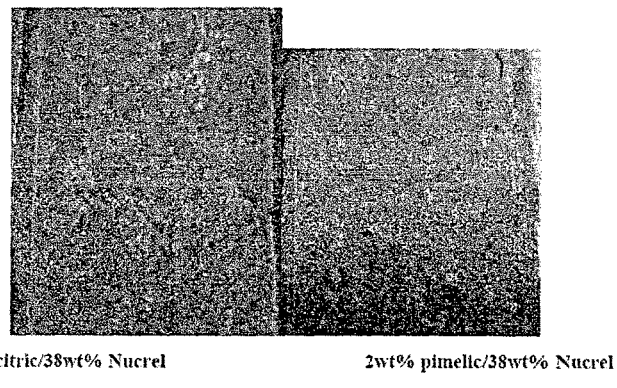
2wt% citric/38wt% Nucrel        2wt% pimelic/38wt% Nucrel
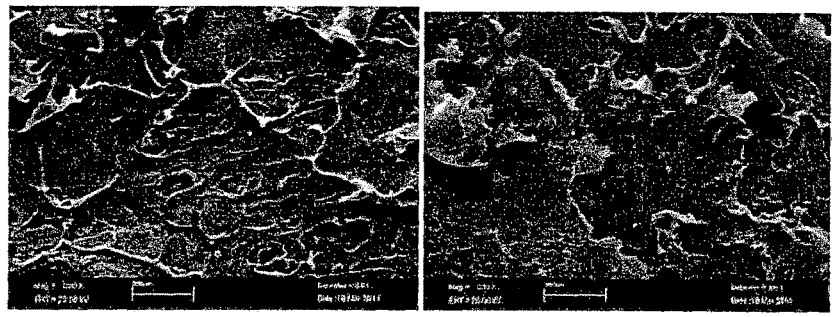
2wt% citric/38wt% Nucrel        2wt% pimelic/38wt% Nucrel
Fig. 35
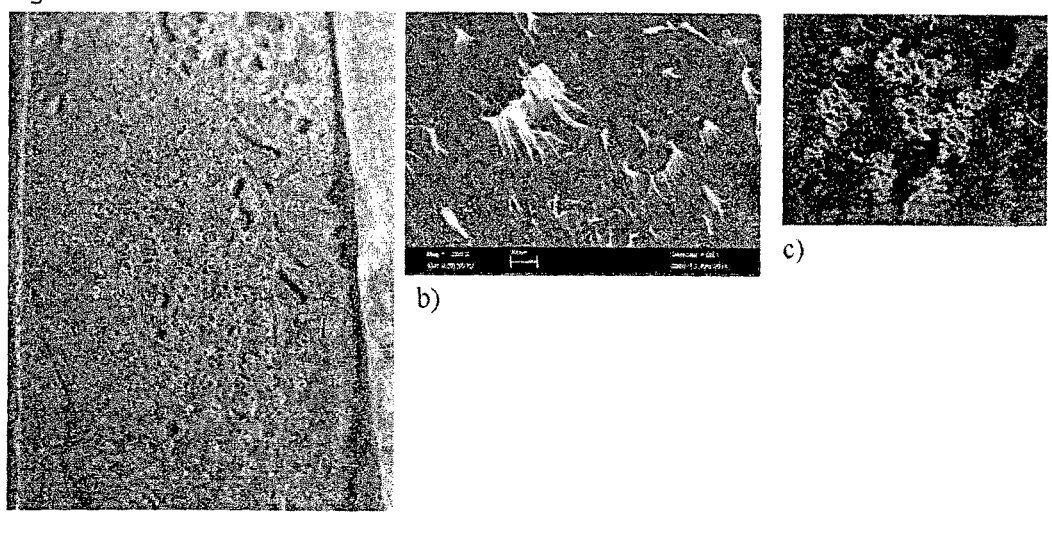
a)    b)    c)

a) b) c)

Fig. 37
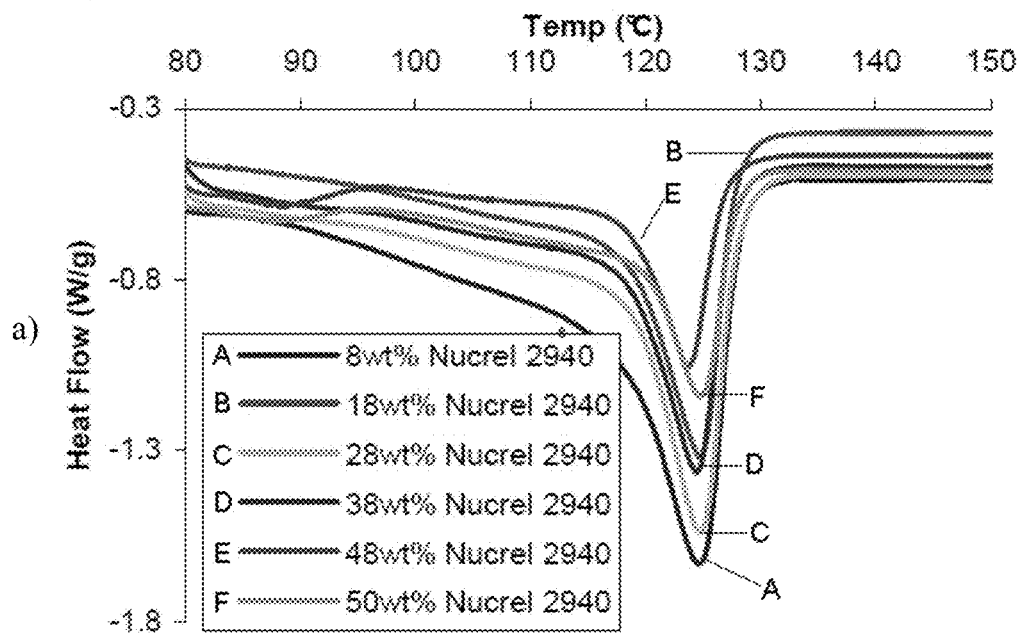
Pimelic acid
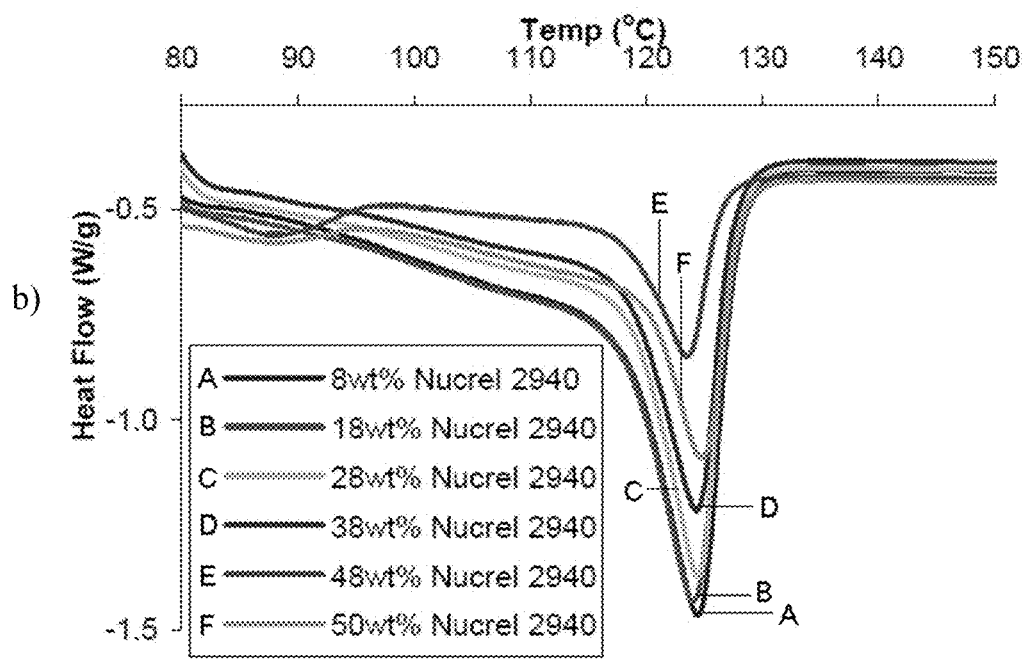
Citric acid

SELF HEALING POLYMER COMPOSITIONS

CROSS-REFERENCE TO RELATED APPLICATIONS

The present application is a U.S. National Stage entry under 35 U.S.C. § 371 of International Application No. PCT/MY2013/000133, filed on Jul. 23, 2013, which claims priority to Malaysian Patent Application No. PI 2012003340, filed on Jul. 24, 2012.

TECHNICAL FIELD

The present invention generally relates to a polymer composition that can be used as an adhesive and that has self-healing properties. The present invention also relates to a method of preparing the polymer composition.

BACKGROUND

During the 35 to 50 years' service life of structures such as steel pipelines and fittings for transportation of oil and gas products, they are exposed to variations in operational conditions ranging from those of ordinary onshore applications to those of more severe offshore underwater applications. To protect the structures against corrosion from exposure to such operational conditions, the structures are typically coated with multilayer coatings. The multilayer coatings must be durable in that they must maintain adhesion, resist moisture- and gas ingress, maintain mechanical performance, and must meet increasingly stringent environmental and safety regulations.

Typically, the multilayer coatings are polyolefin-based, and comprise a primer layer, an intermediary adhesive layer and a topcoat layer. The primer layer, typically epoxy-based, provides protection to the inner metallic structure against chemical and oxidative corrosion, and enhances adhesion between the coating and the metallic structure. The adhesive layer, typically polyolefin-based, promotes compatibility between the primer layer and the topcoat layer so that strong interfacial mechanical bonds are formed at the interface when brought together in the molten state. The topcoat layer provides protection against mechanical damage arising from the handling, transportation and laying of the structure in service.

Over time, the primer layer absorbs moisture, which predisposes it to damage during handling. In particular, epoxy-based primer layers, due to their highly crosslinked structure, are inherently brittle and susceptible to microcrack formation deep within its structure where detection and intervention are often difficult or impossible. Therefore, throughout the service life of multilayer coatings, fractures within the primer layer may occur, which compromises the structural integrity of the coating.

The development of "mendable" epoxy resins has been proposed in recent years to restore adhesive strength to a fractured component. Such "mendable" epoxy resins may be dispersed with brittle vessels containing liquid healing agent(s) which rupture upon propagation of the fracture to release the healing agent(s), which in turn fills up and rejoins the fractured surfaces. Applications of such "mendable" epoxy resins in multilayer coatings have been limited by high raw material cost, lack of long-term stability of the healing agent(s), additional steps required to encapsulate the healing agent(s) into delivery vessels, and lack of ability to heal multiple incidents of damage.

In multilayer coatings, adhesive or cohesive failure between the primer and the topcoat layers can also create a cavity between, or that traverses the layers which have differing properties. The primer layer (typically epoxy-based) has an amorphous cross-linked network and is relatively polar, while the topcoat layer (typically polyolefin-based) has a semi-crystalline structure and is relatively non-polar. Due to the differing properties of the different layers in a multilayer coating, simply heating the surrounding topcoat to melt the materials does not ensure that the interlayer cavity is refilled and the fractured surfaces rejoined and healed. When heated beyond the melting point of the polymers, the lack of any hierarchical structure may result in the amorphous polymer simply melting and flowing away without any direction instead of refilling the cavity to rejoin the fractured surfaces and healing the multilayer coating.

There is a need to provide a polymer composition that overcomes, or at least ameliorates, one or more of the disadvantages described above.

There is a need to provide a polymer composition for use in multilayer coatings that is able to self-heal fractures that form within a layer, and/or fractures that form between and/or that traverses the different layers in the coating that may have differing properties in order to restore structural integrity to the coating, without compromising its impact strength, adhesive performance, temperature performance and durability.

There is further a need to provide a method for preparing a polymer composition that is able to self-heal for use in multilayer coatings, that is cost-effective and meet environmental and health regulations, and that maximizes modification of the composition without causing degradation of the polymer.

SUMMARY

According to a first aspect, there is provided a polymer composition comprising a first polymer phase and a second polymer phase, wherein:
  a) the first polymer phase comprises a thermoplastic polymer matrix modified with an adhesive functional group or a group which is a precursor of an adhesive functional group; and
  b) the second polymer phase comprises a thermoplastic polymer capable of acting as a self-healing agent and being chemically reactive on healing of the polymer composition.

Advantageously, the disclosed polymer composition is capable of self-healing fractured surfaces of differing materials and properties in a multilayer coating, for example, self-healing a fracture spanning across a primer layer which is typically polar and a topcoat layer which is typically non-polar. Advantageously, the healing of such fractured surfaces restores adhesive strength to the multilayer coating comprising layers of different materials.

In one embodiment, the ratio of the thermoplastic polymer of the second polymer phase to the thermoplastic polymer matrix of the first polymer phase is in the range of 4:1 to 1:4. In another embodiment, the ratio of the thermoplastic polymer of the second polymer phase to the thermoplastic polymer matrix of the first polymer phase is 1:1. Advantageously, these ratios provide the disclosed polymer composition with self-healing capability without compromising its adhesive performance.

In one embodiment, the thermoplastic polymer matrix of the first polymer phase comprises a non-polar polymer.

Advantageously, the use of a non-polar polymer enhances compatibility, and therefore adhesion, of the first polymer phase with a non-polar polymer material with which the disclosed polymer composition is in contact, such as a topcoat layer of a multilayer coating.

In one embodiment, the adhesive functional group or the group which is a precursor of an adhesive functional group comprises a polar functional group. Advantageously, the use of a polar functional group enhances compatibility, and therefore adhesion, of the first polymer phase with a polar polymer material with which the disclosed polymer composition is in contact, such as a primer layer of a multilayer coating.

In one embodiment, the adhesive functional group or the group which is a precursor of an adhesive functional group is chemically linked to the thermoplastic polymer matrix of the first polymer phase. Advantageously, chemically linking the adhesive functional group or the group which is a precursor of an adhesive functional group to the thermoplastic polymer matrix of the first polymer phase confers adhesive capability to the disclosed polymer composition.

In one embodiment, the thermoplastic polymer matrix of the first polymer phase further comprises a free radical initiator. Advantageously, the free radical initiator facilitates and enhances the modification of the thermoplastic polymer of the first polymer phase with the adhesive functional group or the group which is a precursor of an adhesive functional group.

In one embodiment, the thermoplastic polymer matrix of the first polymer phase further comprises a co-agent. Advantageously, addition of a co-agent reduces chain scission, and therefore degradation, that may occur in some thermoplastic polymer materials used to form the matrix of the first polymer phase, for example polypropylene, and thereby enhances modification of the thermoplastic polymer material of the first polymer phase with the adhesive functional group or the group which is a precursor of an adhesive functional group.

In one embodiment, the thermoplastic polymer matrix of the first polymer phase further comprises a partially neutralized polymer. Advantageously, neutralization converts the hydrogen bonding in a polymer to ionic bonding, thereby strengthening the polymer. Hence, addition of a partially neutralized polymer enhances the adhesive property of the first polymer phase.

In one embodiment, the thermoplastic polymer of the second polymer phase is polyethylene-co-methacrylic acid (EMAA). Advantageously, polyethylene-co-methacrylic acid is a cost-effective polymer for use as a self-healing agent in the disclosed polymer composition.

In one embodiment, the thermoplastic polymer of the second polymer phase is provided in the first polymer phase as a dispersion of discrete portions. Advantageously, dispersion of the thermoplastic polymer of the second polymer phase as discrete portions in the first polymer phase produces a biphasic structure containing reservoirs of thermoplastic polymer of the second polymer phase, which enables the thermoplastic polymer of the second polymer phase to retain its particle matrix adhesion properties and ability to flow into a cavity in a fractured surface upon application of a stimulus to thereby heal the fracture and restore adhesive properties to a multilayer coating to which the disclosed polymer composition is applied. Advantageously, such phase separation of the thermoplastic polymer of the second polymer phase from the thermoplastic polymer matrix of the first polymer phase, and the interfacial interaction between the two polymer phases, enable the thermoplastic polymer of the second polymer phase to function as a latent "reservoir" of self-healing agent that is capable of healing a fracture upon application of a stimulus.

In one embodiment, the thermoplastic polymer of the second polymer phase is provided in the first polymer phase as a dispersion of discrete portions having diameters of at least 5 μm. Advantageously, particles having these dimensions ensure that a sufficient amount of the thermoplastic polymer of the second polymer phase is present to effectively heal a fractured surface.

In one embodiment, the thermoplastic polymer of the second polymer phase is not encapsulated in an encapsulating agent. Not being encapsulated enables the thermoplastic polymer of the second polymer phase to act as self-healing agent repeatedly upon application of a stimulus and without reducing the degree of self-healing that is achieved with each application of the stimulus. In contrast, an encapsulated polymer is only capable of self-healing once due to the non-reversibility of the chemical reaction the encapsulated polymer undergoes. In addition, the non-encapsulated thermoplastic polymer of the second polymer phase is capable of being stable until application of the stimulus to initiate the self-healing process. Non-encapsulation of the thermoplastic polymer of the second polymer phase also saves costs (since encapsulating agents are expensive) and simplifies the process for preparing the disclosed polymer composition in that there is no need for additional processing steps to encapsulate the thermoplastic polymer of the second polymer phase.

In one embodiment, the disclosed polymer composition further comprises one or more additives selected from the group consisting of pimelic acid, citric acid, and mixtures thereof. Advantageously, the additives increase the concentration of carboxylic acid functional groups on the thermoplastic polymer matrix of the first polymer phase and enhance its interaction with an epoxy primer layer with which it is in contact to thereby promote healing.

According to a second aspect, there is provided a coating comprising the polymer composition according to the first aspect.

According to a third aspect, there is provided a pipeline comprising the polymer composition according to the first aspect or the coating according to the second aspect.

According to a fourth aspect, there is provided a fibre reinforced composite comprising a fibrous reinforcement component and the polymer composition according to the first aspect or the coating according to the second aspect.

According to a fifth aspect, there is provided method for preparing the polymer composition according to the first aspect, comprising the steps of:
a) modifying a thermoplastic polymer with an adhesive functional group or a group which is a precursor of an adhesive functional group to form the thermoplastic polymer matrix of the first polymer phase; and
b) adding to the first polymer phase, a thermoplastic polymer capable of acting as a self-healing agent and being chemically reactive on healing of the disclosed polymer composition to form the second polymer phase.

In one embodiment, the modification of the thermoplastic polymer in step (a) is conducted at a temperature of at least 140° C. In one embodiment, the modification of the thermoplastic polymer in step (a) comprises mixing the thermoplastic polymer with the adhesive functional group or the group which is a precursor of an adhesive functional group at a speed of at least 160 rpm. In one embodiment, prior to step (a), the thermoplastic polymer is mixed with the adhesive functional group or the group which is a precursor of an adhesive functional group. Advantageously, conducting modification of the thermoplastic polymer under these temperature and mixing conditions enable the modification to proceed under solvent-free conditions. Although modification in a solvent-free condition, which is substantially a solid phase condition, is inherently more difficult to conduct than modification in the presence of a solvent, advantageously, the method of the fifth aspect is able to achieve a level of modification that is higher or at least comparable to the level achieved in the presence of a solvent. Non-usage of solvent simplifies the preparative process, thereby facilitating scale-up for industrial application, and avoids health and safety issues that may arise from the use of solvents.

According to a sixth aspect, there is provided a method of self-healing cracks that form in a coating according to the second aspect, comprising the step of applying a stimulus to the coating to cause the thermoplastic polymer of the second polymer phase to at least partially fill said crack, and removing the stimulus to allow the thermoplastic polymer of the second polymer phase to bond the edges of the crack together.

In one embodiment, the stimulus is heat that is applied at a temperature of at least 90° C. The heat applied causes the thermoplastic polymer in the second polymer phase to expand and forms a bubble which pushes the thermoplastic polymer in the second polymer phase into a crack and rejoins the edges of the crack to thereby heal the crack. In one embodiment, the temperature of the heat applied is about 120° C. Advantageously, heat applied at higher temperatures improves the level of self-healing such that up to 100% healing and restoration of adhesive performance of the polymer composition can be achieved.

DEFINITIONS

The following words and terms used herein shall have the meaning indicated:

The terms "healing," "self-healing" and grammatical variants thereof, relate to the application of a stimulus, such as elevated temperatures and/or pressures, to rejoin surfaces of a fracture that has formed within a polymer layer, and/or surfaces of a fracture that has formed between and/or that traverses different polymer layers.

The term "polymer" may include copolymers, prepolymers or monomers capable of forming the polymer.

The term "curing" relates to the formation of a polymer matrix, for example by polymerization processes such as thermal polymerization, photopolymerization, chemical polymerization, and the like.

The term "functionalized" when used in relation to a polymer, such as polyolefin, refers to polyolefin (e.g. polyethylene and polypropylene) having functional groups as described herein. Polyolefin copolymers, such as polyethylene and/or polypropylene copolymers, may also have functional groups as described herein.

The term "modified with an adhesive functional group" in reference to a polymer, refers to functional groups that are incorporated in the modified polymer that confers increased adhesive properties to the modified polymer relative to that polymer not being modified and being absent the adhesive functional group. Typically the modified polymer with the adhesive functional group enables the polymer to form a bond with a substrate to which the polymer is adjacent. For example, the substrate may be another polymer such as a primer layer or a topcoat layer in a multilayer coating, or the substrate may be a structure, such as a steel structure.

The term "partially neutralized" refers to a polymer that has at least one acid functional group neutralized and less than 100% of such acid functional groups neutralized. For example, the polymer may be neutralized from about 10% to about 90%, from about 20% to about 80%, from about 30% to about 70%, or from about 40% to about 60%.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DISCLOSURE OF OPTIONAL EMBODIMENTS

Exemplary, non-limiting embodiments of a polymer composition according to the first aspect will now be disclosed.

The disclosed polymer composition comprises a first polymer phase and a second polymer phase.

First Polymer Phase

The first polymer phase of the disclosed polymer composition comprises a thermoplastic polymer matrix modified with an adhesive functional group or a group which is a precursor of an adhesive functional group. Advantageously, the modification of the thermoplastic polymer that forms the thermoplastic polymer matrix imparts adhesive properties to the disclosed polymer composition, and is envisaged to contribute to the microstructural morphology that supports the second polymer phase such that self-healing can occur.

Exemplary thermoplastic polymers that may be used to form the thermoplastic polymer matrix of the first polymer phase include olefins, vinyls, styrenes, acrylonitriles, acrylics, polycarbonates, polyalloys, cellulosics, polyamides, thermoplastic polyesters and copolyesters, sulfones, imide polymers, ether-oxide polymers, ketone polymers, fluoropolymers, and heterochain polymers, and mixtures thereof.

In one embodiment, the thermoplastic polymer is an olefin. In one embodiment, the olefin is a polyolefin. Polyolefins are saturated hydrocarbon polymers based on a simple olefin (or alkene) as monomer, or mixtures thereof. For example, polyethylene (PE) is the polyolefin produced by polymerizing the olefin ethylene. Other exemplary polyolefins include polypropylene (PP), polymethylpentene (PMP), and polybutene-1 (PB-I). Exemplary polyolefin copolymers include poly(ethylene-co-butylene) (PEB), ethylene propylene rubber (EPR), and polyisobutylene (PIB).

The thermoplastic polymer matrix of the first polymer phase may comprise a single type of thermoplastic polymer. In one embodiment, the thermoplastic polymer matrix of the first polymer phase comprises polyethylene as the thermoplastic polymer. In another embodiment, the thermoplastic polymer matrix comprises polypropylene as the thermoplastic polymer. In yet another embodiment, the thermoplastic polymer matrix comprises poly(ethylene-co-butylene) as the thermoplastic polymer.

Alternatively, the thermoplastic polymer matrix of the first polymer phase may comprise at least two different types of thermoplastic polymers, for example two, three, four, five, six, seven, eight, or more different types of thermoplastic polymers. In one embodiment, the thermoplastic polymer matrix comprises a mixture of polyethylene and polypropylene. In another embodiment, the thermoplastic polymer matrix comprises a mixture of polyethylene, polypropylene and at least one other polyolefin. For example, the thermoplastic polymer matrix may comprise a mixture of polyethylene, polypropylene and polymethylpentene, or a mixture of polyethylene, polypropylene and poly(ethylene-co-butylene).

In one embodiment, the polyolefin is polyethylene. The polyethylene may range from low density to high density, or from low molecular weight to high molecular weight, and may be used in applications where the operating temperatures range from 45° C. to 90° C., such as those typically encountered in on-shore applications. Exemplary polythylenes include ultra high molecular weight polyethylene (UHMWPE), ultra low molecular weight polyethylene (ULMWPE or PE-WAX), high molecular weight polyethylene (HMWPE), high density polyethylene (HDPE), high density cross-linked polyethylene (HDXLPE), cross-linked polyethylene (PEX or XLPE), medium density polyethylene (MDPE), low density polyethylene (LDPE), linear low density polyethylene (LLDPE), and very low density polyethylene (VLDPE). Commercial grades of medium- and high-density polyethylene typically have melting points that range from about 120° C. to about 130° C., while commercial grades of low-density polyethylene typically has melting points that range from about 105° C. to about 115° C.

In another embodiment, the polyolefin is polypropylene. Polypropylene may be used in applications where the operating temperatures are higher, for example from about 110° C. to about 140° C. such as those typically encountered in off-shore applications. Commercial grade polypropylene typically has melting points of about 160° C.

Thermoplastic polymers are typically non-polar due to their saturated hydrocarbon backbone. As a result of their non-polar nature, thermoplastic polymers that are used in, for example adhesive formulations, are typically compatible with polymers that are typically present in topcoat formulations used in multilayer coatings. Being compatible with the polymers in the topcoat formulation also ensures improved adhesion between the adhesive and topcoat layers of the multilayer coating.

In one embodiment, the disclosed polymer composition is an adhesive formulation and forms the adhesive layer of a multilayer coating.

To improve compatibility, and therefore adhesion, between the adhesive layer and the primer layer of a multilayer coating, which typically comprises polar polymers, the thermoplastic polymer may be modified with one or more adhesive functional group, or one or more group which is a precursor of an adhesive functional group. In one embodiment, such adhesive functional groups or such groups which are a precursor of an adhesive functional group comprise a polar functional group. Such polar functional groups increase polarity of the thermoplastic polymer and make it more compatible with the primer layer of the multilayer coating.

The modification of the thermoplastic polymer may be achieved by non-reactive modification or by reactive modification. Non-reactive modification may involve compatibilization blending, for example where graft or block polymers, sometimes referred to as "compatibilizing agents", are added to blends of otherwise immiscible polymers to stabilize the phase morphology of the mixtures and achieve compatibilization.

Reactive modification, on the other hand, involves grafting, or chemically linking, the adhesive functional group or the group which is a precursor of an adhesive functional group to the thermoplastic polymer. In reactive modification, compatibilization is achieved by the chemical reaction initiated during the melt-mixing process.

In one embodiment, the thermoplastic polymer of the thermoplastic polymer matrix has functional groups attached to and/or incorporated into the backbone of the polymer. The functional groups may be in the form of pendant groups attached to the backbone of the polymer, form part of the backbone of the polymer, or be a combination of forms thereof.

In one embodiment, the functional groups are selected to facilitate formation of a microstructural morphology that supports the second polymer phase such that self-healing can occur.

In another embodiment, the functional groups are selected to promote interfacial bonding between the thermoplastic polymer matrix of the first polymer phase and the thermoplastic polymer of the second polymer phase on healing of the disclosed polymer composition. The interfacial bonding may involve non-covalent bonding such as hydrogen bonding, ionic bonding, Van der Waals bonding, and/or hydrophobic interactions.

Exemplary adhesive functional groups or precursors thereof include maleic anhydride (MAH), maleic acid, glycidyl methacrylate (GMA), glycidic acid, oxazoline, vinyl silane (such as vinyl triethylsilane, and 3-trimethoxysilyl propyl methacrylate), acrylic acid (AA), methacrylic acid (MAA), itaconic acid (IA), nadic anhydride, nadic acid, methyl nadic anhydride, methyl nadic acid and fumaric acid, and mixtures thereof.

In one embodiment, the adhesive functional group is maleic anhydride (MAH). Advantageously, this monomer is capable of being repeatedly post-processed because new reactive groups are created upon healing, which can be further reacted to heal the disclosed polymer composition and/or the multilayer coating to which the disclosed polymer composition is applied, in further incidences of fracture without compromising the adhesive performance of the disclosed polymer composition or the adhesion between the primer and topcoat layers of the multilayer coating. Advantageously, MAH can be grafted onto any polyolefin, such as polyethylene and polypropylene.

In one embodiment, maleic anhydride and/or maleic acid is grafted onto polyethylene to produce a graft copolymer of polyethylene and a monomer selected from the group consisting of maleic anhydride, maleic acid, and mixtures thereof.

In one embodiment, maleic anhydride and/or maleic acid is grafted onto polypropylene to produce a graft copolymer of polypropylene and a monomer selected from the group consisting of maleic anhydride, maleic acid, and mixtures thereof.

In one embodiment, the first polymer phase comprises at least 0.5 wt % of MAH. For example, the first polymer phase may comprise at least 0.5 wt %, at least 0.6 wt %, at least 0.7 wt %, at least 0.8 wt %, at least 0.9 wt %, at least 1.0 wt %, at least 1.5 wt %, at least 2.0 wt %, about 0.5 wt % to about 3.0 wt %, about 0.5 wt % to about 2.5 wt %, about 0.5 wt % to about 2.0 wt %, about 0.5 wt % to about 1.5 wt %, about 0.5 wt % to about 1.0 wt %, about 0.6 wt %, about 0.7 wt %, about 0.8 wt %, about 0.9 wt %, or about 1.0 wt %, of MAH.

In one embodiment, the ratio of the thermoplastic polymer matrix to the adhesive functional group or a group which is a precursor of an adhesive functional group is in the range of about 50:1 to about 120:1. For example, the ratio may be in the range of about 50:1 to about 110:1, about 50:1 to about 100:1, about 50:1 to about 90:1, about 50:1 to about 80:1, about 50:1 to about 70:1, about 50:1 to about 60:1, about 60:1 to about 120:1, about 70:1 to about 120:1, about 80:1 to about 120:1, about 90:1 to about 120:1, about 100:1 to about 120:1, about 110:1 to about 120:1, about 60:1 to about 110:1, about 70:1 to about 100:1, or about 80:1 to about 90:1.

Advantageously, an increase in the amount of thermoplastic polymer grafted with MAH can result in an increase in the adhesion of the thermoplastic polymer to the primer layer of a multilayer coating. Grafting of at least 35%, at least 36%, at least 37%, at least 38%, at least 39%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, or 100% of the thermoplastic polymer may be achieved.

The thermoplastic polymer matrix of the first polymer phase may further comprise a free radical initiator. Exemplary free radical initiators include 1,1-di(tert-butylperoxy)-3,3,5-trimethylcyclohexane (BBTCH), 1,1-di(tert-butylperoxy)cyclohexane (BBCH), dicumyl peroxide (DCP), α,α'-di(tert-butylperoxy)diisopropylbenzene (DIPB), di-tert-butyl peroxide (DBP), 2,5-di(tert-butylperoxy)-2,5-dimethylhexane (DTBH), di(tert-butylperoxy)-2,5-dimethylhexyne (DTBHY), tert-butyl-hydroperoxide (TBHP), cumyl hydroperoxide (CHP), tert-butyl peroxy benzoate (TBPB), 2-phenylazo-2,4-dimethyl-4-methoxypentanenitrile, dibenzoyl peroxide, lauroyl peroxide, and mixtures thereof. The free radical initiator may be added at concentrations of about 0.03 wt %, about 0.04 wt %, about 0.05 wt %, about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.5 wt %, about 2.0 wt %, about 2.5 wt %, about 3.0 wt %, about 3.5 wt %, about 4.0 wt %, about 0.1 wt % to about 4.0 wt %, about 0.1 wt % to about 3.0 wt %, about 0.1 wt % to about 2.0 wt %, about 0.1 wt % to about 1.0 wt %, about 0.5 wt % to about 4.0 wt %, about 1.0 wt % to about 4.0 wt %, about 1.5 wt % to about 4.0 wt %, about 2.0 wt % to about 4.0 wt %, about 2.5 wt % to about 4.0 wt %, about 3.0 wt % to about 4.0 wt %, about 3.5 wt % to about 4.0 wt %, about 0.5 wt % to about 3.0 wt %, about 0.5 wt % to about 2.5 wt %, or about 0.5 wt % to about 1.5 wt %, of the first polymer phase.

The thermoplastic polymer matrix of the first polymer phase may also further comprise a co-agent to reduce chain scission that may occur in some thermoplastic polymers, such as polypropylene. By reducing chain scission, grafting of the thermoplastic polymer with the adhesive functional group or a precursor thereof may be enhanced. Exemplary co-agents include stearamide, styrene, methacrylamide and caprolactam. In one embodiment, the co-agent is stearamide. Advantageously, stearamide is non-toxic.

Other components that may be included in the first polymer phase are copolymer modifiers or adhesion promoters such as ethylene vinyl acetate (EVA) or ethylene vinyl alcohol (EVOH).

In one embodiment, the thermoplastic polymer matrix of the first polymer phase further comprises a partially neutralized polymer. The polymer may be partially neutralized with cations such as, but not limited to, sodium, calcium, or zinc. Exemplary partially neutralized polymers include partially neutralized ethylene/methacrylic acid (EMAA) copolymer such as the Surlyn 9970 or Nucrel 2940 range of partially neutralized polymer.

The thermoplastic polymer of the first polymer phase may form a matrix which supports the second polymer phase.

Second Polymer Phase

The second polymer phase of the disclosed polymer composition comprises a thermoplastic polymer capable of acting as a self-healing agent and being chemically reactive on healing of the polymer composition. The thermoplastic polymer of the second polymer phase may therefore be referred to herein as a "self-healing" thermoplastic polymer.

For a thermoplastic polymer to act as a self-healing agent under healing conditions, for example upon application of a stimulus, the thermoplastic polymer needs to be able to flow or move into an interstitial gap that may be present in a fractured material, such as a coating (e.g. a multilayer coating), and optionally undergo some form of bonding with the material. The bonding may be covalent bonding that occurs, for example, between an epoxy-based primer layer of a multilayer coating and the self-healing thermoplastic polymer, which may result in a volatile phase that expands upon application of a stimulus, such as heat and/or pressure, to drive the self-healing thermoplastic polymer into a damaged zone to rejoin two fractured surfaces in need of healing. Alternatively or additionally, the bonding may be non-covalent bonding such as hydrogen bonding or Van der Waals interaction between the self-healing thermoplastic polymer and the thermoplastic polymer matrix of the first polymer phase, and/or the polymer of additional polymer phases that may be present, for example a third and/or fourth polymer phase of a multilayer coating. Such bond formation may be restricted or prevented until after the healing conditions have been applied. The self-healing thermoplastic polymer may therefore be selected to be capable of flowing or moving into an interstitial gap that may be present in the disclosed polymer composition or a material to which the disclosed polymer composition is applied when a stimulus, such as an external temperature and/or pressure, is applied to the disclosed polymer composition that is sufficient to enable flow or movement of the self-healing thermoplastic polymer. The self-healing thermoplastic polymer may therefore also be selected to have a melt temperature to promote, on healing, the flow or movement of the self-healing thermoplastic polymer into an interstitial gap that may be present in the disclosed polymer composition or a material to which the disclosed polymer composition is applied. In one embodiment, the self-healing thermoplastic polymer is capable of undergoing healing at a temperature that does not decompose the thermoplastic polymer matrix of the first polymer phase. In one embodiment, the self-healing thermoplastic polymer is capable of undergoing healing at a temperature that does not decompose the polymer of additional polymer phases that may be present, for example a third and/or fourth polymer phase of a multilayer coating. For example, the self-healing thermoplastic polymer is capable of undergoing healing at a temperature that does not decompose the topcoat layer that may be present in a multilayer coating.

The self-healing thermoplastic polymer may be selected such that its physical properties match the desired characteristic of the repair.

The self-healing thermoplastic polymer may also be selected to achieve the desired bonding and chemical reactivity that enable bubble formation, which increases the pressure to enhance flow or movement of the self-healing thermoplastic polymer. For example, the functionality on the self-healing thermoplastic polymer, the thermoplastic polymer matrix of the first polymer phase and/or the polymer of additional polymer phases that may be present, for example a third and/or fourth polymer phase of a multilayer coating, may be matched. The self-healing thermoplastic polymer may be chemically reactive with itself, the thermoplastic polymer matrix of the first polymer phase and/or the polymer of additional polymer phases that may be present, for example a third and/or fourth polymer phase of a multilayer coating, under elevated temperatures applied to the disclosed polymer composition during the healing process. The chemical reaction may result in the formation of a covalent bond between the self-healing thermoplastic polymer and itself, or another component such as the thermoplastic polymer matrix of the first polymer phase and/or the polymer of additional polymer phases that may be present, for example a third and/or fourth polymer phase of a multilayer coating. For example, the self-healing thermoplastic polymer may be chemically reactive with an epoxy-based primer layer of a multilayer coating to which the disclosed composition is applied to result in formation of a covalent bond between the self-healing thermoplastic polymer and the epoxy-based primer layer of the multilayer coating.

In an embodiment where the self-healing thermoplastic polymer EMAA is dispersed in a graft copolymer of polyethylene and a monomer selected from the group consisting of maleic anhydride, maleic acid, and mixtures thereof, the ratio of EMAA to the graft copolymer is 1:1. In another embodiment, where the self-healing thermoplastic polymer EMAA is dispersed in a graft copolymer of polypropylene and a monomer selected from the group consisting of maleic anhydride, maleic acid, and mixtures thereof, the ratio of EMAA to the graft copolymer is 1:1.

The self-healing thermoplastic polymer may be selected to have a low viscosity during healing. The self-healing thermoplastic polymer may also be selected such that, on healing, pressure can be created by expansion of the self-healing thermoplastic polymer to facilitate flow or movement of the self-healing thermoplastic polymer to the fractured or cracked region during the healing process.

The self-healing thermoplastic polymer may be selected to be capable of being chemically reactive on healing so as to provide a pressure-driven delivery mechanism of the self-healing thermoplastic polymer into a region in need of healing. Such a pressure-driven delivery mechanism may be achieved by providing volatile by-products that expand under the healing conditions and force at least a portion of the self-healing thermoplastic polymer into interstitial gaps that may be present in the disclosed polymer composition or in a material to which the disclosed polymer composition is applied, such as a multilayer coating. Functional groups may be selected to facilitate chemical reaction of the self-healing thermoplastic polymer to produce a volatile by-product capable of forming a gas bubble or gas pocket in the self-healing thermoplastic polymer. The formation of the gas bubble or gas pocket may act to increase expansive pressure and enable flow or movement of the self-healing thermoplastic polymer into an interstitial gap that may be present in the disclosed polymer composition or in a material which the disclosed polymer composition is applied to or in contact with, such as a multilayer coating. In this way, the functional groups between the self-healing thermoplastic polymer and the thermoplastic polymer matrix of the first polymer phase and/or the polymer of additional polymer phases that may be present, for example a third and/or fourth polymer phase of a multilayer coating, can be matched to facilitate the desired bonding and/or chemical reaction. For example, the functional groups between the self-healing thermoplastic polymer and the epoxy-based primer layer of a multilayer coating which the disclosed composition is applied to or in contact with may be matched to facilitate covalent bonding between the self-healing thermoplastic polymer and the epoxy-based primer layer of the multilayer coating.

The self-healing thermoplastic polymer may also be selected to be capable of healing a fracture that is within the thermoplastic polymer matrix of the first polymer phase, and/or a fracture that traverses the first polymer phase and additional polymer phases that may be present, for example a third and/or fourth polymer phase of a multilayer coating, when an external stimulus such as temperature and/or pressure is applied to the disclosed polymer composition that is sufficient to enable flow or movement of the self-healing thermoplastic polymer at or near an interface with the first polymer phase and/or additional polymer phases that may be present, for example, a third and/or fourth polymer phase of a multilayer coating, that is contiguous with an area of the material that is in need of healing. The self-healing thermoplastic polymer may then move into the interstitial gap, which may have been formed within the first polymer phase, and/or which may have been formed between the first polymer phase and additional polymer phases that may be present, for example, a third and/or fourth polymer phase of a multilayer coating, and/or which may traverse the first polymer phase and additional polymer phases that may be present, for example, a third and/or fourth polymer phase of a multilayer coating. The chemical reactivity of the self-healing thermoplastic polymer with, for example, the epoxy-based primer layer of a multilayer coating which the disclosed composition is applied to or in contact with, may facilitate flow or movement of the self-healing thermoplastic polymer into the interstitial gap, for example by producing volatile by-products which form gas bubbles or gas pockets that increase expansive pressure. The chemical reactivity of the self-healing thermoplastic polymer may also facilitate adhesive bonding with the first polymer phase, and optionally, additional polymer phases that may be present, for example, a third and/or fourth polymer phase of a multilayer coating. Hence, in one embodiment, the self-healing thermoplastic polymer is selected to be capable of achieving a balance between flow and movement on healing and providing strong bonding interactions, such as non-covalent hydrogen bonding, Van der Waals interaction, ionic bonding and/or hydrophobic interactions, with the first polymer phase, and optionally, additional polymer phases that may be present, for example, a third and/or fourth polymer phase of a multilayer coating, that enable healing or recovery of strength of the coating following damage. The bonding may be restricted or prevented until after the healing conditions have been applied.

The properties of acting as a self-healing agent and chemical reactivity may be provided by selecting appropriate functional groups in the self-healing thermoplastic polymer. Functional groups may be attached to or be incorporated into the backbone of the self-healing thermoplastic polymer such that they are available for bonding and/or chemical reaction with the thermoplastic polymer matrix of the first polymer phase and/or the polymer of additional polymer phases that may be present, for example a third and/or fourth polymer phase of a multilayer coating. The functional groups may be in the form of pendant groups attached to the backbone of the polymer, form part of the backbone of the polymer, or be in a combination of forms thereof. The pendant groups may allow a range of spacing of one or more functional groups from the backbone of the polymer. The self-healing thermoplastic polymer may comprise one or more functional groups selected from the group consisting of amine, acid, hydroxyl, epoxy, ketone, ether, ester, and salts thereof. The acid may be an organic acid or a salt thereof. In one embodiment, the organic acid is a carboxylic acid or a salt thereof.

In one embodiment, the self-healing thermoplastic polymer contains functional groups capable of bonding with the thermoplastic polymer matrix of the first polymer phase and/or the polymer of additional polymer phases that may be present, for example a third and/or fourth polymer phase of a multilayer coating. The bonding may be non-covalent or covalent bonding at an interface where the self-healing thermoplastic polymer contacts the thermoplastic polymer matrix of the first polymer phase and/or the polymer of additional polymer phases that may be present, for example a third and/or fourth polymer phase of a multilayer coating. The thermoplastic polymer matrix of the first polymer phase, and optionally, the polymer of additional polymer phases that may be present, for example a third and/or fourth polymer phase of a multilayer coating, may also contain functional groups capable of bonding with the self-healing thermoplastic polymer. The functional groups may include amines, carboxylic acids, hydroxyl, oxiranes, ketones, ethers, esters, conjugated compounds such as aromatics, or salts thereof. The selection of appropriate functional groups facilitates strong bonding interactions between the self-healing thermoplastic polymer and the thermoplastic polymer matrix of the first polymer phase and/or the polymer of additional polymer phases that may be present, for example a third and/or fourth polymer phase of a multilayer coating, which provides for effective self-healing.

The bonding may include covalent bonding, or non-covalent bonding such as ionic bond formation, Van der Waals, acid-base, hydrogen bonding, and dipole-dipole interactions. The primary bonding before healing is typically hydrogen bonding. After healing, the bonding may comprise hydrogen bonding and may include covalent and/or ionic bonding. In one embodiment, the bonding after healing comprises covalent bonding between the self-healing thermoplastic polymer and the epoxy-based primer layer in a multilayer coating to which the disclosed composition is applied.

The functional groups of the self-healing thermoplastic polymer may be selected from one or more of the group consisting of amine, acid, hydroxyl, epoxy, ketone, ether, ester, or salts thereof. The acid may be an organic acid or a salt thereof. In one embodiment, the organic acid is a carboxylic acid or a salt thereof. The carboxylic acid may be provided by using a polyethylene methacrylic acid as the self-healing thermoplastic polymer. Other types of acids, different co-polymer ratios, grafting ratios, and/or blends thereof may also be used. The self-healing thermoplastic polymer may be a functionalized polyolefin or copolymer thereof, which may include a functionalized polyethylene or copolymer thereof. In one embodiment, the functionalized polyethylene or copolymer thereof is polyethylene co-methacrylic acid (EMAA). In one embodiment, the polyethylene co-methacrylic acid (EMAA) is not neutralized. Advantageously, the thermo-reversible property of thermoplastics and the reactive functional groups available in a functionalized thermoplastic, such as EMAA, which enable chemical interactions with functional groups present for example in an epoxy-based primer layer of a multilayer coating, facilitate the self-healing action of the disclosed polymer composition. Other exemplary materials that can be used as the thermoplastic polymer of the second polymer phase include, but are not limited to, neutralized or partially neutralized EMAA, ethylene vinyl acetate (EVA), poly(ethylene-co-glycidyl) methacrylate (PEGMA), acrylonitrile butadiene styrene (ABS), 1.5 wt % maleated styrene ethylene butadiene copolymer (SEBS), or combinations thereof.

The self-healing thermoplastic polymer may be incorporated with the thermoplastic polymer matrix of the first polymer phase as a dispersion of discrete portions, for example as particles or fibres. As described above, the self-healing thermoplastic polymer is capable of being chemically reactive, on healing, from within the disclosed polymer composition. For example, at elevated temperatures or pressures during healing, the self-healing thermoplastic polymer can undergo a chemical reaction, such as a reaction to form a covalent bond and/or produce volatile by-products, from within the dispersed portion or at or near the surface of the dispersed portion. The chemical reaction may be restricted or prevented until after the healing conditions have been applied.

The self-healing thermoplastic polymer may be selected to be capable of producing a gas bubble or gas pocket within one or more dispersed discrete portions of the second polymer phase, on healing of the disclosed polymer composition, for example when an external temperature and/or pressure is applied to the disclosed polymer composition. Without being bound by theory, it is envisaged that the formation of gas bubbles or gas pockets in the self-healing thermoplastic polymer facilitates movement of the self-healing thermoplastic polymer into an interstitial gap that may be present in a fractured material, such as a coating (e.g. a multilayer coating).

The discrete portions may be in the form of particles having a diameter that is sufficient to provide a reservoir of the self-healing thermoplastic polymer for self-healing to occur. In one embodiment, the discrete portions may be in the form of particles having diameters of at least 5 μm. For example, the discrete portions may be in the form of particles having diameters of at least 5 μm, at least 6 μm, at least 7 μm, at least 8 μm, at least 9 μm, at least 10 μm, at least 15 μm, at least 20 μm, at least 25 μm, at least 30 μm, at least 35 µm, at least 40 µm, at least 50 µm, at least 60 µm, at least 70 µm, at least 80 µm, at least 90 µm, at least 100 µm, at least 200 µm, at least 300 µm, at least 400 µm, at least 500 µm, or at least 1000 µm.

In one embodiment, the discrete portions are in the form of particles having diameters of about 5 µm to about 500 µm, about 5 µm to about 400 µm, about 5 µm to about 300 µm, about 5 µm to about 200 µm, about 5 µm to about 190 µm, about 5 µm to about 180 µm, about 5 µm to about 170 µm, about 5 µm to about 160 µm, about 5 µm to about 150 µm, about 5 µm to about 140 µm, about 5 µm to about 130 µm, about 5 µm to about 120 µm, about 5 µm to about 110 µm, about 5 µm to about 100 µm, about 5 µm to about 90 µm, about 5 µm to about 80 µm, about 5 µm to about 70 µm, about 5 µm to about 60 µm, about 5 µm to about 50 µm, about 5 µm to about 40 µm, about 5 µm to about 30 µm, about 5 µm to about 20 µm, about 5 µm to about 10 µm, about 10 µm to about 500 µm, about 15 µm to about 500 µm, about 20 µm to about 500 µm, about 25 µm to about 500 µm, about 30 µm to about 500 µm, about 35 µm to about 500 µm, about 40 µm to about 500 µm, about 50 µm to about 500 µm, about 60 µm to about 500 µm, about 70 µm to about 500 µm, about 80 µm to about 500 µm, about 90 µm to about 500 µm, about 100 µm to about 500 µm, about 200 µm to about 500 µm, about 300 µm to about 500 µm, about 400 µm to about 500 µm, about 10 µm to about 400 µm, about 10 µm to about 300 µm, about 10 µm to about 200 µm, about 10 µm to about 100 µm, about 10 µm to about 90 µm, about 10 µm to about 80 µm, about 10 µm to about 70 µm, about 10 µm to about 60 µm, about 10 µm to about 50 µm, about 10 µm to about 40 µm, about 10 µm to about 30 µm, about 10 µm to about 20 µm, about 20 µm to about 40 µm, or about 30 µm to about 40 µm. In one embodiment, the discrete portions are in the form of particles having diameters of about 10 µm to about 40 µm. In one embodiment, the discrete portions are in the form of particles having diameters of about 30 µm to about 40 µm.

In another embodiment, the self-healing thermoplastic polymer of the second polymer phase is provided in the form of one or more layers in between at least two polymer phases. For example, the self-healing thermoplastic polymer may be provided in the form of a layer between a first polymer phase and a third polymer phase (for example, a primer layer) of a multilayer coating, or in between a first polymer phase and a fourth polymer phase (for example, a topcoat layer) of a multilayer coating. Each of the one or more layers of the thermoplastic polymer of the second polymer phase may have a thickness of about 100 µm to about 700 µm, about 100 µm to about 600 µm, about 100 µm to about 500 µm, about 100 µm to about 400 µm, about 100 µm to about 300 µm, about 100 µm to about 200 µm, about 200 µm to about 700 µm, about 300 µm to about 700 µm, about 400 µm to about 700 µm, about 500 µm to about 700 µm, about 600 µm to about 700 µm, about 150 µm to about 700 µm, about 150 µm to about 600 µm, about 150 µm to about 500 µm, about 150 µm to about 400 µm, about 150 µm to about 300 µm, about 150 µm to about 200 µm, about 250 µm to about 700 µm, about 250 µm to about 600 µm, about 250 µm to about 500 µm, about 250 µm to about 400 µm, or about 250 µm to about 350 µm. In one embodiment, each of the one or more layers of the thermoplastic polymer of the second polymer phase has a thickness of about 150 µm to about 500 µm. In one embodiment, each of the one or more layers of the thermoplastic polymer of the second polymer phase has a thickness of about 250 µm to about 350 µm.

In one embodiment, the thermoplastic polymer of the second polymer phase is not encapsulated in an encapsulating agent.

In one embodiment, the ratio of the thermoplastic polymer of the second polymer phase to the thermoplastic polymer matrix of the first polymer phase is in the range of 4:1 to 1:4. The ratio of the thermoplastic polymer of the second polymer phase to the thermoplastic polymer matrix of the first polymer phase may be 4:1, 3:1, 2:1, 1:1, 1:2, 1:3, or 1:4. In one embodiment, the ratio of the thermoplastic polymer of the second polymer phase to the thermoplastic polymer matrix of the first polymer phase is 1:1. Advantageously, this ratio provides an optimal balance of adhesive performance and self-healing capability.

Healing Conditions

For healing to occur, the self-healing thermoplastic polymer should preferably attain a certain level of viscosity. The pressures and temperatures to be applied in order to attain the required viscosities may depend on factors such as the form and type of the self-healing thermoplastic polymer used. The healing conditions may also vary according to the nature of the thermoplastic polymer matrix of the first polymer phase, and/or the polymer of additional polymer phases that may be present, for example a third and/or fourth polymer phase of a multilayer coating.

To activate the self-healing process, a stimulus may be applied to the disclosed polymer composition that will cause the self-healing thermoplastic polymer of the second polymer phase of the disclosed polymer composition to at least partially fill the gap. The stimulus may then be removed to allow the self-healing thermoplastic polymer to bond the edges of the gap together to thereby heal the fracture.

The stimulus may be in the form of heat or pressure, or combinations thereof. The stimulus may also comprise external or internal processes. For example, an external stimulus, such as an external heat source may be applied to the surface or surrounding of the self-healing thermoplastic polymer thereby raising the internal temperature of the self-healing thermoplastic polymer to result in healing. An internal process may involve resistive heating, ultrasound, or other molecular motion process, whereby heat is generated internally in the polymer material. Resistive heating may involve applying a current across a composite material having a particular resistance and thereby causing internal heating in the material.

In one embodiment, the disclosed polymer composition may heal at relatively low temperatures and pressures, for example, at a temperature below about 150° C.

In one embodiment where the stimulus is heat, the heat is applied at a temperature of at least about 90° C. For example, the heat is applied at a temperature of at least about 90° C., at least about 95° C., at least about 100° C., at least about 105° C., at least about 110° C., at least about 115° C., at least about 116° C., at least about 117° C., at least about 118° C., at least about 119° C., at least about 120° C., at least about 121° C., at least about 122° C., at least about 123° C., at least about 124° C., at least about 125° C., at least about 126° C., at least about 127° C., at least about 128° C., at least about 129° C., at least about 130° C., at least about 140° C., at least about 150° C., at least about 160° C., at least about 170° C., at least about 180° C., at least about 190° C., at least about 200° C., at least about 210° C., at least about 220° C., or at least about 230° C.

In one embodiment, the heat is applied at a temperature that is less than the melting point of the thermoplastic polymer matrix of the first polymer phase and/or the polymer of additional polymer phases that may be present, for example a third and/or fourth polymer phase of a multilayer coating. For example, the heat is applied at a temperature of less than about 150° C., less than about 145° C., less than about 140° C., less than about 135° C., less than about 130° C., less than about 125° C., less than about 124° C., less than about 123° C., less than about 122° C., less than about 121° C., less than about 120° C., less than about 115° C., less than about 110° C., less than about 100° C., or less than about 95° C.

In one embodiment, the heat is applied at a temperature of about 120° C.

In one embodiment, the healing condition involves a temperature that is lower than the temperature at which the polymer of the first, third and/or fourth polymer phases decomposes. A particular lower temperature will eventually be reached that cannot initiate healing, that is, a critical healing temperature exists for a particular polymer material. The optimal healing temperatures may vary depending on the nature of the polymer material, degree of healing required, and the duration and cycles of healing. For example, an EMAA thermoplastic polymer dispersed in a MAH-grafted polyethylene may require heating conditions of about 180° C. for about 6 mins to about 230° C. for about 6 mins, where the critical healing temperature is about 205° C. An EMAA thermoplastic polymer dispersed in a MAH-grafted polypropylene may require heating conditions of about 150° C. for about 6 mins to about 210° C. for about 6 mins, where the critical healing temperature is about 180° C. It is to be understood that heating at lower temperatures may also be applied for a longer duration.

In one embodiment, the stimulus is pressure. In one embodiment, the pressure is applied at a level that is sufficient to effect self-healing without causing any degradation of the disclosed polymer composition, or damage to the structure to which the disclosed polymer composition is applied. For example, the pressure may be applied at at least about 50 N, at least about 60 N, at least about 70 N, at least about 80 N, at least about 90 N, at least about 100 N, at least about 110 N, at least about 120 N, at least about 130 N, at least about 140 N, at least about 150 N, at least about 160 N, at least about 170 N, at least about 180 N, at least about 190 N, at least about 200 N, at least about 210 N, at least about 220 N, at least about 230 N, at least about 240 N, or more. For example, the pressure may be applied in the range of from about 50 N to about 300 N, from about 100 N to about 250 N, from about 120 N to about 240 N, or from about 150 N to about 200 N. In one embodiment, the pressure is applied at about 120 N. In another embodiment, the pressure is applied at about 240 N.

The disclosed polymer composition, or coating or composite comprising the disclosed polymer composition may be healed more than once, for example they may be healed multiple times over a duration of many years. Partially or previously healed material may be further healed, for example by applying further heating and/or pressure.

It is envisaged that a volatile by-product that is capable of forming an expanding bubble under the elevated temperatures of healing may be produced by promoting condensation reaction of the self-healing thermoplastic polymer. This may be achieved by incorporating functional groups along the backbone of the self-healing thermoplastic polymer, and/or the thermoplastic polymer matrix of the first polymer phase and/or the polymer of additional polymer phases that may be present, for example a third and/or fourth polymer phase of a multilayer coating. For example, this may be achieved by incorporating suitable functional groups along the backbone of the self-healing thermoplastic polymer and/or the epoxy-based primer layer in a multilayer coating which the disclosed composition is applied to or in contact with. The functional groups involved in bonding may also be involved in the condensation reaction. The functional groups may be acid groups, which may be organic acid groups such as carboxylic acid. Such acid groups may react with hydroxyl groups, and may be catalyzed by the presence of tertiary amines, to form condensation products such as water that are volatile at the elevated temperatures and pressures applied during healing.

In one embodiment, the self-healing thermoplastic polymer contains carboxylic acid groups. The thermoplastic polymer matrix of the first polymer phase and/or the polymer of additional polymer phases that may be present, for example a third and/or fourth polymer phase of a multilayer coating, may also be provided with a sufficient amount of available tertiary amines and/or hydroxyl groups to promote a condensation reaction. For example, an epoxy-based primer layer in a multilayer coating to which the disclosed composition is applied may be provided with a sufficient amount of available hydroxyl groups to promote condensation with the carboxylic acid groups of the self-healing thermoplastic polymer. For example, in an embodiment where the self-healing thermoplastic polymer EMAA is dispersed in a graft copolymer of polyethylene and a monomer selected from the group consisting of maleic anhydride, maleic acid, and mixtures thereof, the ratio of EMAA to the graft copolymer of 1:1 may provide an appropriate amount of available carboxylic acid groups to form a volatile by-product when in contact with an epoxy-based primer layer in a multilayer coating to which the disclosed composition is applied, and initiate bubble formation on healing. In another embodiment, where the self-healing thermoplastic polymer EMAA is dispersed in a graft copolymer of polypropylene and a monomer selected from the group consisting of maleic anhydride, maleic acid, and mixtures thereof, the ratio of EMAA to the graft copolymer of 1:1 may provide an appropriate amount of available carboxylic acid groups to form a volatile by-product when in contact with an epoxy-based primer layer in a multilayer coating to which the disclosed composition is applied, and initiate bubble formation on healing.

Additives

The disclosed polymer composition may further comprise one or more additives that do not adversely affect the self-healing capability or the adhesive properties of the disclosed polymer composition.

The additive may be present in an amount of less than about 30 wt % based on the total weight of the disclosed composition. For example, the additive may be present in an amount of less than about 25 wt %, less than about 24 wt %, less than about 23 wt %, less than about 22 wt %, less than about 21 wt %, less than about 20 wt %, less than about wt %, or less than about 10 wt %. Alternatively, the additive may be present in an amount that is more than about 30 wt %.

In one embodiment, the additive is selected from the group consisting of pimelic acid, citric acid, and mixtures thereof.

Other additives that may be included in the disclosed polymer composition are plasticizers (e.g. sulfonate plasticizers and phosphate ester plasticizers), coupling agents (e.g. silanes), stabilizers (e.g. thermal or UV stabilizers), rheology modifiers (e.g. hydroxypropyl methyl cellulose, modified urea and polyhydroxycarboxylic acid amides), fillers (e.g. mica, calcium oxide, ground or precipitated chalks, quartz powder, alumina, clays, dolomite, carbon fibers, glass fibers, polymeric fibers, titanium dioxide, fused silica, carbon black, calcium magnesium carbonates, barite, and silicate-like fillers of the aluminum magnesium calcium silicate type, for example wollastonite and chlorite), auxiliary impact modifiers/toughening agents (e.g. core/shell polymers, butadiene-nitrile rubbers, and acrylic polymers and copolymers), reactive and/or non-reactive diluents (such as mono-epoxide, e.g. monoglycidyl ethers of alkyl- and alkenyl-substituted phenols), adhesion promoters (e.g. organosilane, polyacrylic acid, or polymethylacrylic acid), wetting agents (e.g. fluorochemical surfactants, polyether modified poly-dimethyl-siloxane, hydroxyethyl methacrylate, hydroxypropyl methacrylate, methylmethacyrlate, methacrylic acid and glycerol dimethacrylate), fire retardants (e.g. melamine, melamine phosphate, dimelamine phosphate, melamine polyphosphate, ammonia phosphate, ammonia polyphosphate, pentaerythritol phosphate, melamine phosphate, triphenyl phosphine, melamine cyanurate, melamine phthalate, melamine phthalimide, melam, melem, melon, melam cyanurate, melem cyanurate, melon cyanurate, hexamethylene tetraamine, imidazole, adenine, guanine, cytosine, thymine, ammonia borate, zinc borate, pentaerythritol, polyethylene alcohol, polyglycols, metal hydroxides, and expandable graphite), lubricants (e.g. hydrogels such as CARBOPOL® (Lubrizol Advanced Materials, Inc.), water soluble polymers such as polyethylene glycol, glycerol, polypropylene glycol, polyvinyl alcohol, polyvinyl pyrrolidone ("PVP"), sodium benzoate, leucine, magnesium stearate, sodium lauryl sulfate and sodium lauryl sulfoacetate), surface active agents (e.g. fatty acid derivatives and quaternary ammonium salts), anti-oxidants (e.g. sterically hindered phenolics, substituted benzotriazole, hindered amine light stabilizer (HALS), thiodiethylene bis (3,5-di-tert-butyl)-4-hydroxyhydrocinnamate), anti-foaming agents (e.g. polyester modified polymethylalkylsiloxanes, polysiloxanes, nonsilicon based polymer compounds, modified urea solutions, polyester modified dimethylpolysiloxanes and polyester modified dimethylpolysiloxane), corrosion inhibitors (e.g. phosphate esters, alkylammonium salt of (2-benzothiazolythio) succinic acid and triazine dithiols), coloring pigments (e.g. fluorescein), and the like.

Applications of Disclosed Polymer Composition (A) Coating

Exemplary, non-limiting embodiments of a coating according to the second aspect will now be disclosed.

The coating may comprise the disclosed polymer composition for use in coating a metal, composite or metal-composite material, or fibrous reinforcement component. The metal may be titanium, aluminium, yttrium, zirconium, iron, cobalt, nickel, copper, silver, palladium, platinum, or combinations or alloys thereof such as steel.

The coating may be a multilayer coating. The multilayer coating may comprise at least two layers. For example, the multilayer coating may comprise three layers, four layers, five layers, six layers, seven layers, eight layers, nine layers or more.

In one embodiment, the multilayer coating comprises three layers. The three layers may be a primer layer, an adhesive layer, and a topcoat layer.

The adhesive layer may comprise the disclosed polymer composition having a first polymer phase and a second polymer phase.

The primer layer may form a third polymer phase in the coating comprising the disclosed polymer composition.

In one embodiment, the third polymer phase comprises a thermoset polymer matrix or one or more polymerizable thermoset agents capable, on curing, of producing the thermoset polymer matrix. The thermoset polymer may comprise one or more functional groups selected from the group consisting of epoxy, urethane, imide, cyanate ester, benoxazine, polyester, vinyl ester, phenol, bismaleimide, amine, acid, hydroxyl, ketone, ether, ester, and salts thereof.

In one embodiment, the functional groups of the thermoset polymer matrix are selected from the group consisting of epoxy, amine and hydroxyl. In one embodiment, the amine is a tertiary amine.

In one embodiment, the thermoset polymer matrix comprises an epoxy based resin, or the one or more polymerizable thermoset agents comprise epoxy resin forming agents. Epoxy resins, which are widely used as thermoset polymers for manufacturing fibre reinforced composites in structural applications, have a highly crosslinked structure which makes them inherently brittle and susceptible to microcrack formation deep within the structure where detection and intervention are difficult or impossible.

The epoxy resin may be monomeric or polymeric, and may be aromatic epoxy resins, aliphatic epoxy resins, aromatic multi-functional epoxy resins, glycidyl ether-type epoxy resins, glycidyl ester-type epoxy resins, glycidyl amine-type epoxy resins, urethane-modified epoxy resins, rubber-modified epoxy resins, alkyd-modified epoxy resins, and combinations thereof. Exemplary epoxy resins are resorcinol diglycidyl ether, bisphenol A diglycidyl ether, triglycidyl-p-amino-phenol, bromobisphenol F diglycidyl ether, the triglycidyl ether of m-amino-phenol, tetraglycidyl-methylenedianiline, the triglycidyl ether of (trihydroxyphenyl)methane, polyglycidyl ethers of phenol-formaldehyde novolak, polyglycidyl ethers of ortho-cresol novolak and tetraglycidyl ethers of tetraphenyl-ethane. Mixtures of at least two or more of these resins may also be used.

In one embodiment, the epoxy resin is a glycidyl ether-type epoxy resin. In one embodiment, the epoxy resin is a bisphenol A-type epoxy resins. In one embodiment, the epoxy resin is diglycidyl ether of bisphenol A (DGEBA).

The one or more polymerizable thermoset agents may be selected to enable curing of the thermoset polymer matrix at a temperature substantially less than the melt temperature ($T_m$) of the thermoplastic polymer of the first and/or second polymer phase, and/or the polymer of additional polymer phases that may be present, for example a third and/or fourth polymer phase of a multilayer coating.

In one embodiment, the thermoset polymer matrix can be formed from one or more polymerizable thermoset agents. The polymerizable agents may be monomers, co-monomers, pre-polymers or polymers that are capable of producing the thermoset polymer.

In one embodiment, the polymerizable thermoset agent is an epoxy-based resin forming agent. The epoxy-based resin forming agent may comprise a resin and a hardener. The hardener may be a cross-linking agent.

One or more hardeners may be added to accelerate and/or supplement the curing of the epoxy-based resin. Exemplary hardeners include aliphatic amines and alicyclic amines such as, for example, tri-ethylene tetraamine (TETA), bis(4-aminocyclohexyl)methane, bis-(aminomethyl)cyclohexane, m-xylenediamine, and 3,9-bis(3-aminopropyl)-2,4,8,10-tetraspiro[5,5]undecane; aromatic amines such as, for example, metaphenylene diamine, diaminodiphenylmethane, and diaminodiphenyl sulfone; tertiary amines and corresponding salts, for example benzyldimethylamine, 2,4,6-tris(dimethyl-aminomethyl) phenol, 1,8-diazabicyclo(5,4,0)undecene-7,1,5-diazabicyclo (4,3,0)nonene-7; anhydride compounds including aromatic acid anhydrides, for example phthalic anhydride, trimellitic anhydride, and pyromellitic anhydride; alicyclic carboxylic anhydrides, for example succinic anhydride, glutaric anhydride, maleic anhydride, tetrahydrophthalic anhydride, methyltetrahydrophthalic anhydride, hexahydrophthalic anhydride, methylhexa-hydrophthalic anhydride, methylendomethylenetetrahydrophthalic anhydride, dodecenylsuccinic anhydride, and trialkyltetrahydrophthalic anhydrides; polyvalent phenols such as catechol, resorcinol, hydroquinone, bisphenol F, bisphenol A, bisphenol S, biphenol, phenol novolac compounds, cresol novolac compounds, novolac compounds of divalent phenols such as bisphenol A, trishydroxyphenylmethane, hydrocarbylpolyphenols, and dicyclopentadiene polyphenols; imidazoles and salts thereof, such as 2-methylimidazole, 2-ethyl-4-methylimidazole, and 2-phenylimidazole; boron trifluoride (BF3) complexes of amine; Bronsted acids, including aliphatic sulfonium salts and aromatic sulfonium salts; dicyandiamide; organic acid hydrazides, such as adipic acid dihydrazide and phthalic acid dihydrazide; resols; polycarboxylic acids, such as adipic acid, sebacic acid, terephthalic acid, trimellitic acid, and polyester resins containing carboxylic groups; and organic phosphines, such as triphenylphosphine.

In one embodiment, the resin is DGEBA. In one embodiment, the hardener is tri-ethylene tetraamine (TETA). In one embodiment, the epoxy-based resin forming agents comprise DGEBA and TETA.

When the hardener and resin are mixed together, the amine groups of the hardener react with the epoxide groups of the resin to form a covalent bond, typically resulting in a highly cross-linked, rigid and strong polymer material. The cross-linking formed between the hardener and the resin may provide the thermoset matrix with functional groups such as epoxy (oxirane), aromatic groups, ether, hydroxyl, and amine including tertiary amine.

The thermoset polymer matrix may be an epoxy produced by curing a first polymerizable thermoset agent with a second polymerizable thermoset agent. The stoichiometric ratio of the first polymerizable thermoset agent to the second polymerizable thermoset agent may vary depending on the nature and functionality of the thermoset polymer matrix desired, so as to achieve the required bonding and chemical reactivity to facilitate self-healing by the disclosed polymer composition. The stoichiometric weight percent ratio may be about 10:1 to about 4:1. For example, the ratio may be about 10:1, about 9:1, about 8:1, about 7:1, about 6:1, about 5:1, or about 4:1. Where the self-healing thermoplastic polymer is EMAA and the thermoset polymer matrix comprises DGEBA and TETA, the stoichiometric weight percent ratio of DGEBA to TETA may be about 7.7:1.

As described above, the functionality on the self-healing thermoplastic polymer and thermoset polymer may also be matched. Where the self-healing thermoplastic polymer contains carboxylic acid groups, the thermoset polymer matrix may therefore be provided with a sufficient amount of tertiary amine and/or hydroxyl groups to promote esterification with the carboxylic groups of the self-healing thermoplastic polymer and form a volatile phase to thereby facilitate self-healing, for example via the "pressure delivery" mechanism as described herein.

The topcoat layer may form a fourth polymer phase in the coating comprising the disclosed polymer composition.

In one embodiment, the fourth polymer phase comprises a polymer material that is compatible with the thermoplastic polymer matrix of first polymer phase. For example, the polymer material of the fourth polymer phase may be a non-polar polymer material. In one embodiment, the non-polar polymer material is polyolefin. Exemplary polyolefin that can be used in the fourth polymer phase includes polyethylene, polypropylene, polybutylene, and mixtures thereof.

In one embodiment, the disclosed polymer composition is capable of undergoing healing at a temperature that does not decompose the fourth polymer phase of the coating. For example, where the fourth polymer phase comprises polyethylene, the temperature for facilitating healing may be less than 125° C., less than 124° C., less than 123° C., less than 122° C., less than 121° C., less than 120° C., less than 115° C., less than 110° C., less than 100° C., or less than 95° C. In one embodiment, the temperature is about 120° C.

The three-layer coating may be applied to a metal surface that has been cleaned by various techniques known in the art, such as abrasive blasting. Typically, the primer layer is applied first, for example by heating the metal surface via induction to a temperature range of about 200° C. to about 220° C. to ensure optimum flow and adherence to the topcoat layer, and then powder-coating the metal surface with the primer layer to a thickness of about 80 to about 100 nm.

Extruded films of the adhesive layer (typically having a thickness of about 350 nm) and the topcoat layer (typically having a thickness of about 1.5 to about 3 mm) may then be applied sequentially. Alternatively, the adhesive layer may be applied to the primer layer electrostatically. The layers may then be rapidly quenched with a water spray. This process is typical for metal pipes, such as steel pipes, having diameters of about 200 mm to about 2500 mm, a wall thickness of about 3 mm to about 25 mm, and a pipe length of about 6 m to about 16 m. In one embodiment, the multilayer coating comprises five layers. The five layers may be a primer layer, an adhesive layer, a first topcoat layer, an insulation layer above the topcoat layer and a second topcoat layer. The insulation layer may comprise a material such as, but not limited to, polypropylene and foamed polyurethane.

When applied to the coating as disclosed above, the disclosed polymer composition is able to heal cracks that traverse or form through the layers of the coating. As described above, this may be facilitated by bonding interactions between the self-healing thermoplastic polymer and the thermoplastic polymer matrix of the first polymer phase and/or the polymer of additional polymer phases that may be present, for example a third and/or fourth polymer phase of a multilayer coating.

Exemplary, non-limiting embodiments of a pipeline according to the third aspect will now be disclosed.

The pipeline may comprise at least two pipes coated with the disclosed polymer composition as described above, connected end-to-end to facilitate long-distance transport of materials such as oil and gas products. For example, the pipeline may comprise at least two, at least three, at least four, at least five, at least ten, at least fifty, at least 100, at least 500, at least 1000, at least 5000, about 2 to about 5000, about 5 to about 4000, about 10 to about 3000, about 50 to about 2000, about 100 to about 1000, about 500 to about 3000, or about 1000 to about 2000 of the pipes coated with the disclosed polymer composition as described above.

(B) Fibre Reinforced Composite

Exemplary, non-limiting embodiments of a fibre reinforced composite according to the fourth aspect will now be disclosed.

The fibre reinforced composite may comprise a fibrous reinforcement component and the disclosed polymer composition or coating.

The disclosed polymer composition or coating may be incorporated or associated with the fibrous reinforcement component in a range of configurations, for example as a sheet or layer that incorporates the fibrous reinforcement component. For example, the fibre reinforced composite may comprise a fibrous reinforcement component impregnated with the disclosed polymer composition or coating.

The fibre reinforced composite may be produced by assembling individual components of the disclosed polymer composition or coating with the fibrous reinforcement component. For example, the self-healing thermoplastic polymer of the disclosed polymer composition may be provided as a mat or matrix over the fibrous reinforcement component, with the thermoplastic polymer matrix of the first polymer phase provided over the self-healing thermoplastic polymer, and the components compressed together. One or more layers of the coating as disclosed above may then optionally be applied to the compressed components.

Alternatively, the thermoplastic polymer matrix of the first polymer phase may comprise the self-healing thermoplastic polymer dispersed therein as discrete portions, and provided over the fibrous reinforcement component. The components may likewise be compressed together, and one or more layers of the coating as disclosed above may then optionally be applied to the compressed components.

The fibrous reinforcement component may be a carbon-based component (for example graphite, silica and/or quartz), a glass, an aramid (for example polyaramid), an organic fibre (for example ultra high molecular weight polyethylene (UHMPE) or polypropylene), basalt fibre, Kevlar, ceramic, or combinations thereof. Other fibrous reinforcement components may also be used.

The fibre reinforced composite may be elongated in shape, for example in the form of a tape. Alternatively, the fibre reinforced composite may be in the form of a patch.

Method of Preparation

Exemplary, non-limiting embodiments of a method according to the fifth aspect for preparing the disclosed polymer composition will now be disclosed.

In the disclosed method, a thermoplastic polymer may first be modified with an adhesive functional group or a group which is a precursor of an adhesive functional group to form the thermoplastic polymer matrix of the first polymer phase. The adhesive functional groups or groups which are a precursor of an adhesive functional group may comprise a polar functional group as disclosed above.

The modification of the thermoplastic polymer may be achieved by non-reactive modification, for example by compatibilization blending. Graft or block polymers, sometimes referred to as "compatibilizing agents", may be added to blends of the thermoplastic polymer and components providing the adhesive functional group or group which is a precursor of an adhesive functional group to stabilize the phase morphology of the mixtures and achieve compatibilization.

Alternatively or additionally, the modification may be achieved by reactive modification. The thermoplastic polymer may be grafted with, or chemically linked to, the adhesive functional group or the group which is a precursor of an adhesive functional group. In reactive modification, compatibilization may be achieved by the chemical reaction initiated during the melt-mixing process.

In one embodiment, the adhesive functional groups are selected to achieve the microstructural morphology to facilitate the self-healing action of the thermoplastic polymer of the second polymer phase on healing of the disclosed polymer composition.

In one embodiment, the modification is conducted at a temperature of at least 140° C. For example, the modification may be conducted at a temperature of at least 140° C., at least 145° C., at least 150° C., at least 155° C., at least 160° C., at least 165° C., at least 170° C., at least 175° C., at least 180° C., at least 185° C., at least 190° C., at least 195° C., at least 200° C., at least 230° C., at least 250° C., at least 300° C., about 140° C. to about 500° C., about 160° C. to about 400° C., about 170° C. to about 300° C., about 180° C. to about 200° C., about 140° C. to about 200° C., about 140° C. to about 190° C., about 140° C. to about 180° C., about 140° C. to about 170° C., at about 140° C., at about 150° C., at about 160° C., at about 170° C., at about 180° C., at about 190° C., at about 200° C., at about 210° C., at about 220° C., at about 230° C., or at about 240° C. For example, where the thermoplastic polymer matrix of the first polymer phase comprises polyethylene, modification may be conducted at a temperature of at least 170° C., for example at about 170° C. to about 250° C., about 170° C. to about 240° C., about 170° C. to about 230° C., about 170° C. to about 220° C., about 170° C. to about 210° C., about 170° C. to about 200° C., about 170° C. to about 190° C., about 170° C. to about 180° C., about 180° C. to about 250° C., about 190° C. to about 250° C., about 200° C. to about 250° C., about 210° C. to about 250° C., about 220° C. to about 250° C., about 230° C. to about 250° C., about 240° C. to about 250° C., about 180° C. to about 240° C., or about 190° C. to about 230° C. In one embodiment, the modification is conducted at a temperature of about 190° C. to about 230° C.

Where the thermoplastic polymer matrix of the first polymer phase comprises polypropylene, modification may be conducted at a temperature of at least 160° C., for example at about 160° C. to about 250° C., about 170° C. to about 250° C., about 180° C. to about 250° C., about 190° C. to about 250° C., about 200° C. to about 250° C., about 210° C. to about 250° C., about 220° C. to about 250° C., about 230° C. to about 250° C., about 240° C. to about 250° C., about 160° C. to about 240° C., about 160° C. to about 230° C., about 160° C. to about 220° C., about 160° C. to about 210° C., about 160° C. to about 200° C., about 160° C. to about 190° C., about 160° C. to about 180° C., or about 160° C. to about 170° C. In one embodiment, the modification is conducted at a temperature of about 160° C. to about 200° C.

In one embodiment, the modification comprises mixing the thermoplastic polymer of the first polymer phase with the adhesive functional group or the group which is a precursor of an adhesive functional group at a speed at which effective mixing is achieved without causing degradation to the thermoplastic polymer or the adhesive functional group or a precursor of the adhesive functional group. In one embodiment, the modification comprises mixing the thermoplastic polymer with the adhesive functional group or the group which is a precursor of an adhesive functional group at a speed of at least 160 rpm. For example, the mixing may be conducted at a speed of at least 160 rpm, at least 170 rpm, at least 180 rpm, at least 190 rpm, at least 200 rpm, at least 240 rpm, at least 250 rpm, at least 300 rpm, at least 400 rpm, at least 500 rpm, at least 1000 rpm, at least 1500 rpm, about 160 rpm to about 2000 rpm, about 170 rpm to about 1900 rpm, about 180 rpm to about 1800 rpm, about 190 rpm to about 1700 rpm, about 200 rpm to about 1600 rpm, about 500 rpm to about 1500 rpm, about 750 rpm to about 1000 rpm, about 160 rpm to about 500 rpm, about 160 rpm to about 400 rpm, about 160 rpm to about 300 rpm, about 160 rpm to about 200 rpm, at about 160 rpm, at about 170 rpm, at about 180 rpm, at about 190 rpm, at about 200 rpm, at about 210 rpm, at about 220 rpm, at about 230 rpm, at about 240 rpm, at about 250 rpm, at about 260 rpm, at about 270 rpm, at about 280 rpm, at about 290 rpm, at about 300 rpm, at about 310 rpm, at about 320 rpm, or at about 330 rpm. In one embodiment, the mixing is conducted at a speed of about 160 rpm to about 320 rpm. In one embodiment, the mixing is conducted at a speed of about 250 rpm to about 300 rpm.

Advantageously, the use of the disclosed temperatures and mixing speeds not only enable the modification to proceed under solvent-free conditions, but enable a level of modification to be achieved that is higher than, or at least comparable to, the level of modification achieved under solvent conditions. The ability to conduct the modification under solvent-free conditions also simplifies the scale-up process and improves cost-effectiveness of the modification process.

Prior to injecting the thermoplastic polymer of the first polymer phase and the adhesive functional group or the group which is a precursor of an adhesive functional group into an extruder, the components may be mixed in a pre-mixing step. Advantageously, such a pre-mixing step enhances the level of modification of the thermoplastic polymer with the adhesive functional group or the group which is a precursor of an adhesive functional group. In addition, or in the alternative, the adhesive functional group or the group which is a precursor of an adhesive functional group may be mixed with other components that may be included in the disclosed polymer composition prior to being mixed with the thermoplastic polymer. For example, the adhesive functional group or the group which is a precursor of an adhesive functional group may be mixed with a free radical initiator and/or a co-agent, and fed through a micro-twin screw feeder to grind the two components together prior to injection into the extruder. Such pre-mixing steps also facilitate modification even in the absence of solvent.

Increasing the concentration of the adhesive functional group, or the group which is a precursor of an adhesive functional group, the free radical initiator, and/or the co-agent, may also enhance the level of modification. For example, concentration of these components may be increased by at least two fold, at least three fold, at least four fold, at least five fold, at least six fold, at least seven fold, at least eight fold, at least nine fold, at least ten fold, or more. For example, where the thermoplastic polymer matrix of the first polymer phase comprises polypropylene, an increase in the concentration of these components by at least ten fold may enable a high level of modification to be achieved, even in the absence of solvent.

Following modification of the thermoplastic polymer that forms the thermoplastic polymer matrix of the first polymer phase, a thermoplastic polymer capable of acting as a self-healing agent and being chemically reactive on healing of the disclosed polymer composition may be added to the first polymer phase. The ratio of the self-healing thermoplastic polymer to the thermoplastic polymer matrix of the first polymer phase may be in the range of 4:1 to 1:4. The ratio of the thermoplastic polymer of the second polymer phase to the thermoplastic polymer matrix of the first polymer phase may be 4:1, 3:1, 2:1, 1:1, 1:2, 1:3, or 1:4. In one embodiment, the self-healing thermoplastic polymer is added to the thermoplastic polymer matrix of the first polymer phase in a ratio of 1:1.

The self-healing thermoplastic polymer may be associated with the thermoplastic polymer matrix of the first polymer phase in various configurations, such as dispersed or incorporated within, or provided on, or contiguously associated with, the thermoplastic polymer matrix of the first polymer phase.

In one embodiment, the self-healing thermoplastic polymer is added to the first polymer phase by way of dispersion. The thermoplastic polymer matrix of the first polymer phase may be heated to a temperature sufficient to enable flowability such that the self-healing thermoplastic polymer may be dispersed into the thermoplastic polymer matrix of the first polymer phase. To achieve good mixing and dispersion of the self-healing thermoplastic polymer, the heating should be sufficient to impart a temperature to the thermoplastic polymer matrix of the first polymer phase and the self-healing thermoplastic polymer of the second polymer phase that is higher than their melt temperatures. In one embodiment, the heating imparts a temperature that enables the thermoplastic polymer matrix of the first polymer phase and the self-healing thermoplastic polymer of the second polymer phase to form a melt.

The temperature to achieve flowability of both the thermoplastic polymer matrix of the first polymer phase and the self-healing thermoplastic polymer may vary depending on factors such as the type of polymer used, the level to which the polymer has been modified, and the concentration of the polymer. The flowability may be achieved at ambient temperature, although a small amount of heating is typically required.

For MAH-grafted polyethylene, a temperature of at least about 130° C. may be used for mixing and dispersion of EMAA. The EMAA at the dispersion temperature is also substantially chemically unreactive with the MAH-grafted polyethylene such that covalent bonding thereof is restricted. Hence, the dispersion temperature may be in the range of at least about 130° C., at least about 140° C., at least about 150° C., at least about 160° C., at least about 170° C., at least about 180° C., at least about 190° C., at least about 200° C., or more.

Once sufficient mixing and dispersion is achieved, the flowability of the melt may be reduced, for example by reducing the temperature, so that the self-healing thermoplastic polymer may be embedded within the thermoplastic polymer matrix of the first polymer phase to thereby provide the microstructural morphology that facilitates the self-healing action of the thermoplastic polymer of the second polymer phase on healing of the disclosed polymer composition.

The dispersion of the thermoplastic polymer may be in the form of discrete particles. For example, upon reducing the temperature, the self-healing thermoplastic polymer may separate out into discrete particles within the thermoplastic polymer matrix of the first polymer phase.

In an alternative embodiment, the disclosed polymer composition may be produced by providing the self-healing thermoplastic polymer on the thermoplastic polymer matrix of the first polymer phase, which may be in the form of a sheet or layer, and optionally compressing the self-healing thermoplastic polymer and thermoplastic polymer matrix of the first polymer phase together, to form the disclosed polymer composition.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 27 shows a schematic representation of the "pressure delivery mechanism".

FIG. 28a shows the optical microscopic surface of the 10 wt % citric acid modified adhesive formulation after healing.

FIG. 28*b* shows the optical microscopic surface of the 10 wt % pimelic acid modified adhesive formulation after healing.

FIG. 28*c* shows the optical microscopic surface of the unmodified adhesive formulation after healing.

FIG. 30*a* shows the optical image illustrating cohesive failure of the unmodified adhesive formulation.

FIG. 30*b* shows the optical image illustrating cohesive failure of the 2 wt % citric acid modified adhesive formulation.

FIG. 30*c* shows the optical image illustrating cohesive failure of the 2 wt % pimelic acid modified adhesive formulation.

FIG. 34 shows the optical and SEM images of the 2 wt % citric acid and 2 wt % pimelic acid modified adhesive formulation containing 38 wt % of Nucrel 2940.

FIG. 35*a* shows an optical image of the primer surface of the 2 wt % pimelic acid modified adhesive formulation exhibiting the bubbles responsible for the pressure delivery healing mechanism.

FIG. 35*b* shows a SEM image of the 2 wt % pimelic acid modified adhesive formulation containing 18 wt % of Nucrel 2940 showing evidence for the adhesion of phase separated particles after healing.

FIG. 35*c* shows an optical image of the 2 wt % pimelic acid modified adhesive formulation containing 18 wt % of Nucrel 2940 illustrating cohesive failure after healing where some adhesive were found adhering to the under side of the topcoat.

FIG. 37*a* shows the DSC analysis of the pimelic acid modified adhesive formulation showing the consistency of the glass transitional point.

FIG. 37*b* shows the DSC analysis of the citric acid modified adhesive formulation showing the consistency of the glass transitional point.

EXAMPLES

Figure 1:
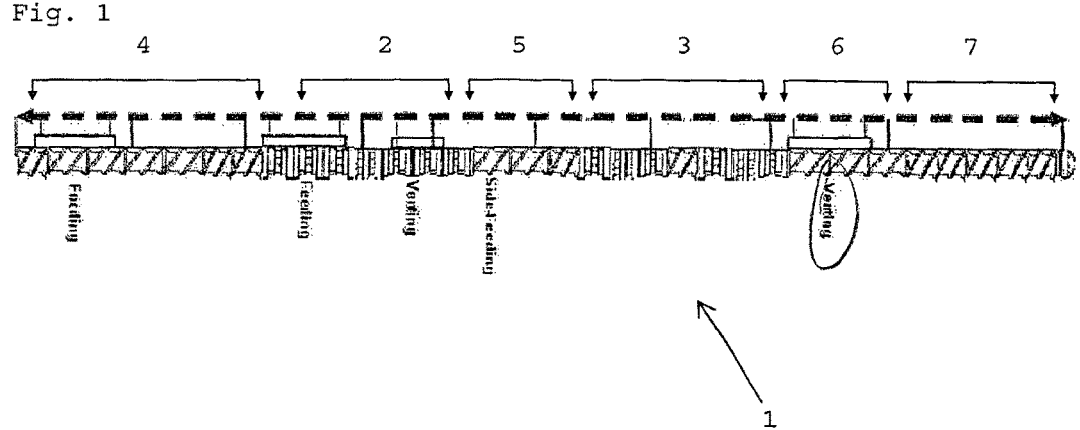
FIG. 1 shows the screw design of the extruder used for the laboratory scale processes.

Non-limiting examples of the invention, including the best mode, and a comparative example will be further described in greater detail by reference to specific Examples, which should not be construed as in any way limiting the scope of the invention.

Example 1

Standard Protocols (a) Preparation of Adhesive Coupons

Three layer coatings were prepared by powder coating fusion bonded epoxy (FEE) (Scotchkote FBE Coating 226N+8G from 3M) to a steel substrate, and then applying an adhesive and topcoat. The surface of the steel (AS/NZS 3678-250 XLERPLATE) was first wiped with methyl ethyl ketone (MEK) and sandblasted. The sample coupons were cut to pieces having dimensions of 120 mm×30 mm×3 mm, powder coated with the FBE to a thickness of about 80-100 µm, placed on a Teflon coated hotplate, and allowed to equilibrate at the desired temperature of 190° C. to 230° C. when a polyethylene based adhesive sample was used, and 160° C. to 200° C. when a polypropylene based adhesive sample was used. A pre-cut adhesive layer and topcoat layer were placed on the sample and a 2.15 kg roller was applied to the sample evenly at least three times. The sample was removed from the hot plate after 2 minutes and used for peel testing. Where a polyethylene based adhesive sample was used, the topcoat used was Etilinas PC4012 (Petronas), and where a polypropylene based adhesive sample was used, the topcoat used was PETRONAS Y022.

(b) Peel Test—Evaluation of Adhesive Performance

Peel testing was performed according to the standard DIN 30670 protocol for testing of polyethylene coatings for steel pipes and fittings (April 1991), or the standard DIN 30678 protocol for testing of polypropylene coatings for steel pipes (October 1992) using a jig set up on an adhesion testing machine (Instron 5566). The sample was placed on the jig and locked into position using adjustable metal supports and locking pins. A cord connecting the base of the jig to the cross-head beam assists the base of the jig to move at the speed of the cross-head to keep the peel angle consistent. As the cross-head beam moves, the adhesive is peeled away from the metal at about 90°.

(c) Fourier Transform Infrared (FTIR)—Quantification of Level of Grafting

Fourier Transform Infrared (FTIR) spectroscopy was used for semi-quantitative measurement of the level of grafting that resulted from modification of the polyolefin. The FTIR was performed using a Thermo Nicolet 5700 FTIR or a Bruker Equinox, followed with analysis of the spectra using the OMNIC Version 7.1 software.

A calibration curve was first constructed using commercially available MAH-grafted polyethylene (Sigma Aldrich) containing 0.4 wt %, 0.5 wt % or 0.85 wt % grafted MAH. The calibration curve was then used for comparison of the level of grafting between the samples prepared as well as against commercially available benchmarks.

Samples were prepared for analysis by dissolving 3 g of the polymer via refluxing with xylene for 3 hrs, followed by precipitation with acetone, drying in an oven at 100° C. for 1 hr, and pressing into a film of about 0.1 to 0.3 mm thick using a hydraulic press set at 230° C.

(d) Melt Flow Index (MFI)

The melt flow index (MFI) of the samples was determined using the ISO 1133 protocol. The polymer sample was pushed through a die at 190° C. using a 2.16 kg weight. The amount of sample collected after 10 min was taken to be the MFI value (g/10 min).

(e) Floating Roller Test Fixture

The floating roller test was conducted using the ASTM D3167 protocol.

(f) Differential Scanning Calorimetry (DSC)

A TA Instruments DSC-2920 (Delaware, USA) was used to determine the melting points and miscibility of the samples. A sample (5 mg) was placed in an aluminum crucible and heated from 30° C. to 220° C. at a rate of 10° C./min under nitrogen. The melting points and miscibility of the samples were then determined from the DSC spectra.

(g) Scanning Electron Microscopy

Scanning electron microscopy was conducted using a Leica 440 scanning electron microscope at a voltage of 20 kV.

Example 2

Solvent-Based Reactive Modification of Polyethylene (PE)

(a) Extrusion Screw Design

The design of the extrusion screw used in the grafting process was found to be important for optimizing the mixing time and the level of chemistry taking place between the polymer reactants of a sample in the reaction zone, and minimizing degradation of the polymer reactants. As shown in FIG. 1, the screw (1) used was a Haake 25 mm Twin Screw (L/D 36) designed to comprise two mixing zones (2, 3) interspersed between conveyance regions (4, 5, 6). Each mixing zone in the screw used is made up of regions to facilitate forward, neutral and reverse mixing directions. In this way, the level of mixing between the polymer reactants was maximized, which maximized reaction between the polymer reactants, prior to the extraction zone (7).

(b) Sample Preparation

Various samples comprising the polyethylene PETRONAS Etilinas LL0209AA (LLDPE), maleic anhydride (MAH) (Sigma Aldrich) (as grafting agent), methyl ethyl ketone (MEK) (as solvent) (Sigma Aldrich) and tert-butyl peroxybenzoate (TBPB) (as free radical initiator) (Luperox®P from Sigma Aldrich) were prepared according to Table 1 below.

TABLE 1

Sample compositions for modification of polyethylene with MAH in solvent-based system

| Sample | TBPB (wt %) | MAH (wt %) | LLDPE in MEK (wt %.) |
|---|---|---|---|
| 1 | 0 | 0 | 100 |
| 2 | 0 | 50 | 50 |
| 3 | 0.5 | 50 | 49.5 |
| 4 | 1 | 50 | 49 |
| 5 | 2 | 50 | 48 |
| 6 | 3.5 | 50 | 46.5 |

(c) Modification Process

The above reactants were fed into the mixing zone (2), FIG. 1, of the extruder to allow the chemical reaction to proceed. The temperature was monitored throughout the process, and was observed to be relatively consistent, varying between 190° C. and 220° C. across the barrel of the extruder.

(d) Results

Figure 2:
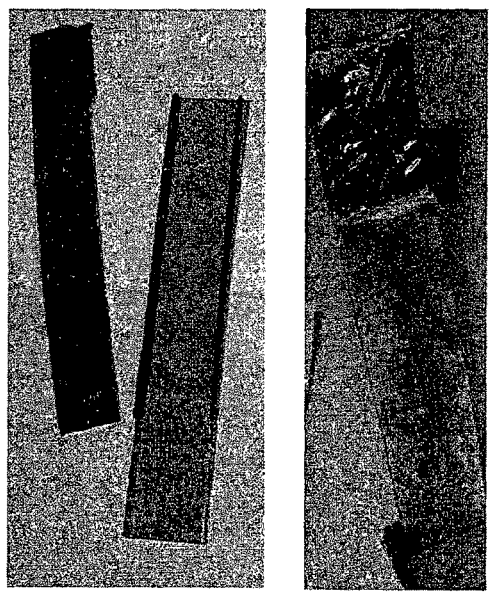
FIG. 2a shows the adhesive failure of the unmodified ETILINAS LL0209AA LLDPE polymer.
FIG. 2b shows the cohesive failure of the MAH-modified ETILINAS LL0209AA LLDPE polymer.

FIG. 2 compares the adhesion performance of an unmodified ETILINAS LL0209AA (LLDPE) polyethylene coupon with that of a modified ETILINAS LL0209AA (LLDPE) polyethylene coupon prepared as set out above in Table 1. FIG. 2a shows a clean smooth surface of an unmodified ETILINAS LL0209AA (LLDPE) polyethylene coupon while FIG. 2b shows cohesive failure of the modified ETILINAS LL0209AA (LLDPE) polyethylene coupon, as evidenced by the presence of LLDPE particles still remaining on the HDPE.

Figure 3:
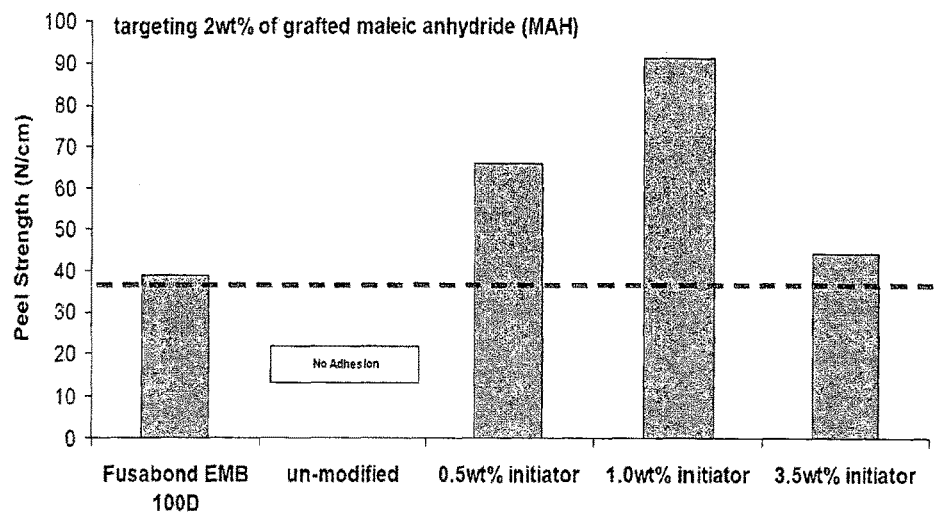
FIG. 3 shows a chart comparing the peel strength of a commercially available adhesive formulation' against that of the ETILINAS LL0209AA LLDPE reactively modified with MAH and various concentrations of initiators (0.5 wt %, 1.0 wt %, and 3.5 wt %).

FIG. 3 shows the peel test results for the samples 1 (unmodified), 3 (with 0.5 wt % initiator), 4 (with 1.0 wt % initiator) and 6 (with 3.5 wt % initiator) of Table 1 against the commercial benchmark, Fusabond EMB 100D. The MAH-modified samples 3, 4 and 6 displayed excellent adhesive properties that were comparable to (sample 6) or higher (samples 3 and 4) than that of the commercial benchmark. Hence, when 0.5 wt % or 1.0 wt % of initiator was used in combination with the optimal level of MAH, the polyethylene exhibited significantly higher adhesive strength than the commercial benchmark. In particular, when 1.0 wt % of the free radical initiator was added to the formulation, the peel strength increased significantly to more than 90 N/cm, which was double that of the commercial benchmark. In contrast, the unmodified polyethylene sample (sample 1) did not exhibit any adhesive properties.

Example 3

Solvent-Free Reactive Modification of Polyethylene (PE)

(a) Reactant Feeding

For solid phase (solvent-free) modification of polyethylene, an initiator/MAH mixture was fed into the barrel of the extruder comprising the screw of FIG. 1 at the same point as the ETILINAS LL0209AA (LLDPE) polyethylene through a parallel port using a micro-twin screw feeder. In the feeding process, the micro-twin screw feeder ground the initiator/MAH mixture together such that they had similar particle sizes and were well dispersed and mixed. This differs from the solvent-based modification in Example 2 above, where the initiator/MAH mixture was dispensed directly into the mixing zone of the extruder barrel.

(b) Optimization of Screw Speed and Barrel Temperature to Improve Grafting Efficiency 1.83 wt % MAH, 98.1 wt % LLDPE and 0.037 wt % of initiator (either di-benzoyl peroxide (Luperox 75A) or lauroyl peroxide) were fed into the extruder at 50 g/hr. The reaction was conducted at varying screw speeds from 120 to 340 rpm, and at varying barrel temperatures from 120° C. to 240° C. The readings collated were computed into a three-dimensional plot as shown in FIG. 4.

Figure 4:
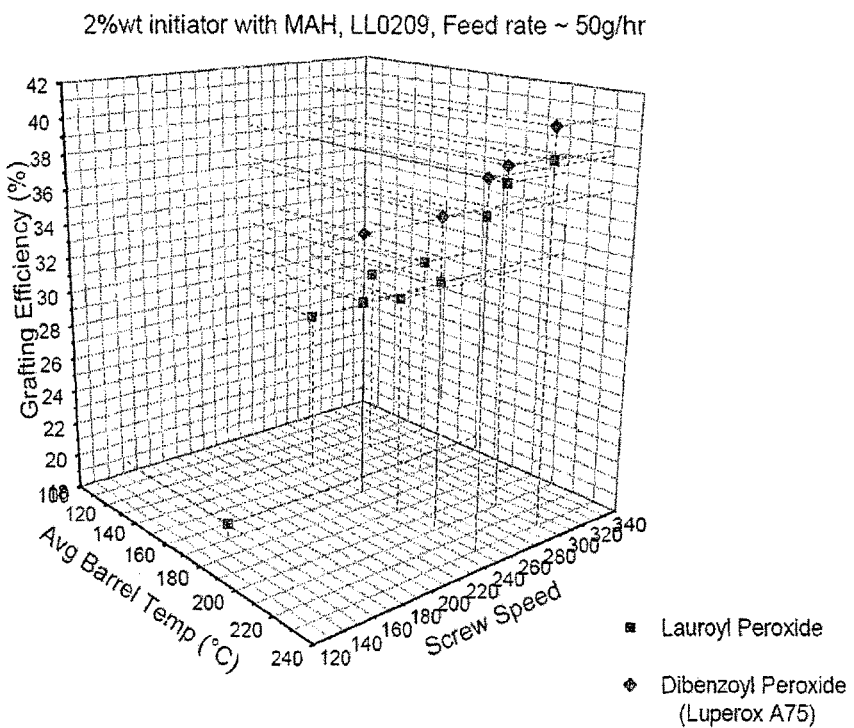
FIG. 4 shows a three dimensional chart of the effect of barrel temperatures (average) and screw speeds on grafting efficiency of MAH onto ETILINAS LL0209AA LLDPE using two different initiators (di-benzoyl peroxide and lauroyl peroxide).

FIG. 4 shows the impact of varying the barrel temperature and screw speed of the extruder on the efficiency of grafting. It can be seen that increasing the temperature and screw speed led to an increase in the level of grafting. To achieve at least about 36% of grafting efficiency, a barrel temperature of about 140° C. and a screw speed of at least 240 rpm were applied when lauroyl peroxide was used as initiator. When the temperature applied was 180° C., the screw speed was 240 rpm, and di-benzoyl peroxide (Luperox 75A) was used as initiator, the grafting efficiency was about 39%.

FIG. 4 also compares the effectiveness of two different initiators, di-benzoyl peroxide (Luperox 75A) and lauroyl peroxide, under the reaction conditions studied. It can be seen that di-benzoyl peroxide is a more efficient initiator at promoting grafting of MAH onto the polyethylene LLDPE under the reaction conditions studied.

Figure 5:
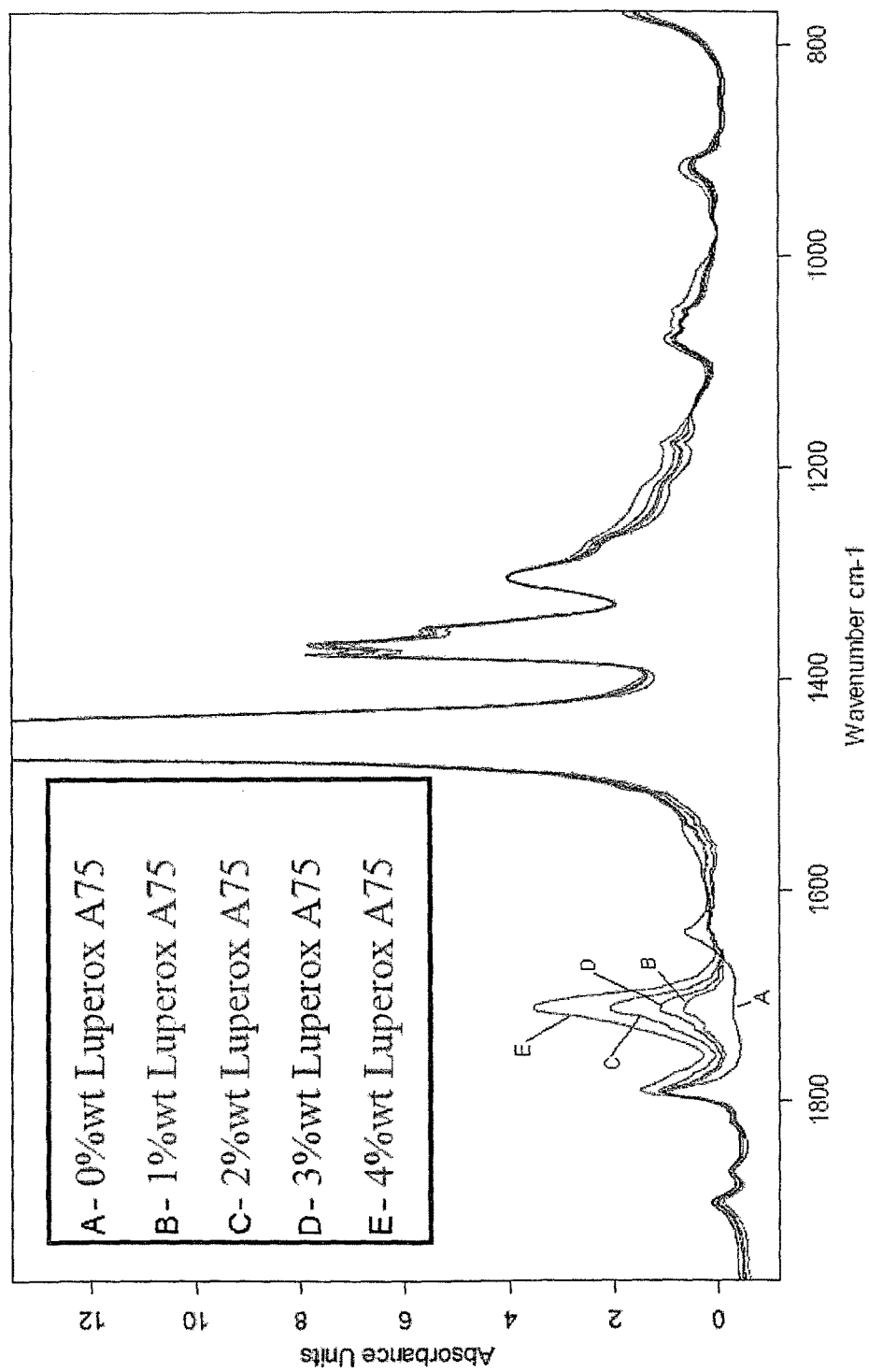
FIG. 5 shows FTIR spectra of samples of adhesive compositions obtained from grafting LLDPE with MAH using various amounts (0 wt %, 1 wt %, 2 wt %, 3 wt % and 4 wt %) of the initiator di-benzoyl peroxide (Luperox A75).

FIG. 5 shows the FTIR spectrum obtained for the LLDPE grafted with MAH in the presence of varying amounts of the initiator di-benzoyl peroxide from 1 wt % to 4 wt %. The carbonyl peak attributed to MAH at about 1700 cm$^{-1}$ in the FTIR spectrum is clearly evident in all of the samples. It can also be seen from the FTIR spectrum that increasing the initiator concentration resulted in higher levels of grafting as reflected by the higher peak at 1700 cm$^{-1}$.

(c) Adhesion Strength of Samples

Figure 6:
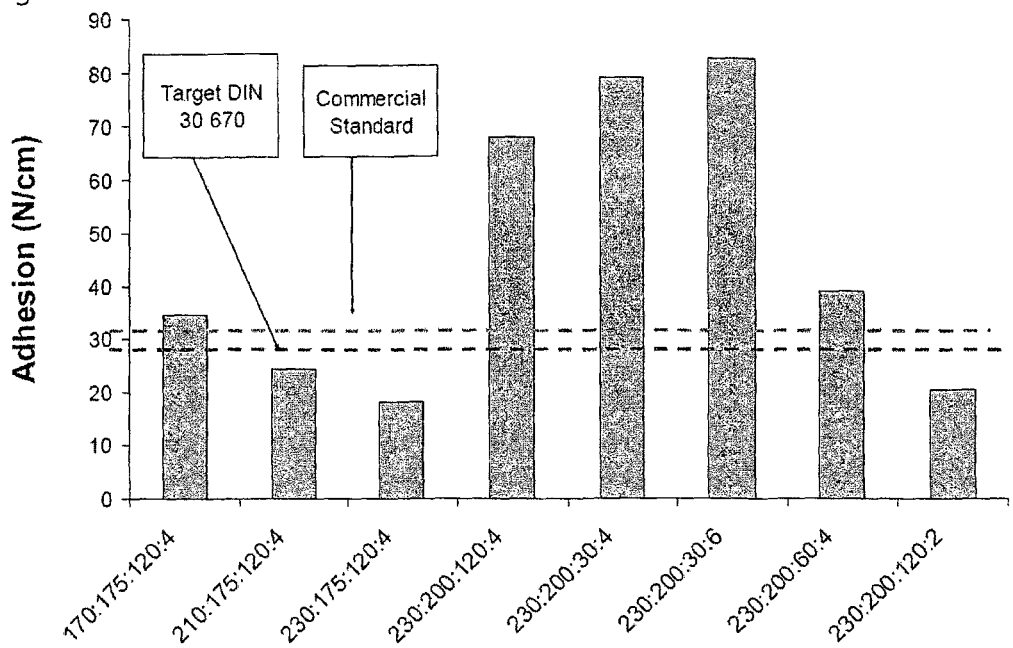
FIG. 6 shows the adhesive strength of various MAH-grafted LLDPE samples wherein various processing and fabrication conditions were varied. The sequence of numbers on the x-axis refers to: Extrusion temperature (° C.): fabrication temperature (° C.): fabrication time window (sec): Fabrication time (min) in the same order.

FIG. 6 shows the adhesion strength of different MAH-grafted LLDPE samples obtained by varying reactant and/or reaction conditions of the extrusion process. The numbers on the x-axis of the chart represent the following parameters from left to right: extrusion temperature (° C.), fabrication temperature (° C.), fabrication time window (sec), and fabrication time (min).

The samples that were prepared at extrusion temperatures of 230° C., fabrication temperatures of 200° C., fabrication time windows of 30 sec and fabrication time of 4-6 min resulted in adhesive performance that was significantly higher than the adhesive performance of a commercial standard and the DIN 30670 target of 35 N/cm.

(d) Addition of Partially Neutralized Polymers

A further study on improving and controlling the adhesive properties of the ETILINAS LL0209AA polyethylene polymer was conducted by adding additives to the MAH-grafted ETILINAS LL0209AA polyethylene polymer in a second extrusion step. The additives tested were the ionomer Surlyn 9970 and Nucrel 2940.

The samples were prepared as follows:
a) 2 wt % Luperox was fed from one micro-hopper (or feeder) and combined with ETILINAS LL0209AA polyethylene fed from another hopper at the same time.
b) 2 wt % Lauroyl Peroxide was fed from one micro-hopper (or feeder) and combined with ETILINAS LL0209AA polyethylene fed from another hopper at the same time.
c) 2 wt Luperox and MAH were fed from one micro-hopper (or feeder) and combined with ETILINAS LL0209AA polyethylene fed from another hopper at the same time.
d) 2 wt % Lauroyl Peroxide and MAH were fed from one micro-hopper (or feeder) and combined with ETILINAS LL0209AA polyethylene fed from another hopper at the same time.
e) 2 wt % Luperox and MAH were fed from one micro-hopper (or feeder) and combined with ETILINAS LL0209AA polyethylene fed from another hopper at the same time. 5 wt % Surlyn was added in a second extrusion run through a separate single screw extruder.
f) 2 wt Lauroyl Peroxide and MAH were fed from one micro-hopper (or feeder) and combined with ETILINAS LL0209AA polyethylene fed from another hopper at the same time. 5 wt % Surlyn was added in a second extrusion run through a separate single screw extruder.
g) 2 wt % Luperox and MAH were fed from one micro-hopper (or feeder) and combined with ETILINAS LL0209AA polyethylene fed from another hopper at the same time. 5 wt % Nucrel 2940 was added in a second extrusion run through a separate single screw extruder.
h) 2 wt % Lauroyl Peroxide and MAH were fed from one micro-hopper (or feeder) and combined with ETILINAS LL0209AA polyethylene fed from another hopper at the same time. 5 wt % Nucrel 2940 was added in a second extrusion run through a separate single screw extruder.

Figure 7:
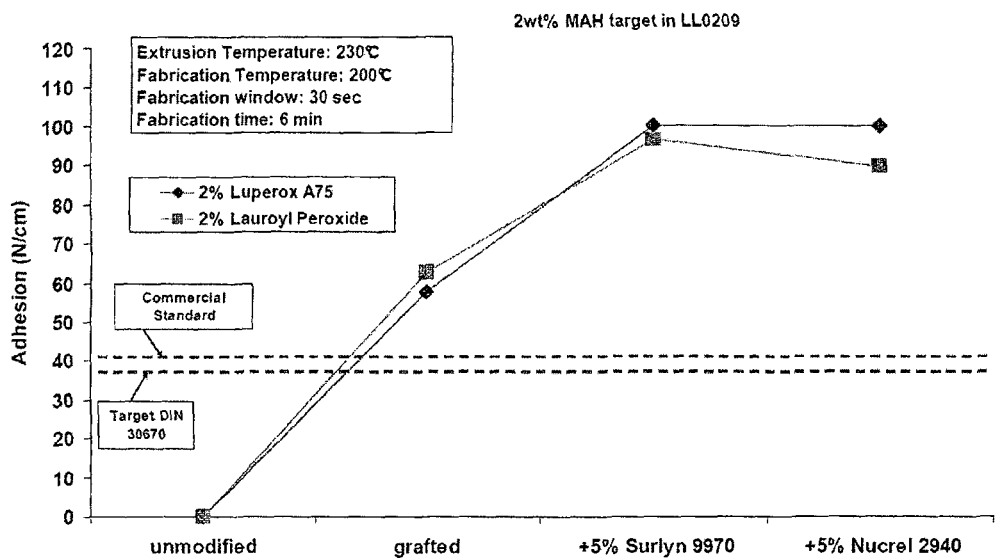
FIG. 7 shows the adhesive strength of the unmodified LLDPE, MAH-grafted LLDPE, and LLDPE grafted with MAH and a partially neutralized polymer (5 wt % Surlyn 9970 or 5 wt % Nucrel 2940), with addition of 2 wt % initiator (Luperox A75 or Lauroyl Peroxide) with an extrusion temperature of 230° C., a fabrication temperature of 200° C., a fabrication time window of 30 sec, and a fabrication time of 6 min.

As shown in FIG. 7 the addition of 5 wt % of either the ionomer (Surlyn 9970) or the ethylene methacrylic acid copolymer (Nucrel 2940) resulted in a substantial increase in adhesive performance that surpassed that of the commercial standard and the target DIN 30670 standard.

Figure 8:
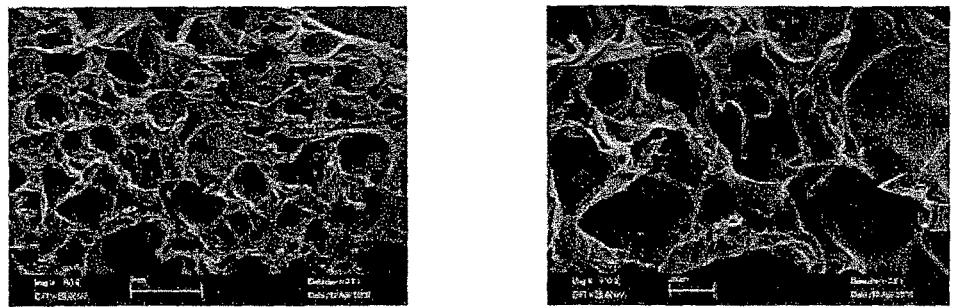
FIG. 8a shows the failure surface of the MAH-grafted LLDPE peel test coupon obtained using scanning electron microscopy (SEM).
FIG. 8b shows the failure surface of the Nucrel-modified grafted LLDPE peel test coupon obtained using SEM.

FIG. 8 shows two examples of the failure surface obtained using scanning electron microscopy (SEM). FIG. 8a shows the SEM of a MAH-grafted LLDPE and FIG. 8b shows the SEM of a Nucrel-modified MAH-grafted LLDPE. Both samples exhibited cohesive adhesive failure and therefore, good adhesive performance.

Example 4

Solvent-Free Reactive Modification of Polypropylene (PP)

(a) Optimization of Feed Composition and Screw Speed to Improve Grafting Efficiency A range of formulations were prepared by varying the amounts (wt %) of dicumyl peroxide (DCP) initiator, the MAH (maleic anhydride), stearamide (SA), and increasing or decreasing the screw speed (thereby reducing or increasing the residence time, respectively). The FTIR spectra of the resultant formulations were subsequently evaluated and are shown in FIGS. 9, 10 and 11, while the MFI values are shown in FIG. 12.

Figure 9:
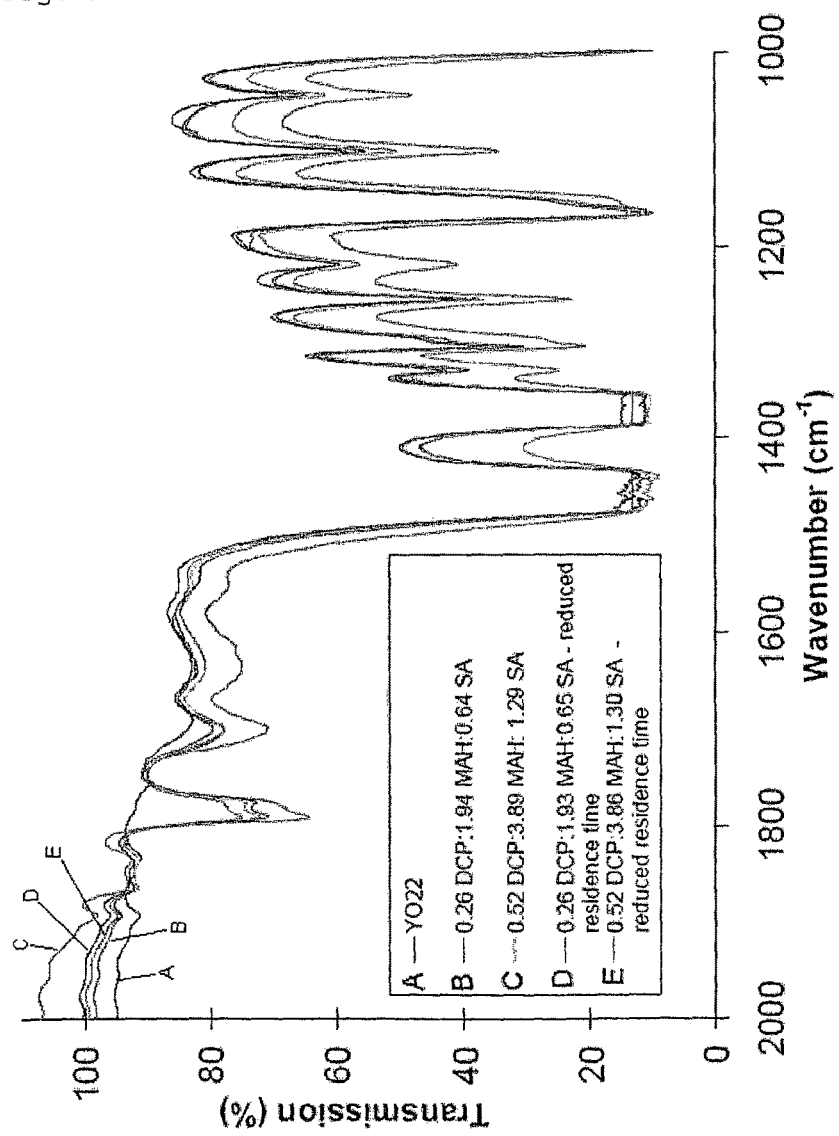
FIG. 9 shows the FTIR spectrum of the unmodified Y022 polypropylene against the FTIR spectra of three Y022 polypropylene samples grafted with MAH, prepared by varying the amount (wt %) of the dicumyl peroxide (DCP) initiator, the MAH (maleic anhydride), stearamide (SA), and increasing the screw speed (thereby reducing the residence time).
Figure 10:
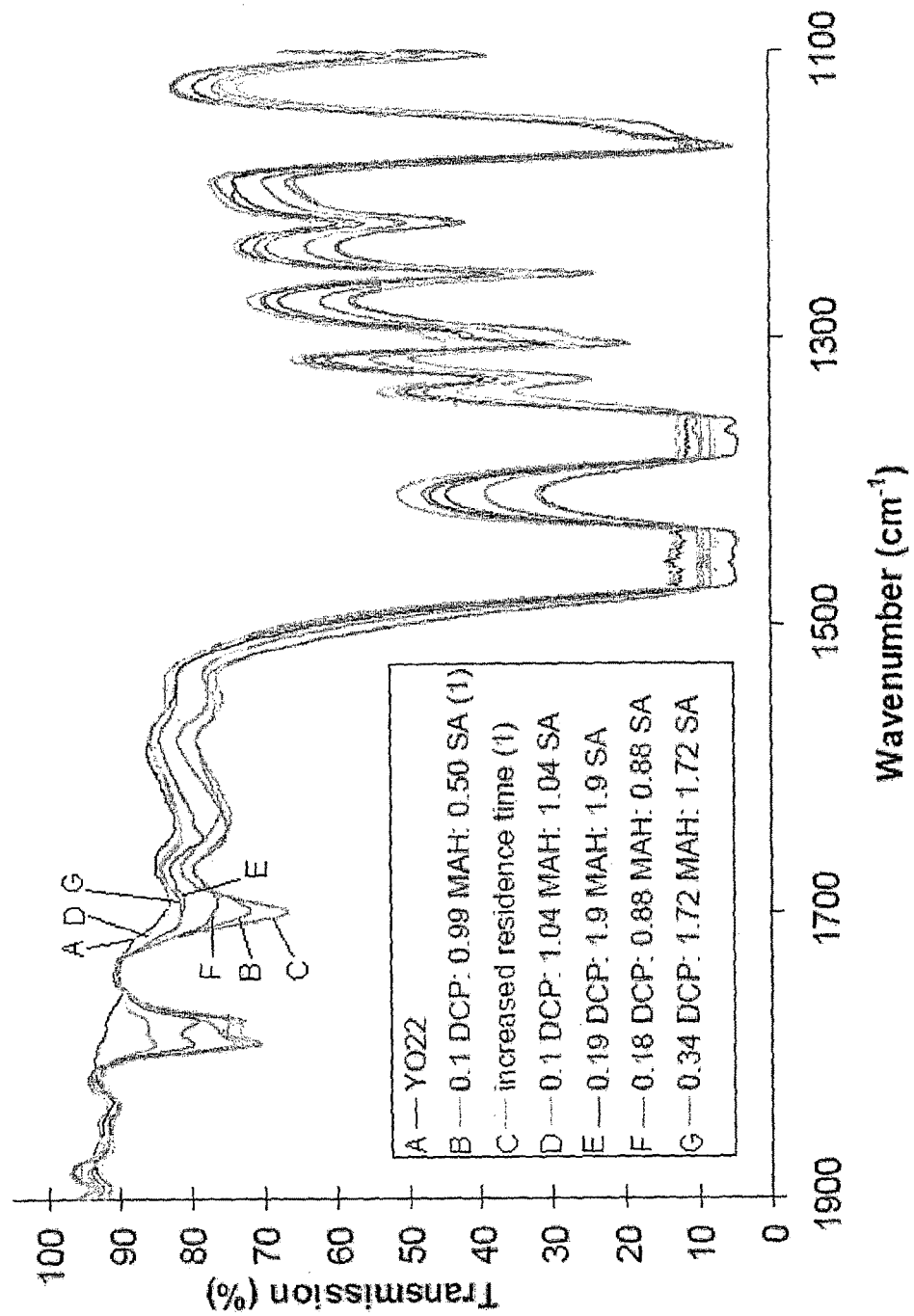
FIG. 10 shows the FTIR spectrum of the unmodified Y022 polypropylene against the FTIR spectra of Y022 polypropylene samples grafted with MAH, prepared by varying the amount (wt %) of the dicumyl peroxide (DCP) initiator, the MAH (maleic anhydride) and stearamide (SA), and reducing the screw speed (thereby increasing the residence time).
Figure 11:
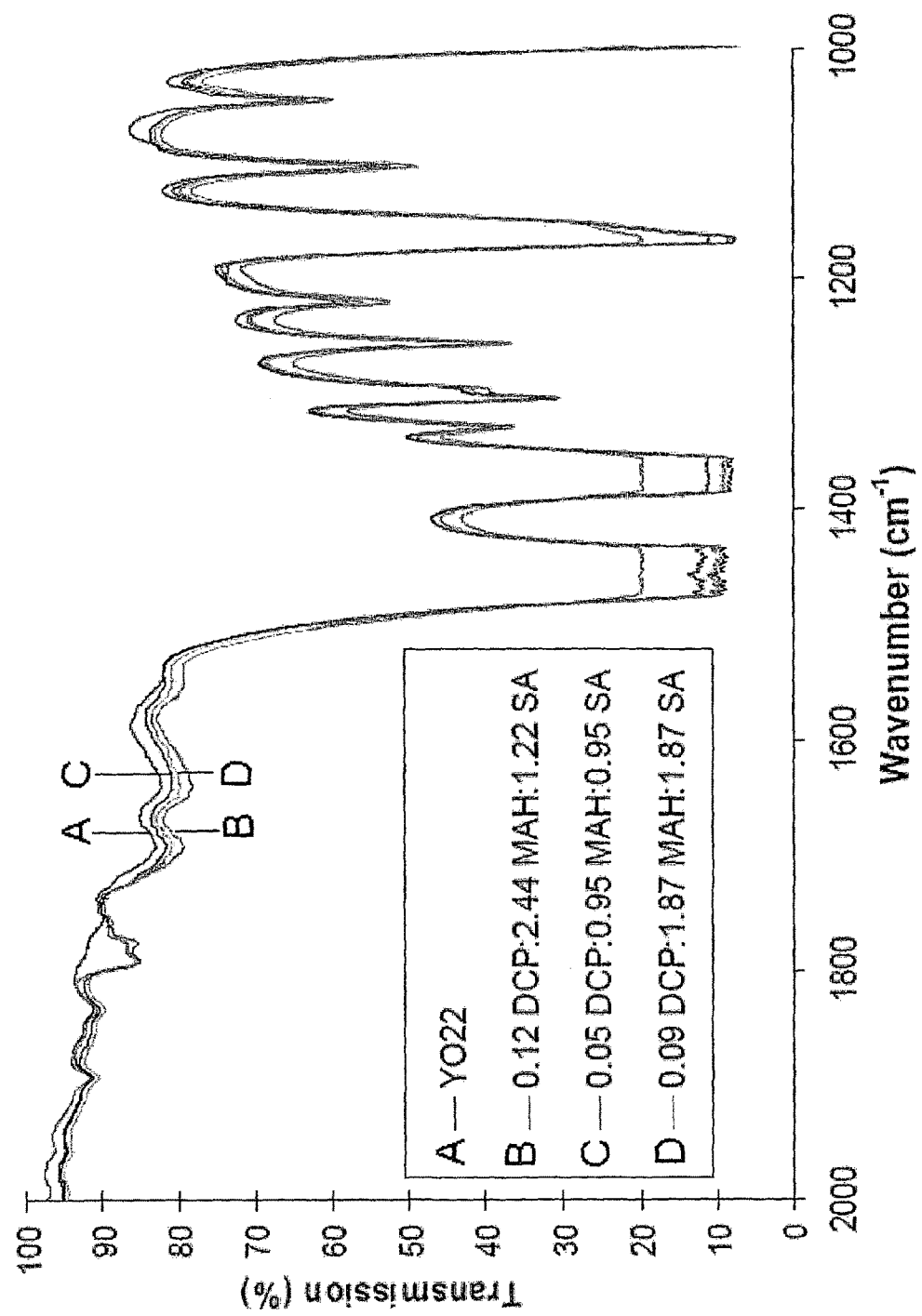
FIG. 11 shows the FTIR spectrum of the unmodified Y022 polypropylene against the FTIR spectra of Y022 polypropylene samples grafted with MAH, prepared by varying the amount (wt %) of the dicumyl peroxide (DCP) initiator, the MAH (maleic anhydride) and stearamide (SA).
Figure 12:
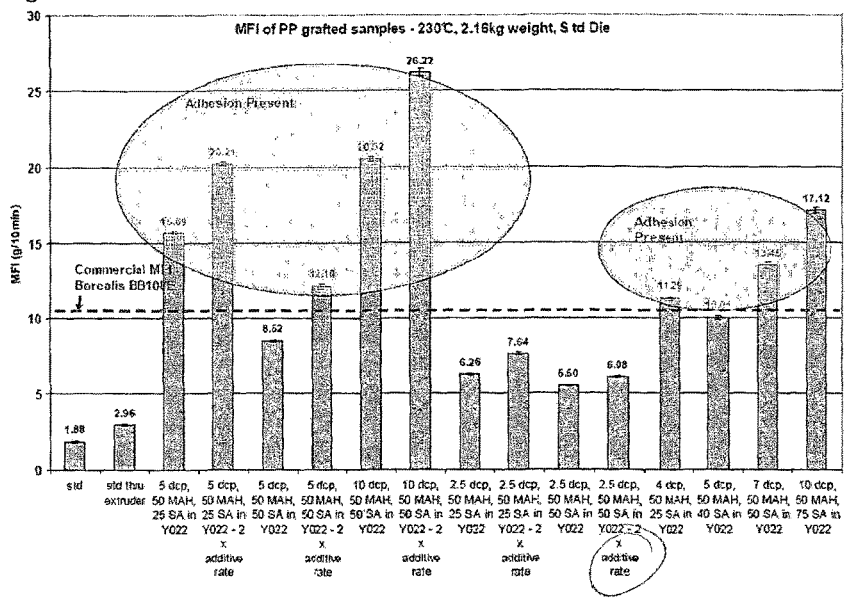
FIG. 12 shows a chart comparing the MFI values of the polypropylene adhesive samples. The samples that displayed adhesive properties are annotated on the chart. "std" refers to unmodified polypropylene. "std thru extruder" refers to unmodified polypropylene put through the extruder without modification. The remaining samples were prepared by varying the amount (wt %) of the dicumyl peroxide (DCP) initiator, the MAH (maleic anhydride) and stearamide (SA), and varying the rate of addition of additives.

To compare the results semi-quantitatively, the FTIR spectra in FIGS. 9 to 11 were normalized using the peak at about 1150 cm$^{-1}$ as reference. This peak was selected because it is considered to be part of the polymer backbone and therefore not expected to undergo any changes. Once normalized, the spectra were offset so that the baselines of the carbonyl peaks were consistent with each other.

As can be seen from FIG. 9, when the amounts of the DCP, MAH and SA were doubled and the residence time was kept constant, the peak around the 1800 cm$^{-1}$ wavelength region showed significantly higher absorbance. This suggests that a higher percentage of MAH was bonded successfully to the YO22 polypropylene polymer, which in turn leads to better adhesive strength. In contrast, when the screw speed was increased (which resulted in a reduction of the residence time and thus the available reaction time), no observable changes in the grafting efficiency was seen when the concentrations of the reactants were doubled. In fact, for the sample with higher concentrations of reactants, reduced residence time resulted in a reduction in the size of the peak.

As shown in FIG. 10, reducing the initiator and co-agent concentrations led to a reduction in the size of the peak at about 1800 cm$^{-1}$. Accordingly, reducing the wt % of these two parameters leads to a decrease in grafting efficiency.

As shown in FIG. 11, further reducing the initiator and MAH concentrations while increasing the concentration of the stearamide co-agent resulted in comparatively poor levels of grafting as reflected by the small peak sizes.

(b) Peel Test

Quantitative peel tests results could not be obtained for the polypropylene adhesives samples because when positive adhesive qualities were present, the brittleness of the topcoat led to cracking and/or splintering of the top coat before adhesive cohesive failure could occur. Hence, the peel test could only be qualitative in nature. The samples which resulted in positive adhesive qualities are as indicated in FIG. 12.

(c) MFI Data

FIG. 12 also shows the MFI values of the different polypropylene adhesive samples prepared by varying the amounts (wt %) of dicumyl peroxide (DCP) initiator, the MAH (maleic anhydride), stearamide (SA), and the rate of addition of additives. The MFI was seen to vary from sample to sample and is indicative of the level of degradation/chain scission that occurred during processing. The samples with MFIs higher than the commercial benchmark (Borealis BB108E) all also displayed adhesive properties. It can also be seen that two formulations were developed—one with a high MFI of the order of 20 (that is, good grafting was achieved but higher levels of degradation occurred), and one with a lower MFI of the order of 12 (that is, good grafting was also achieved but lower levels of degradation occurred) that is comparable to the commercial benchmark. As can also be seen from FIG. 12 ("std thru extruder"), simply mixing and processing the unmodified polypropylene at elevated temperature without any modification also resulted in some level of degradation. Hence, some degree of degradation is inevitable during modification.

Example 5

Scale-Up Production of Polyethylene Adhesive (a) Sample Preparation

Two 200 kg batches (pre-trial samples) of MAH-grafted polyethylene adhesive were prepared, both with and without the antioxidant package of chemicals that are typically used, according to the compositions as shown in Table 2 below.

Each 200 kg batch was prepared by blending multiple batches in a 25 kg capacity speed mixer for 1 min at low speed (55 rpm), 1 min at high speed (90 rpm) and 1 min again at low speed (50 rpm).

To prepare a two tonne batch of MAH-grafted polyethylene adhesive based on Formulation 2 in Table 2, a different method of mixing was used, hereinafter referred to as the manual bag transfer mixing method (MBTM). The additives were first mixed in the 25 kg capacity speed mixer with an equal quantity of polyethylene powder for three minutes. The mixture was then added to polyethylene powder in a bulk storage bag for a total mass of 500 kg. To allow further mixing, the polymer blend was transferred from bag to bag by pouring from a height of about 1 m to mix the components. During the transfer to the bag underneath, further mixing was achieved through manual intervention using a shovel. This process was repeated four times before mixing was considered complete.

TABLE 2

Compositions of samples in scale-up production of polyethylene adhesive

| Components | Formulation 1 | | Formulation 2 | |
|---|---|---|---|---|
| | Mass (Kg) | (%) | Mass (Kg) | (%) |
| ETILINAS LL0209AA (powder) | 24.51 | 97.71 | 24.47 | 97.56 |
| Maleic anhydride | 0.457 | 1.82 | 0.457 | 1.82 |
| Luperox 75A (di benzoyl peroxide) | 0.0093 | 0.037 | 0.0093 | 0.037 |
| Calcium stearate | 0.025 | 0.10 | 0.025 | 0.10 |
| Phosphite(Irgafos 168) | — | — | 0.025 | 0.10 |
| Phenolic(Irganox 1010) | — | — | 0.013 | 0.05 |

(b) Reactive Modification

Figure 13:
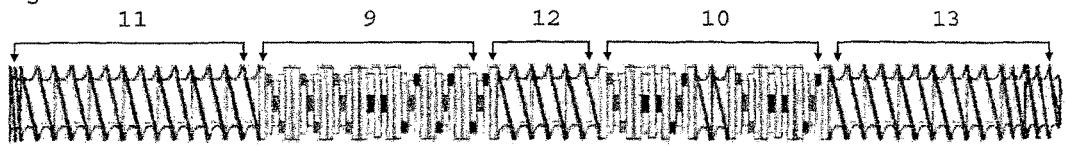
FIG. 13 shows the screw design of the extruder used for the industrial scale production of the polyethylene and polypropylene adhesives.

Reactive modification was performed using a Coperion twin screw ZSK50MC (L/D40) reactive extruder. The screw design is shown in FIG. 13. As with the screw used in the laboratory scale experiment (shown in FIG. 1), the screw (8) in FIG. 13 also has two mixing zones (9, 10) interspersed between conveyance regions (11, 12, 13). Each mixing zone in the screw used is made up of regions to facilitate forward, neutral and reverse mixing directions. In this way, the level of mixing between the polymer reactants was optimized, which optimized reaction between the polymer reactants.

The extrusion conditions for both pre-trial and trial production formulations were as follows:
Torque: 81%
Output rate: 150 kg/hour
Pressure: 46 bar
Melt temperature: 239° C.
Screw speed: 280 rpm
Heat zones: 180, 185, 190, 195, 200, 205, 210, 215, 220, 230° C.

(c) FTIR Analysis

Figure 14:
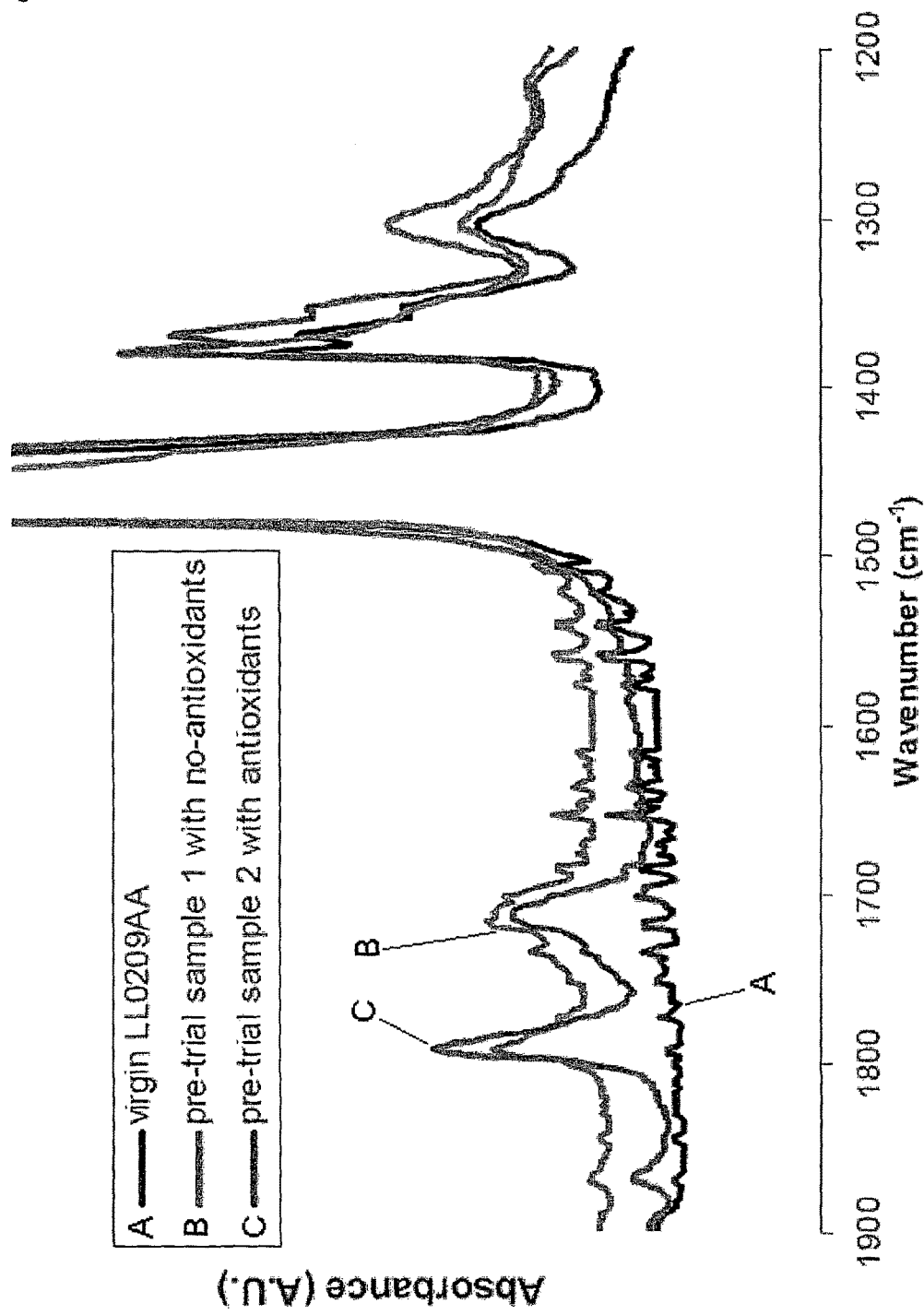
FIG. 14 shows the FTIR spectra of the polyethylene pre-trial product samples.

The FTIR spectra of the pre-trial samples prepared above are shown in FIG. 14. It can be seen that good grafting was achieved as evidenced by the strong carbonyl stretching peak derived from the MAH at 1780 cm$^{-1}$. The presence of anti-oxidants not only did not interfere with the level of grafting, but increased the level of grafting slightly.

Figure 15:
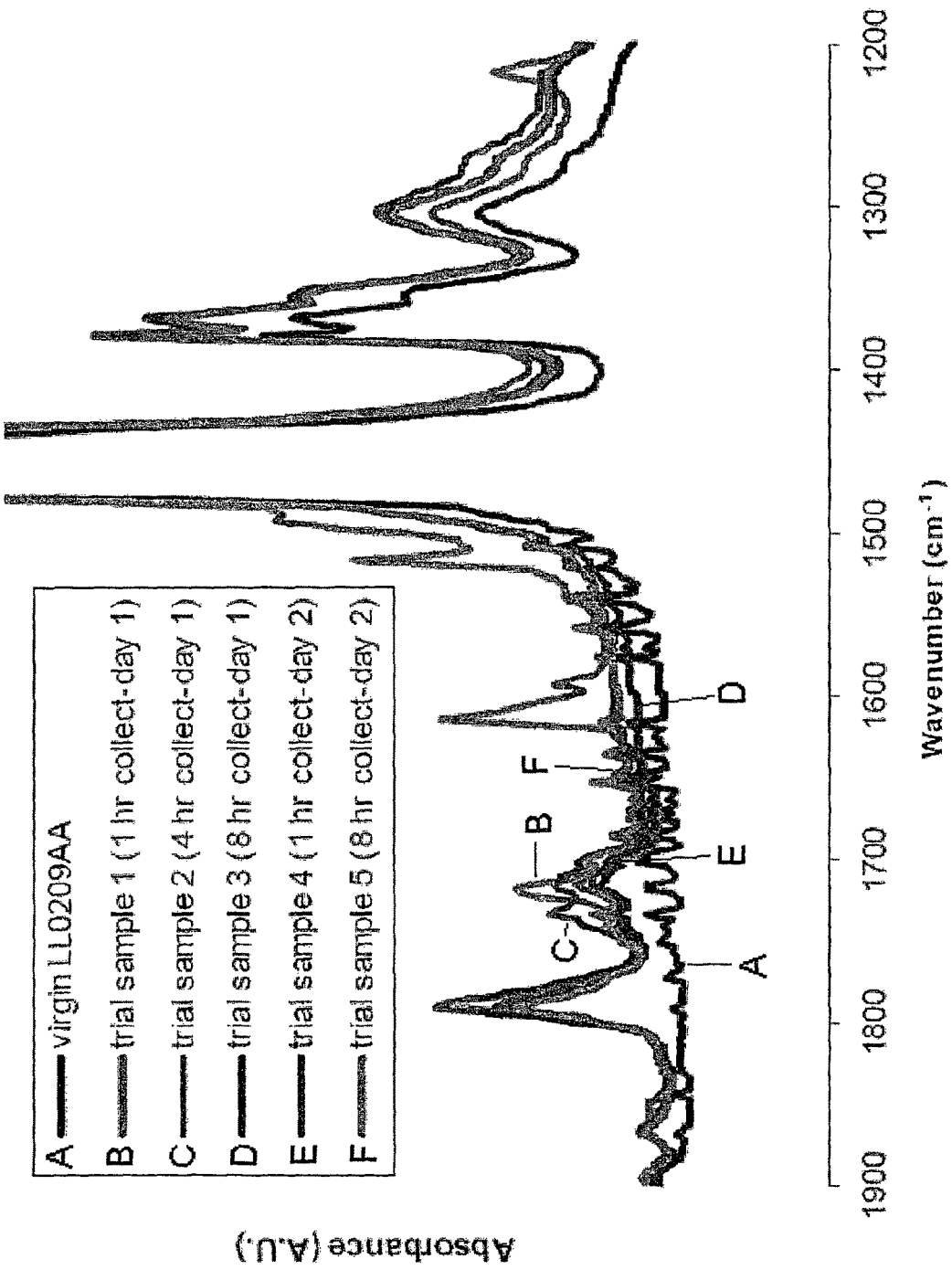
FIG. 15 shows the FTIR spectra of the polyethylene product samples taken at various time periods during processing (1 hr, 4 hr and 8 hr on day 1, 1 hr and 8 hr on day 2).
Figure 16:
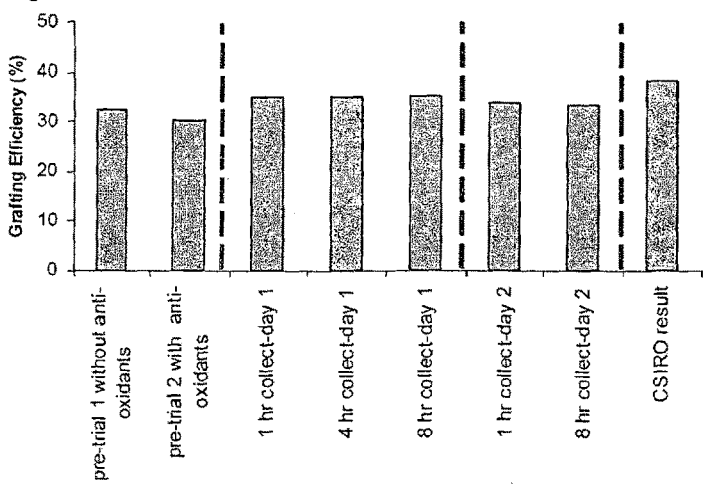
FIG. 16 shows a chart comparing the grafting efficiency of the unmodified polyethylene against those of the modified samples taken at various time periods during processing.

The anti-oxidant based formulation was scaled up to prepare 1.9 tonnes of polyethylene adhesive ("trial samples"). Samples were collected throughout the extrusion process and the FTIR spectra on the samples are shown in FIG. 15. Like the pre-trial systems, the level of grafting appears very good with all "trial" samples exhibiting very strong MAH carbonyl stretching peaks at about 1780 cm$^{-1}$. This was confirmed by comparison with virgin unmodified polymer (with no grafting). The grafting was consistent throughout the extrusion process as can be seen in FIG. 16.

(d) MFI Analysis

Figure 17:
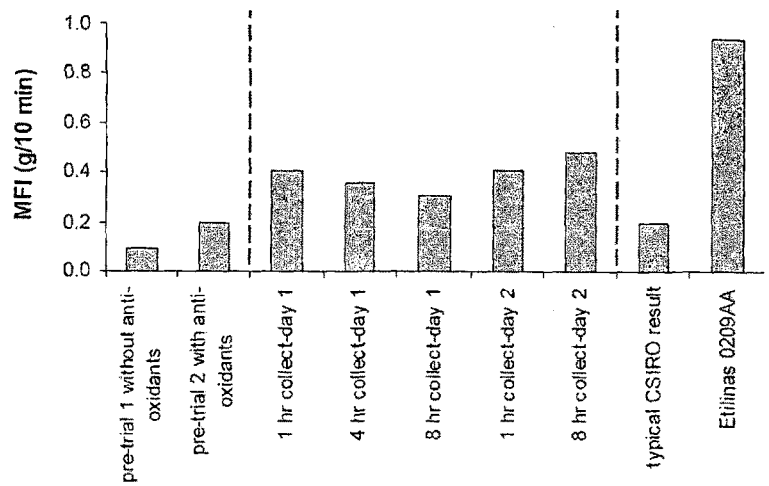
FIG. 17 shows the MFI values of the polyethylene samples collected during processing.

Analysis of the MFI of each sample was performed to monitor the extent of polymer degradation during processing. The results are shown in FIG. 17, which show chemical reactive modification having occurred in the extruder barrel. The MFI value of a virgin polymer (unmodified) was MFI of 0.94 while the MFI values of the grafted adhesive samples ranged from about 0.20 to about 0.50.

(e) Adhesion Performance

Figure 18:
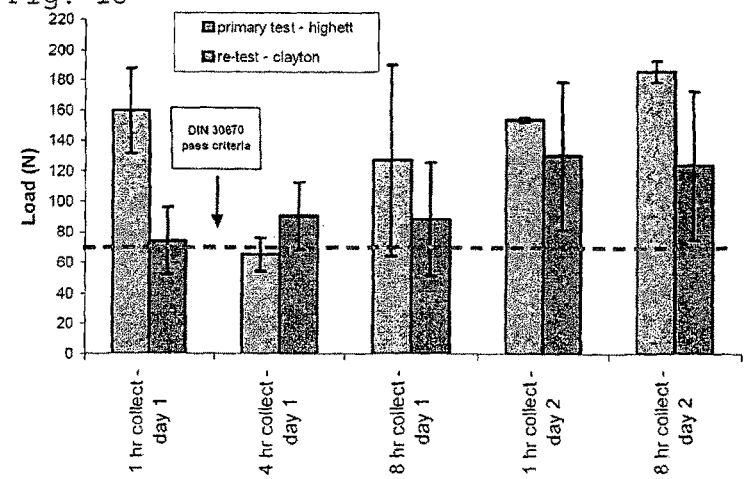
FIG. 18 shows the adhesion strength results for various polyethylene product samples.

The adhesion strength between the primer layer and the topcoat layer is an important measure of adhesive performance. The results of peel tests on the production trial samples are shown in FIG. 18. All samples displayed good adhesive performance and are typically well above the required DIN 30670 industry standard. Two tests were used—a primary test using a floating roller test fixture and a re-test using the peel test.

Example 6

Scale-Up Production of Polypropylene Adhesive (a) Sample Preparation and Reactive Modification A 100 kg pre-trial batch based on the polypropylene formulation shown in Table 3 below was prepared using the same manual method as previously described above for the preparation of the polyethylene adhesive in Example 5.

TABLE 3

Compositions of samples in scale-up production of polypropylene adhesive

| Component | Mass (kg) | (%) |
|---|---|---|
| YO22 | 489.35 | 97.87 |
| Dicumyl peroxide | 0.6 | 1.2 |
| Maleic anhydride | 4.4 | 0.88 |
| Stearamide | 4.4 | 0.88 |
| Calcium stearate | 0.5 | 1.0 |
| Phosphite (Irgagos 168) | 0.5 | 1.0 |
| Phenolic (Irganox 1010) | 0.25 | 0.05 |

The following processing conditions were used for reactive modification of the pre-trial batch:
  Heating zones: 180, 185, 190, 195, 200, 200, 210, 210, 210, 215° C.
  Melt Temperature: 209° C.
  Screw speed: 320 rpm
  Torque: 77%
  Melt pressure: 29 Bar
  Output: 250 kg/hr A 1 tonne batch of the same formulation was prepared via 2×500 kg batches and was prepared according to the MBTM method as described above. The extrusion conditions used at the beginning of the production run were:
  Heating zones: 155, 155, 160, 160, 160, 160, 160, 175, 210° C.
  Melt Temperature: 174° C.
  Screw speed: 160 rpm
  Torque: 65%
  Melt pressure: 11 Bar
  Output: 110 kg/hr Under the above conditions, good processing of the polypropylene was observed, which occurred rapidly at about 200 kg/hr.

(b) MFI Analysis

A sample of the polypropylene adhesive at the end of the pre-trial was taken for MFI measurement and FTIR analysis. During the production run, several samples were taken at different stages of the process and at different processing conditions, and the MFI measured. Table 4 below shows the number of samples collected during production of the polypropylene adhesive showing the time the sample was collected, the MFI and the key extrusion parameters changed during the production run.

TABLE 4

Samples collected during production of polypropylene adhesive showing the times at which the samples were collected, the MFI values and the key processing parameters changed

| Sample | Collection Time (hr) | Key extrusion condition changed | MFI (g/10 min) |
|---|---|---|---|
| Pre-trial | 1 | — | 19.6 |
| Production sample 1 | 1 | * | 37.61 |
| Production sample 2 | 3 | (no change) Screw speed = 160 rpm | 24.53 |
| Production sample 3 | 3.5 | (no change) Screw speed = 160 rpm | 31.67 |
| Production sample 4 | 4 | Output - 170 kg.hr; Screw speed = 200 rpm; Melt temp. = 179° C. | 22.39 |
| Production sample 5 | 4.5 | Output = 200 kg/hr; Screw speed = 235 rpm | 22.05 |
| Production sample 6 | 1 hr (day 2) | Output = 200 kg/hr; Screw speed = 235 rpm | 31.37 |
| Production sample 7 | 1.5 hr (day 2) | Output = 200 kg/hr; Screw speed = 235 rpm | 23.48 |

* Sample was dried in an oven beforehand at 100° C. and may have affected the run. A second sample was collected after 2 hrs using the sample extrusion conditions and the MFI was 24.53.

The MFI of the pre-trial sample was 19.6, compared to 2.9 for the unmodified YO22 polypropylene formulation. The increase in MFI indicates some polymer degradation is inevitable when the polypropylene undergoes grafting.

(c) FTIR Analysis

Figure 19:
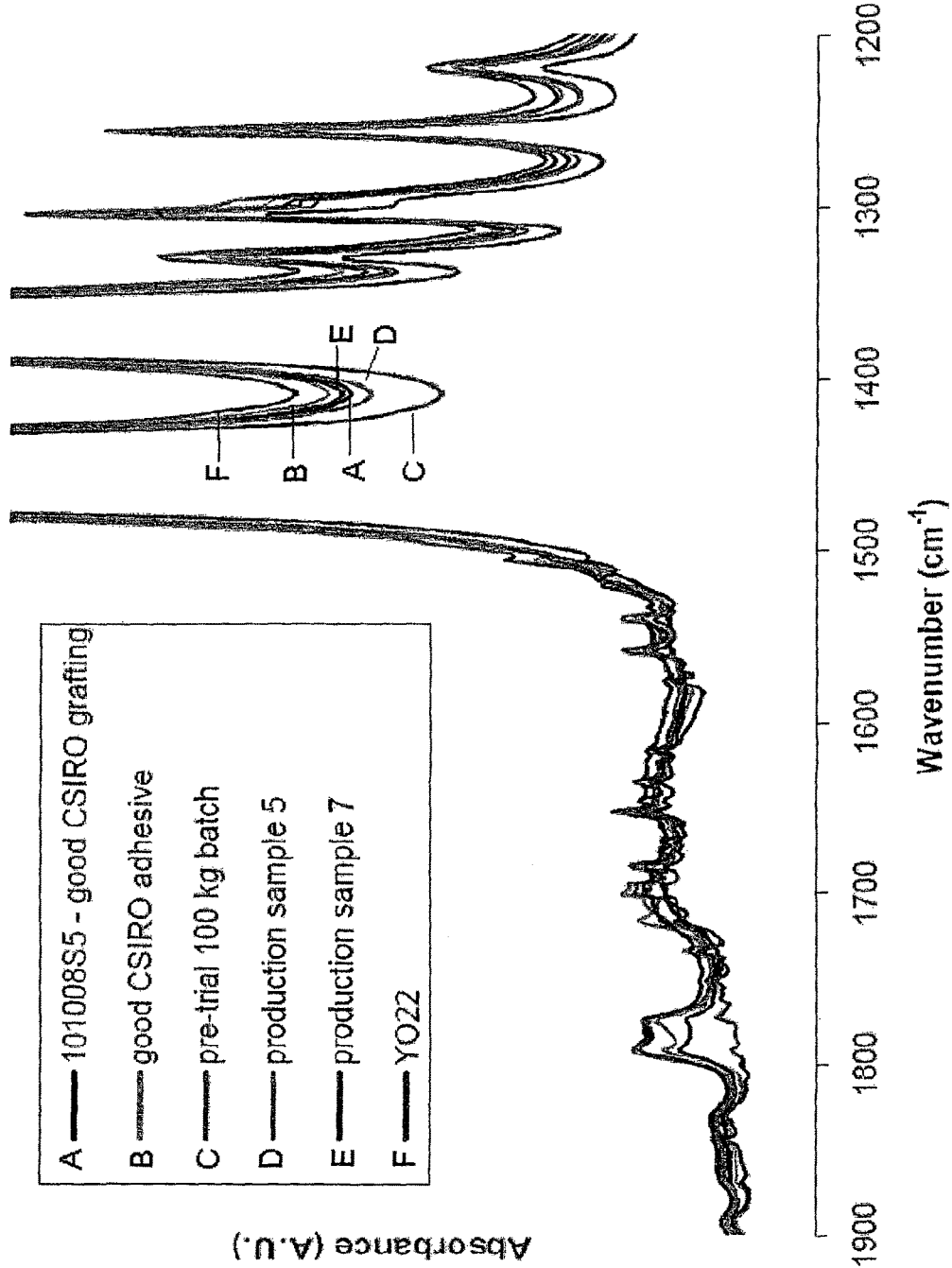
FIG. 19 shows the FTIR spectra obtained for comparative "grafting" sample (101008S5), comparative "adhesive" sample, pre-trial 100 kg batch, the production sample 5, the production sample 7, and Y022 polypropylene.

The samples for FTIR analysis were taken from the pre-trial 100 kg batch, the trial production run 5, and the trial production run 7. The data is shown in FIG. 19, which compares these samples to two comparative samples exhibiting good grafting and good adhesion properties—comparative "grafting" sample (101008S5) and comparative "adhesive" sample. Grafting was seen to have occurred for all samples, as evidenced by the presence of MAH peaks at about 1780 cm$^{-1}$. In all cases, the polypropylene adhesive samples were normalized against an internal standard peak at 1260 cm$^{-1}$ and then offset for clarity if necessary. The peaks from the production trial samples are also similar in size to the two comparative samples exhibiting good grafting, indicating comparable levels of grafting has been achieved. The two samples also exhibited good adhesion. The results were also compared to the unmodified YO22 polypropylene which did not undergo grafting and exhibited poor adhesion. Hence, despite some degree of degradation, which is inevitable, a good level of grafting and adhesion was still achieved.

Figure 20:
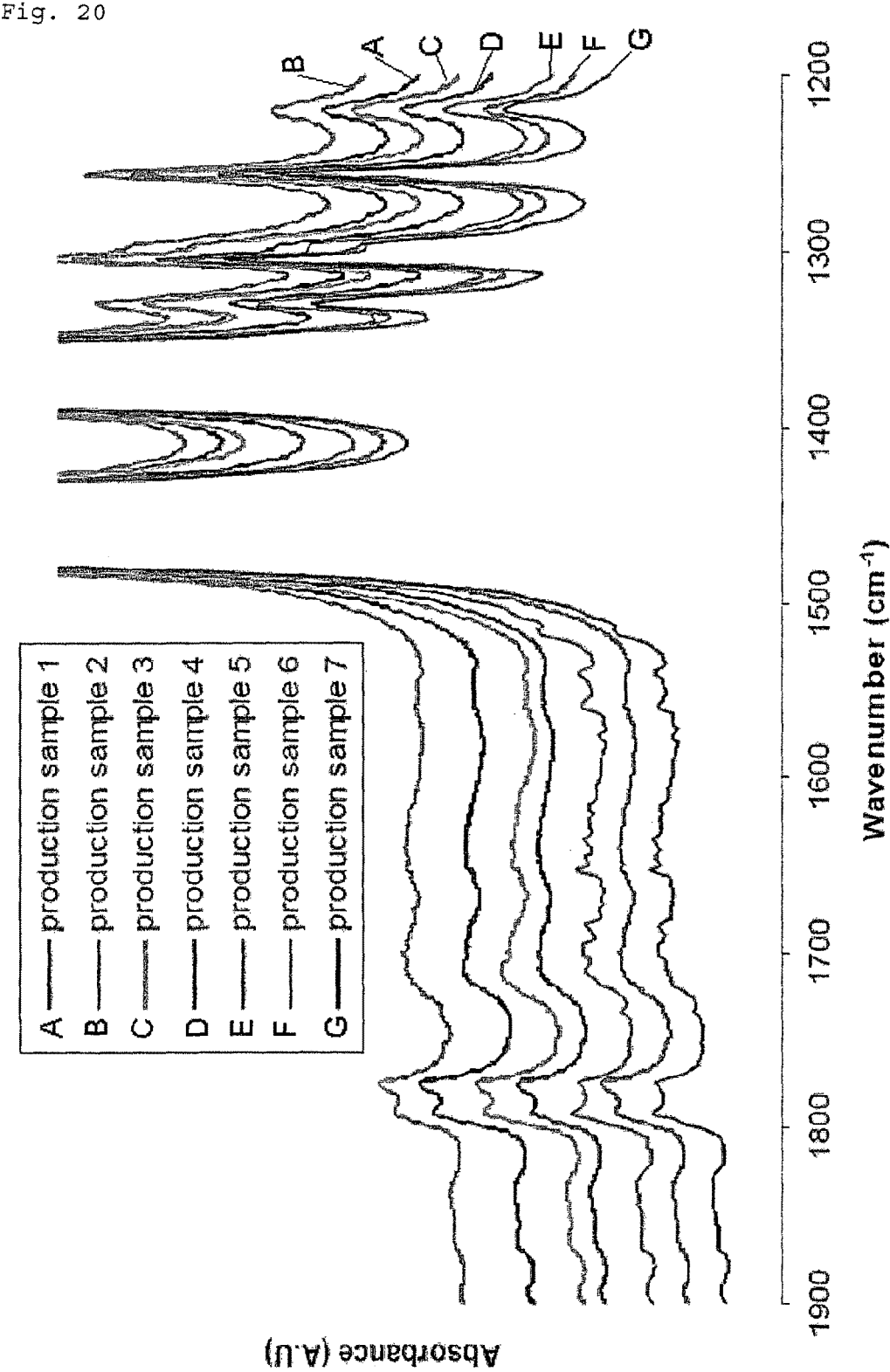
FIG. 20 shows the FTIR spectra obtained for all of the polypropylene production samples 1 to 7.

FIG. 20 compares the level of grafting for all of the production run samples. After normalizing against the internal standard (and offsetting for clarity), the level of grafting for each sample appears similar. This provides validation of the consistency and quality of the processing conditions used to perform the grafting.

(d) Adhesion Performance

Figure 21:
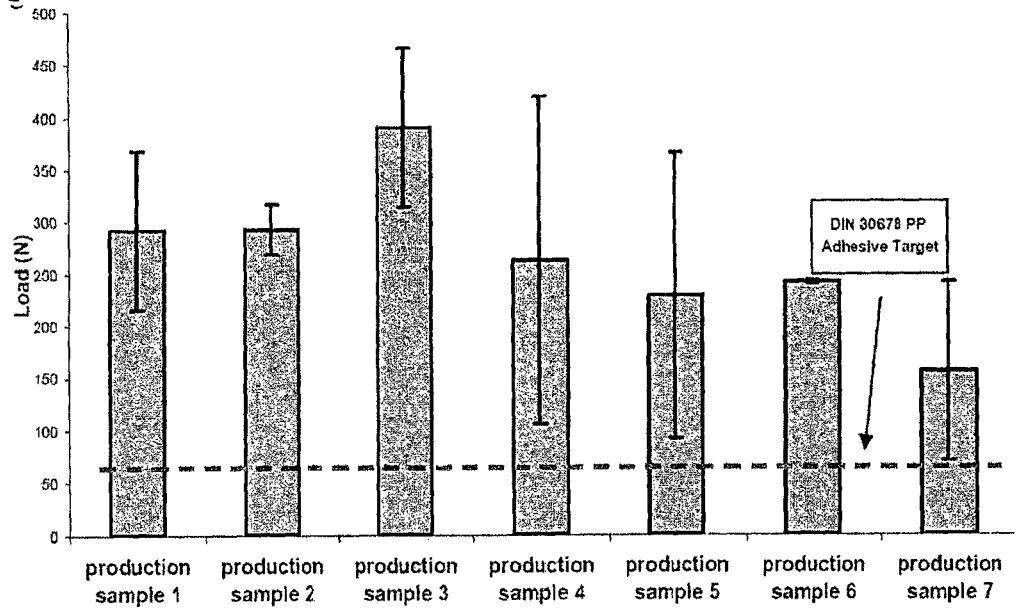
FIG. 21 shows the adhesion test results obtained for all of the polypropylene production samples 1 to 7.

Peel adhesion measurements of the grafted polypropylene were determined using the peel test. All measurements are an average from three coupons. As can be seen from FIG. 21, excellent adhesion was achieved with all the production run samples, which was well above the target adhesion value of the DIN 30678 PP industry standard.

Example 7

Blending with Self-Healing Agent (a) Characterization of Healing

Nucrel 2940, a polyethylene-co-methacrylic acid copolymer, was tested as the healing agent. 2 wt % Luperox and MAH were fed from a micro-hopper (or feeder) and combined with ETILINAS LL0209AA polyethylene (LLDPE) fed from a separate hopper at the same time in a twin screw extruder. 5 wt % Nucrel 2940 was added in a second extrusion run through a single screw extruder to form 5 wt % Nucrel-modified MAH-grafted LLDPE. The healing agent (Nucrel 2940) was then blended with the 5 wt % Nucrel-modified MAH-grafted LLDPE at ratios of 2:1, 1:1 and 1:2 by weight in a third extrusion run through the single screw extruder under the following conditions:
- Single Screw Extruder Type: AXON ab PLASTMASKINER SINGLE SCREW COMPOUNDER: L:D ratio of 38:1, 18 mm Screw Diameter, 3 mm strand diameter die
- Melt Temperature: 230-236° C.
- Temperature Profile (Zones 1 to 6): 170° C., 175° C., 180° C., 180° C., 180° C., 180° C.
- Melt Pressure: 596-745 PSI
- Screw Speed: 72 rpm
- Motor Current: 0.1 Amp Using the above method, all the components were melted together and upon cooling, form a self-healing adhesive blend with a microstructure where the healing agent is dispersed as particles within the 5 wt % Nucrel-modified MAH-grafted LLDPE.

The self-healing adhesive blend was then used as the adhesive layer between a topcoat layer and a primer layer in a coating for the peel test coupons. The coupons were subjected to consecutive peel tests. After the first peel test, the topcoat was put back onto the primer surface and held in place using a clamp with up to 120 N force and then heated to 110° C. for 1 hr before the coupon was subjected to the next peel test. Healing efficiency was determined by comparing the initial peak load prior to crack propagation of the virgin material against the peak load of the healed material.

Figure 22A:
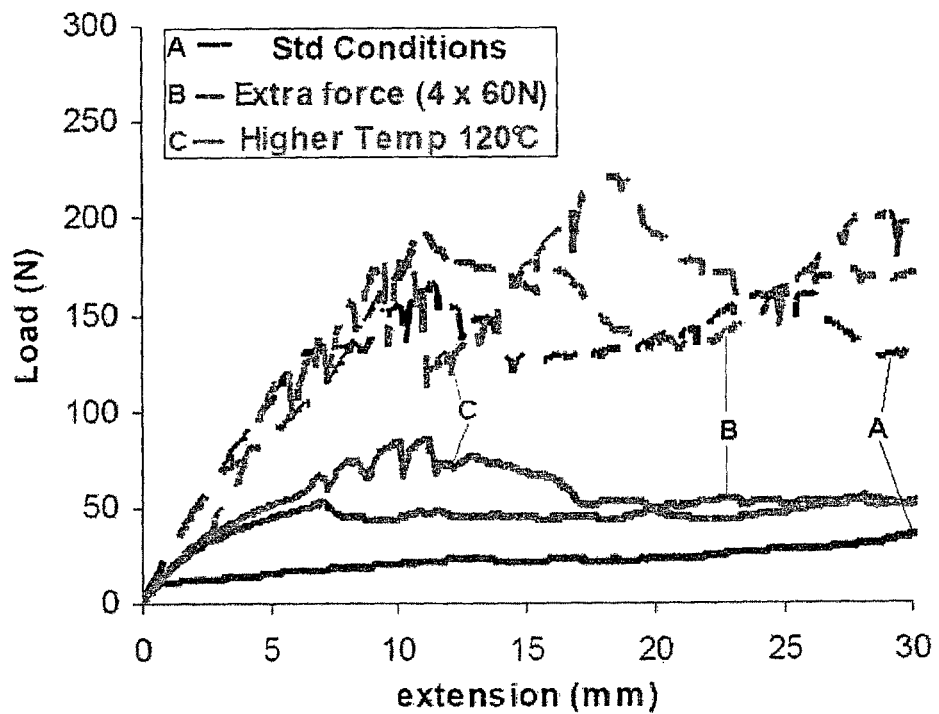
FIG. 22a shows the load versus extension data for the sample of Nucrel 2940 blended with the 5 wt % Nucrel-modified maleic anhydride grafted in a 2:1 ratio.
Figure 22B:
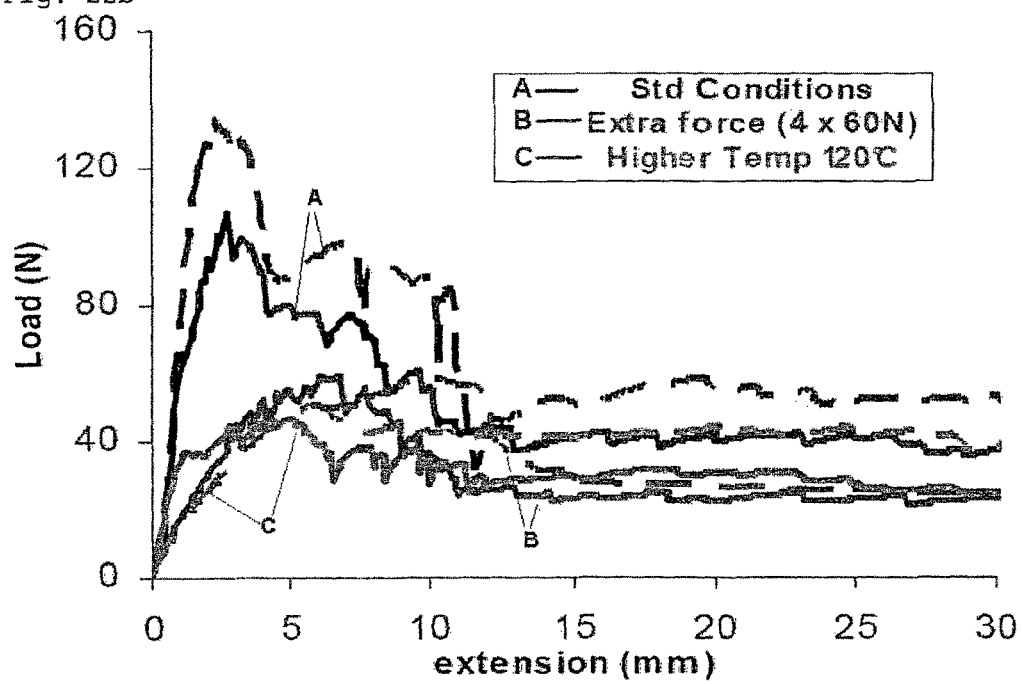
FIG. 22b shows the load versus extension data for the sample of Nucrel 2940 blended with the 5 wt % Nucrel-modified maleic anhydride grafted in a 1:1 ratio.
Figure 22C:
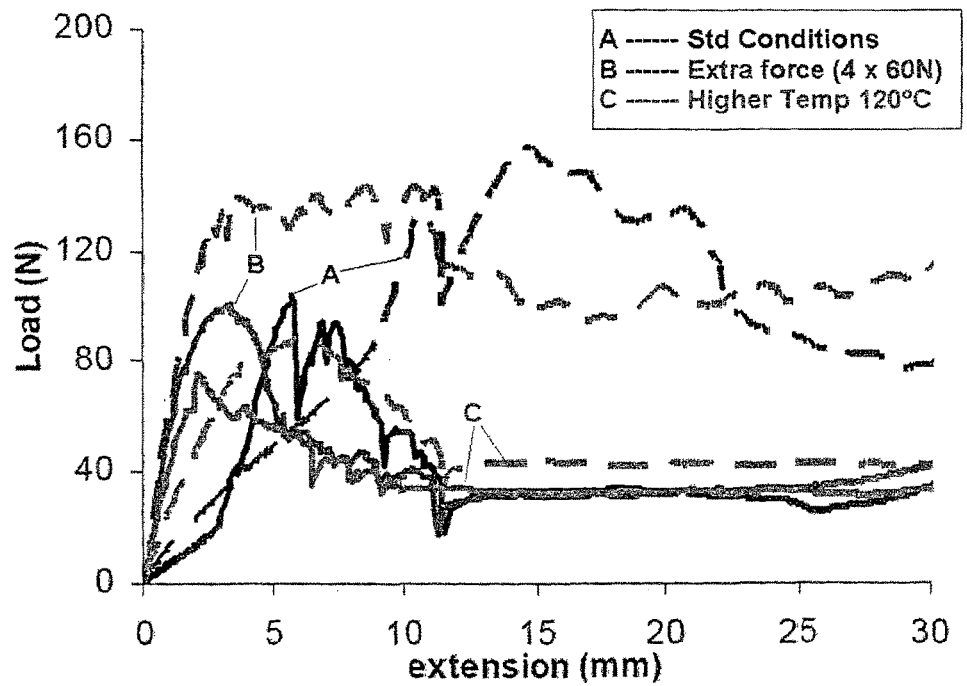
FIG. 22c shows the load versus extension data for the sample of Nucrel 2940 blended with the 5 wt % Nucrel-modified maleic anhydride grafted in a 1:2 ratio.

The conditions above were varied by increasing the clamping pressure to 240 N as well as heating the topcoat to 120° C. for 1 hr. The data is shown in FIGS. 22(a), (b) and (c) for the 1:2, 1:1 and 2:1 (healing agent:grafted adhesive) formulations. A summary of the results is also set out in Table 5.

TABLE 5

Healing results at various ratios of healing agent:grafted adhesive and various healing methods

| Formulation (Healing agent:LLDPE) | Healing method | Load Virgin | Load Healed | Efficiency |
|---|---|---|---|---|
| 1:2 | Standard | 166.2 | 23.1 | 13.9 |
| 1:2 | Increased Pressure | 193.7 | 51.7 | 26.7 |
| 1:2 | Increased temperature | 220.6 | 85 | 38.5 |
| 1:1 | Standard | 156.7 | 103.4 | 66.0 |
| 1:1 | Increased Pressure | 138.3 | 100.5 | 72.7 |
| 1:1 | Increased temperature | 88.48 | 73.9 | 83.5 |
| 2:1 | Standard | 131.3 | 107.1 | 81.6 |
| 2:1 | Increased Pressure | 57.9 | 57.5 | 99.7 |
| 2:1 | Increased temperature | 50.6 | 46.3 | 91.5 |

Standard conditions: 120N force applied and heated to 110° C. for 1 hr
Increased pressure: 240N force applied and heated to 110° C. for 1 hr
Increased temperature: 120N force applied and heated to 120° C. for 1 hr From the above results, it can be seen that:
1) increasing temperature and pressure increased the healing efficiency to almost 100% if higher concentrations of the healing agent is used;
2) increasing temperature resulted in a larger beneficial effect because a slight increase of 10° C. from 110° C. to 120° C. increased healing efficiency from 13.9 to 38.5 (1:2 formulation) and from 66.0 to 83.5 (1:1 formulation), while doubling the pressure from 120N to 240N only increased the healing efficiency from 13.9 to 26.7 (1:2 formulation) and from 66.0 to 72.7 (1:1 formulation);
3) increasing the concentration of the healing agent had a significant impact on healing efficiency;
4) increasing the pressure only significantly increased the healing efficiency if the concentration of the healing agent was higher than that of the grafted adhesive.

Figure 23:
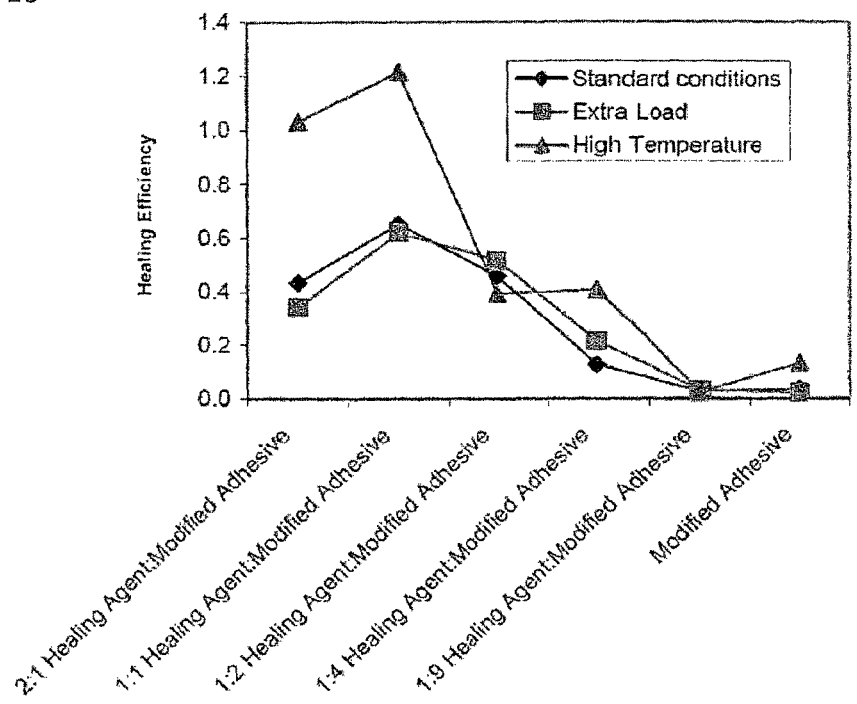
FIG. 23 shows the healing efficiency for various formulations with varying ratios of Nucrel 2940 (healing agent) to modified adhesive from 2:1 to 1:9, and without addition of Nucrel 2940, under conditions of elevated temperature ("High Temperature") or pressure ("Extra Load").

FIG. 23 shows the results of healing efficiency for a range of formulations with varying concentrations of the healing agent (Nucrel) and healing conditions. A continuous decrease in healing was observed as the level of healing agent was reduced. This was regardless of the healing conditions. No healing was achieved in the absence of the healing agent (Nucrel).

Figure 24:
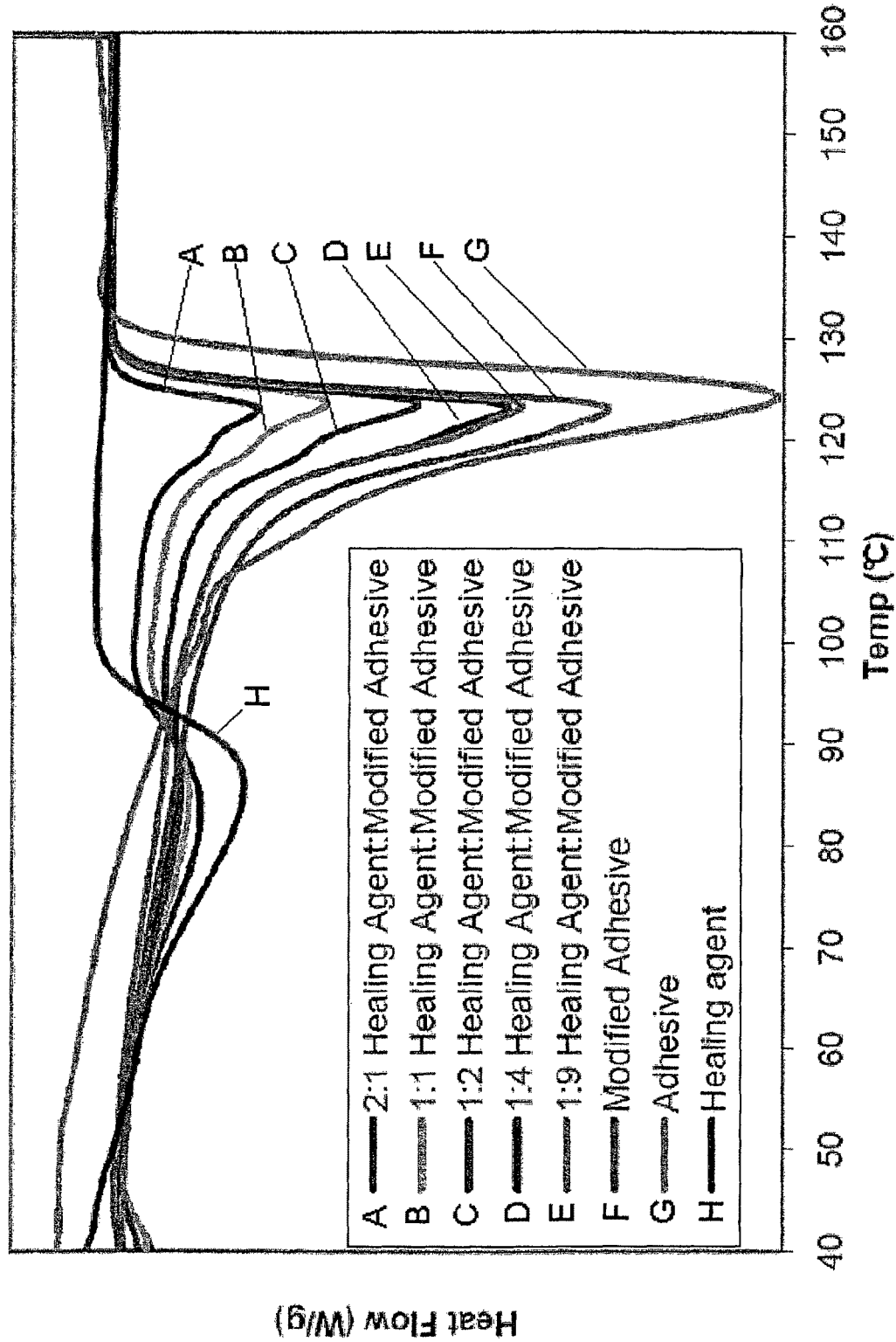
FIG. 24 shows the Differential Scanning calorimetry (DSC) thermograms for the formulations with varying ratios of Nucrel 2940 (healing agent) to modified polyethylene adhesive from 2:1 to 1:9, and without addition of Nucrel 2940.
Figure 25:
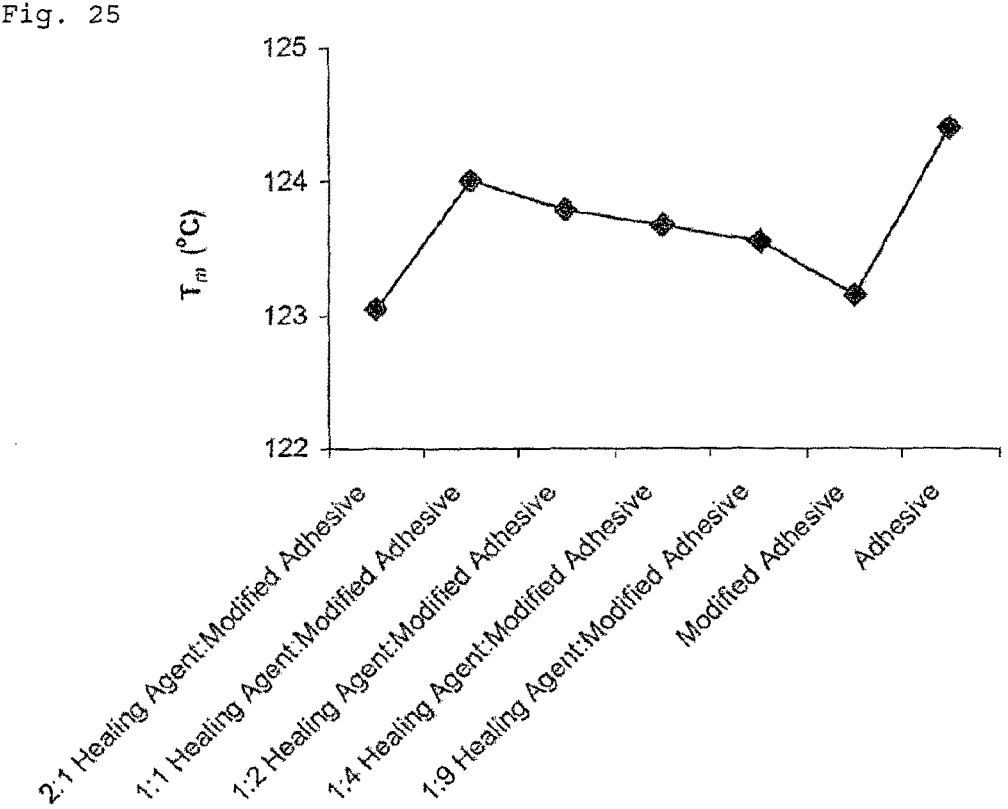
FIG. 25 shows the DSC thermogram displaying the glass transition temperature for the formulations with varying ratios of Nucrel 2940 (healing agent) to modified polyethylene adhesive from 2:1 to 1:9, and without addition of Nucrel 2940.

Thermal analysis of the formulations was performed to elucidate the healing mechanism. FIG. 24 shows the results of differential scanning calorimetry (DSC) analysis. The addition of Nucrel 2940, which has a melting point of about 90° C., would have been expected to reduce the melting point of the grafted polyethylene significantly through blending. However, the DSC results in FIGS. 24 and 25 show that the glass transition temperature of the adhesive is relatively unaffected by blending. This indicates that plasticization of the adhesive did not occur. It is also seen that, as higher ratios of the healing agent was blended with the adhesive, there was an observable second endothermic region in the temperature range of 80° C. to 90° C. (FIG. 24). This indicates that the blended formulation exists as two separate immiscible phases.

Figure 26:
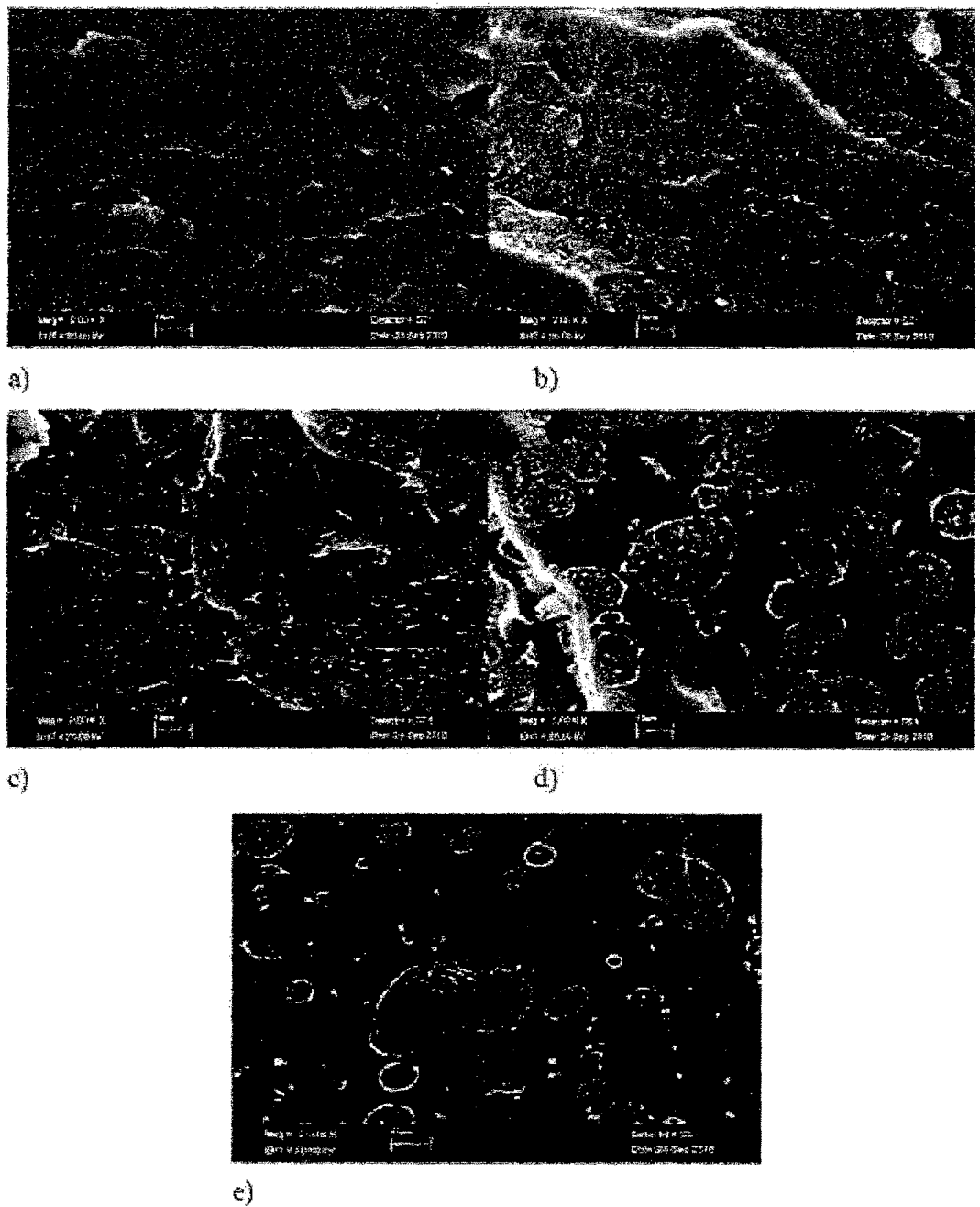
FIG. 26a shows a SEM image of the fractured surface of a modified adhesive wherein the ratio of healing agent: modified grafted LLDPE is 1:9.
FIG. 26b shows a SEM image of the fractured surface of the modified adhesive wherein the ratio of healing agent: modified grafted LLDPE is 1:4.
FIG. 26c shows a SEM image of the fractured surface of the modified adhesive wherein the ratio of healing agent: modified grafted LLDPE is 1:2.
FIG. 26d shows a SEM image of the fractured surface of the modified adhesive wherein the ratio of healing agent: modified grafted LLDPE is 1:1.
FIG. 26e shows a SEM image of the fractured surface of the modified adhesive wherein the ratio of healing agent: modified grafted LLDPE is 2:1.

The SEM images of FIG. 26 show the fractured surface of the same blends. These provide further support for the lack of plasticization and confirm the presence of a biphasic structure in the polymer formulation. The Nucrel 2940 is clearly not miscible with the grafted polyethylene as a two-phase microstructural morphology is present.

As a result of the biphasic system, it is envisaged that an increase in pressure due to expansion of the healing agent from heat and the external pressure applied drives the healing agent into a damaged zone to rejoin the two surfaces. This allows the healing of the damaged zone through a "pressure delivery mechanism", which is schematically shown in FIG. 27. As seen in FIG. 26, observation of the difference in surface roughness between the phase separated Nucrel particles and the grafted polyethylene suggests that the healing present in these systems may arise from the phase separated Nucrel particles adhering to both the primer and the topcoat layers. The phase separation of the Nucrel from the grafted polyethylene adhesive may have resulted in increased mobility during healing and supports the postulated "pressure delivery mechanism". The observation also suggests that the microstructure of large phase separated particles may facilitate a sufficient amount of the healing agent to flow into a damaged zone when a stimulus such as heat is applied.

(b) Additives

Pimelic acid and citric acid were tested as modifiers in the self-healing formulation. 2 wt % and 20 wt % of the Nucrel phase was replaced with the modifiers and healing of the interface was assessed. FIG. 28 shows the surfaces after healing for the 10 wt % modified samples compared with the unmodified "mendable" formulation. A plethora of bubbles on the surface of the modified samples were observed. In particular, very large bubbles were observed on the surface for the 10 wt % pimelic acid modified formulation.

Figure 29A:
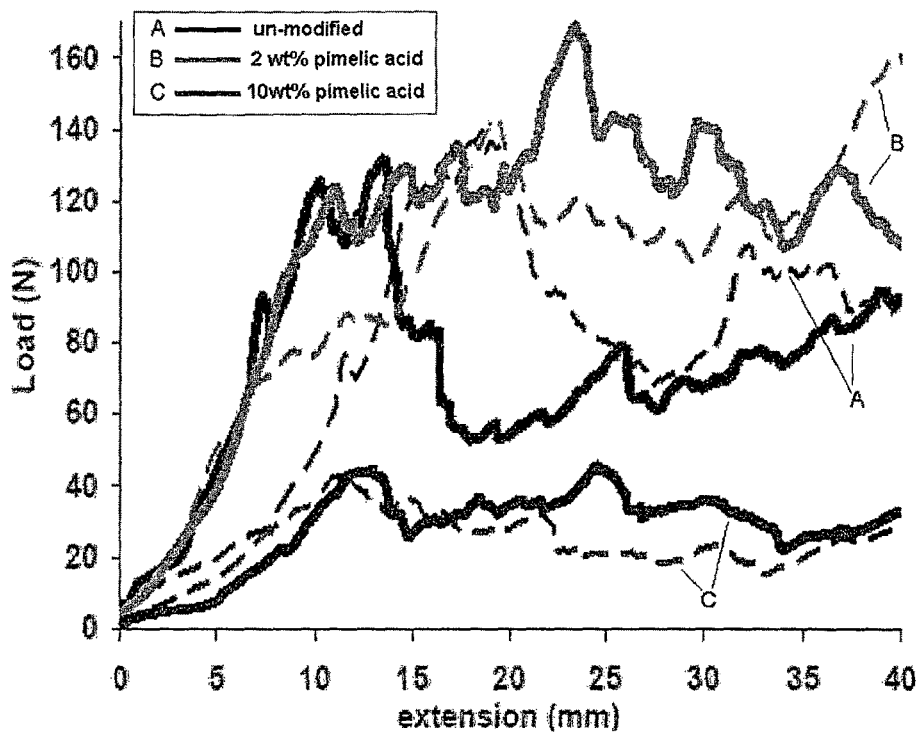
FIG. 29*a* shows the load versus extension data for the unmodified adhesive, and 2 wt % and 10 wt % pimelic acid modified adhesive formulation before and after healing.
Figure 29B:
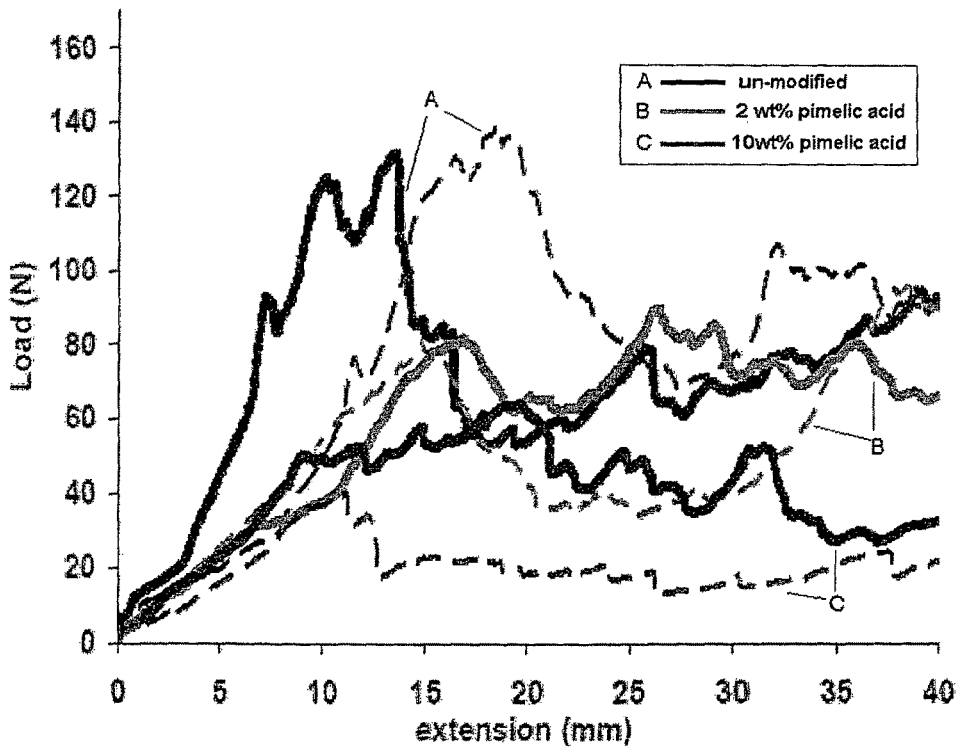
FIG. 29*b* shows the load versus extension data for the unmodified adhesive, and 2 wt % and 10 wt % citric acid modified adhesive formulation before and after healing.

The data showing the actual load versus extension before and after healing for the pimelic acid and citric acid modified systems are shown in FIGS. 29a and 29b, respectively. It can be observed that cohesive failure after healing was evident for each system as seen from the 2 wt % modified systems as shown in FIG. 30, which compares well with the unmodified adhesive.

Formulations where decreasing concentrations of the healing agent blended with the MAH-grafted polymer, and decreasing concentrations of healing agent blended with the MAH-grafted polymer which further comprised pimelic acid or citric acid were prepared as follows:

TABLE 6

Samples with varying concentrations of the Nucrel 2940 (healing agent) from 10 wt % to 67 wt %

| % Nucrel 2940 | % MAH-grafted polymer |
|---|---|
| 10 | 90 |
| 20 | 80 |
| 33 | 67 |
| 50 | 50 |
| 67 | 33 |

TABLE 7

Samples with varying concentrations of the Nucrel 2940 (healing agent) from 8 wt % to 50 wt %, and 2 wt % of pimelic acid

| % Nucrel 2940 | % Pimelic Acid | % Adhesive |
|---|---|---|
| 50 | 0 | 50 |
| 48 | 2 | 50 |
| 38 | 2 | 60 |
| 28 | 2 | 70 |
| 18 | 2 | 80 |
| 8 | 2 | 90 |

TABLE 8

Samples with varying concentrations of the Nucrel 2940 (healing agent) from 18 wt % to 50 wt %, and 2 wt % of citric acid

| % Nucrel 2940 | % Citric Acid | % Adhesive |
|---|---|---|
| 50 | 0 | 50 |
| 48 | 2 | 50 |
| 38 | 2 | 60 |
| 28 | 2 | 70 |
| 18 | 2 | 80 |
| 8 | 2 | 90 |

Figure 31:
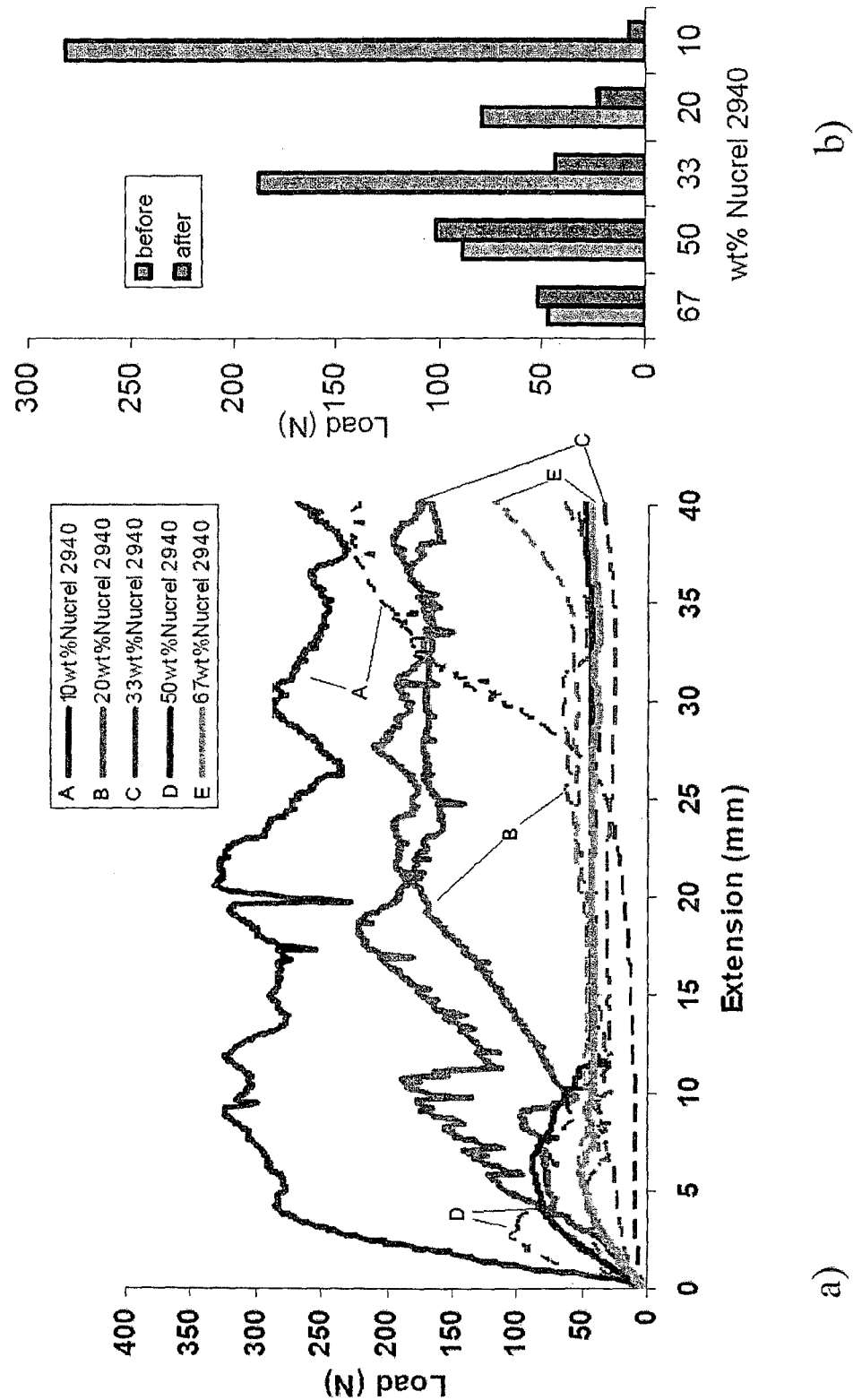
FIG. 31*a* shows the load versus extension data of samples before and after healing for formulations containing varying concentrations of the Nucrel 2940 (healing agent) from 10 wt % to 67 wt %.
FIG. 31*b* shows the peak load data for samples before and after healing for formulations containing varying concentrations of the Nucrel 2940 (healing agent) from 10 wt % to 67 wt %.
Figure 32:
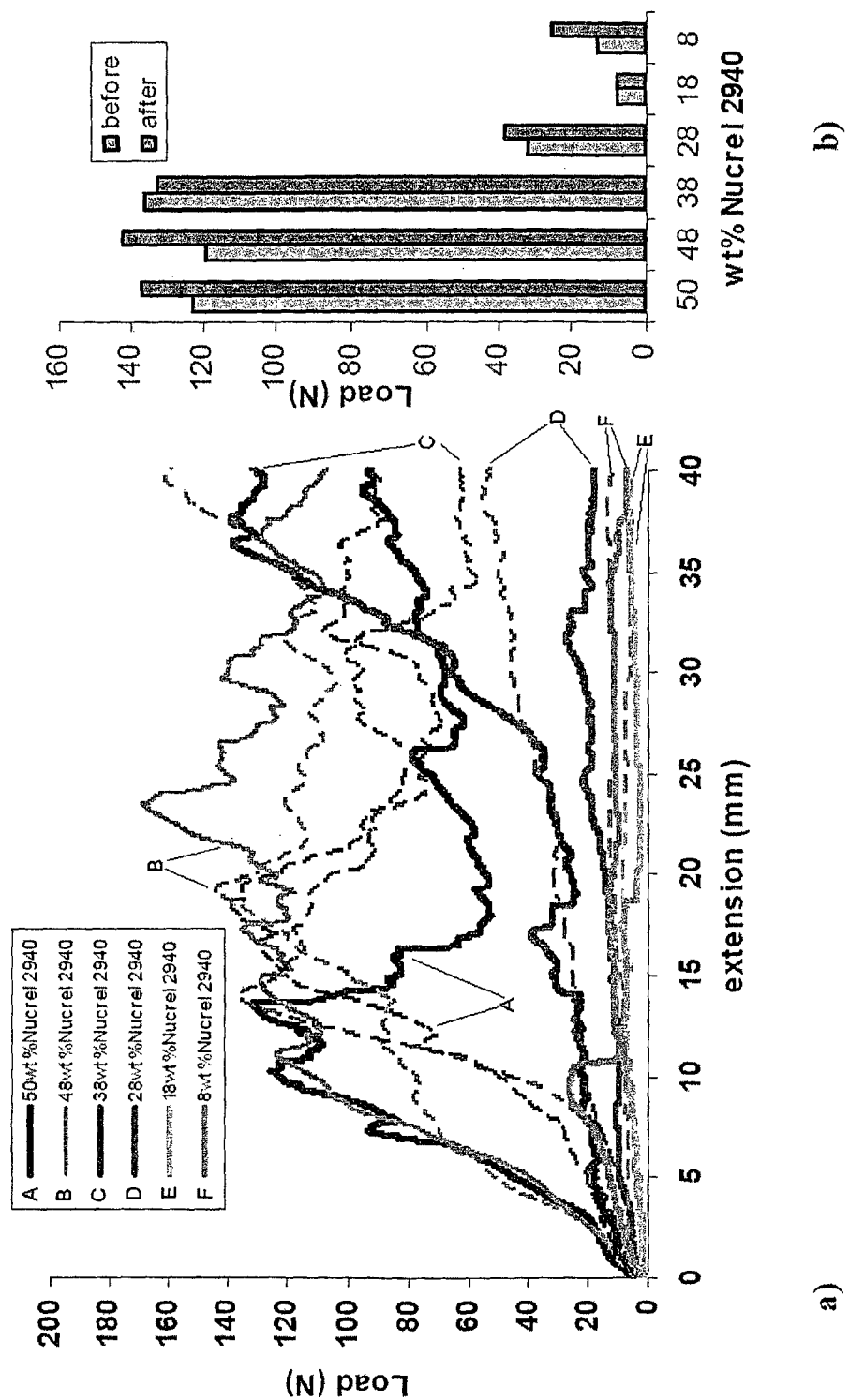
FIG. 32*a* shows the load versus extension data of samples before and after healing for formulations containing varying concentrations of the Nucrel 2940 (healing agent) from 8 wt % to 50 wt %, and 2 wt % of pimelic acid.
FIG. 32*b* shows the peak load data for samples before and after healing for formulations containing varying concentrations of the Nucrel 2940 (healing agent) from 8 wt % to 50 wt %, and 2 wt % of pimelic acid.
Figure 33:
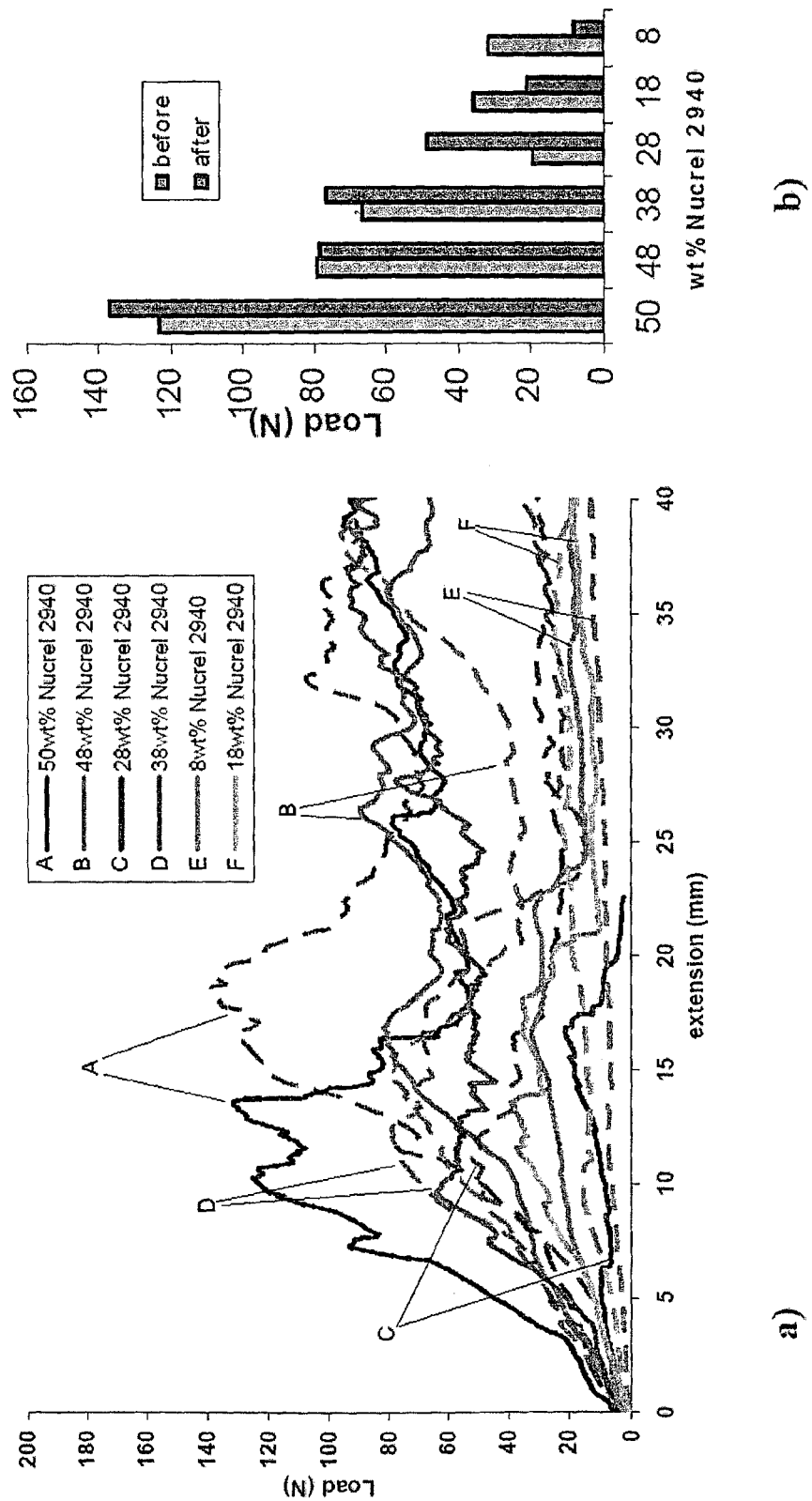
FIG. 33*a* shows the load versus extension data of samples before and after healing for formulations containing varying concentrations of the Nucrel 2940 (healing agent) from 18 wt % to 50 wt %, and 2 wt % of citric acid.
FIG. 33*b* shows the peak load for samples before and after healing for formulations containing varying concentrations of the Nucrel 2940 (healing agent) from 18 wt % to 50 wt %, and 2 wt % of citric acid.

The load versus extension data and peak load data of these formulations were analyzed and shown in FIGS. 31, 32 and 33.

FIG. 32a shows the load versus extension data of formulations comprising 8 wt % to 50 wt % Nucrel 2940. The erratic nature of the data is typical of cohesive failure. When the maximum loads before and after healing are shown, as can be seen in FIG. 32b, the benefits of adding the pimelic acid are more evident. It can be seen that Nucrel 2940 was able to function as an effective healing agent for all samples regardless of its concentration. However, below 28 wt % of Nucrel 2940, the level of adhesion had decreased, which compromised only the static properties and not the "mendability". Similar results were obtained for the citric acid modified system (as can be seen in FIG. 33) with excellent healing efficiency being achieved across the range of Nucrel 2940 concentrations used apart from the lowest concentration of Nucrel 2940.

Figure 36:
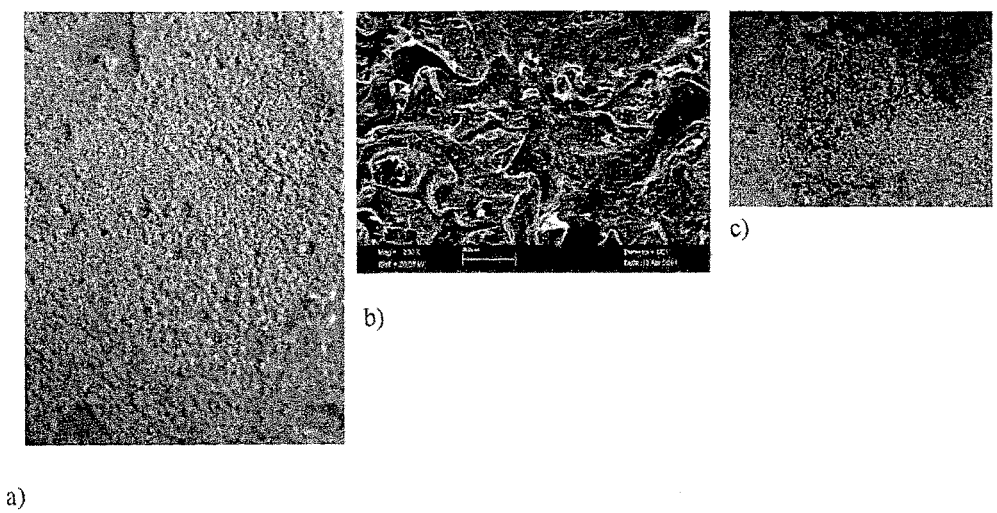
FIG. 36*a* shows an optical image of the primer surface of the 2 wt % citric acid modified adhesive formulation exhibiting the bubbles responsible for the pressure delivery healing mechanism.
FIG. 36*b* shows a SEM image of the 2 wt % citric acid modified adhesive formulation containing 18 wt % of Nucrel 2940 showing evidence for the adhesion of phase separated particles after healing.
FIG. 36*c* shows an optical image of the 2 wt % citric acid modified adhesive formulation containing 18 wt % of Nucrel 2940 illustrating cohesive failure after healing where some adhesive were found adhering to the under side of the topcoat.

FIGS. 34, 35 and 36 show the effect of reducing Nucrel 2940 concentration and changing the modifier from citric acid to pimelic acid using optical or scanning electron microscopy. It can be seen that each primer surface showed extensive evidence of cohesive failure, but also a plethora of bubbles. This was evident at different Nucrel 2940 concentrations for both pimelic acid and citric acid modified samples. The scanning electron microscopic images show the presence of these bubbles, further confirming the "pressure delivery healing" mechanism. Extensive phase separation of the modifier from the continuous adhesive matrix was also observed, which indicates that the Nucrel 2940 has higher mobility because it is present in an undiluted state in the matrix. This means that when thermal energy is applied, it is able to flow into a cavity. After cooling, it can be seen that the phase separated particles were able to adhere to the epoxy primer, as evidenced by thermoplastic tearing observed on the surface. The "pressure delivery healing" mechanism further enhances this mobility by pushing the healing agent into a cavity.

DSC analysis shown in FIG. 37 for the pimelic acid and citric acid modified formulations show little change in the melting point for all of the formulations evaluated. This indicates that the Nucrel 2940 healing agent does not plasticize the polyethylene matrix and is therefore present in a phase separated microstructure. Without being bound by theory, this suggests that the phase separated Nucrel 2940 with enhanced mobility provides the primary driving force for healing during thermal activation.

Figure 38:
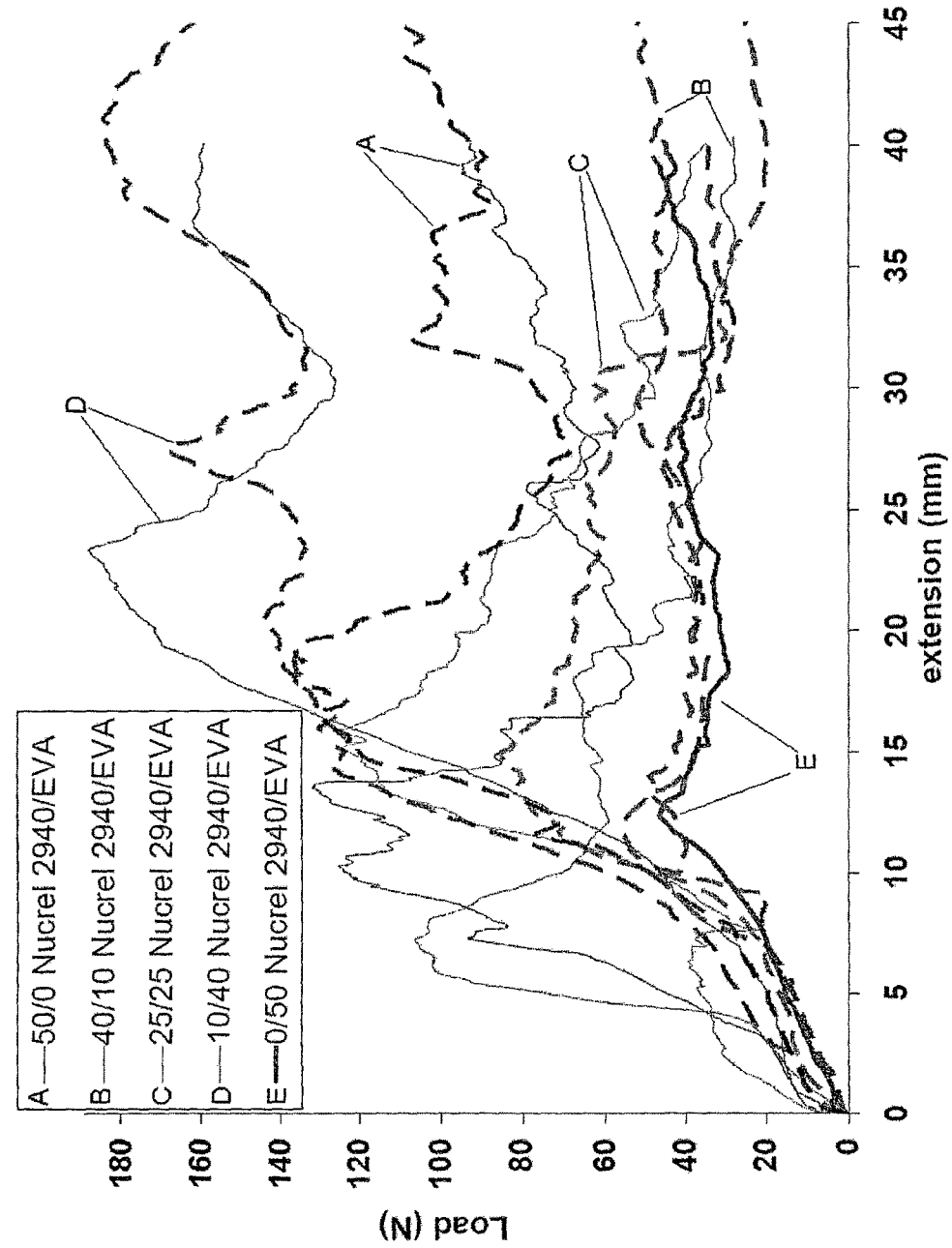
FIG. 38 shows the load versus extension data of the adhesive formulation modified with varying ratios of Nucrel 2940/EVA from 50/10 to 0/50.
Figure 39:
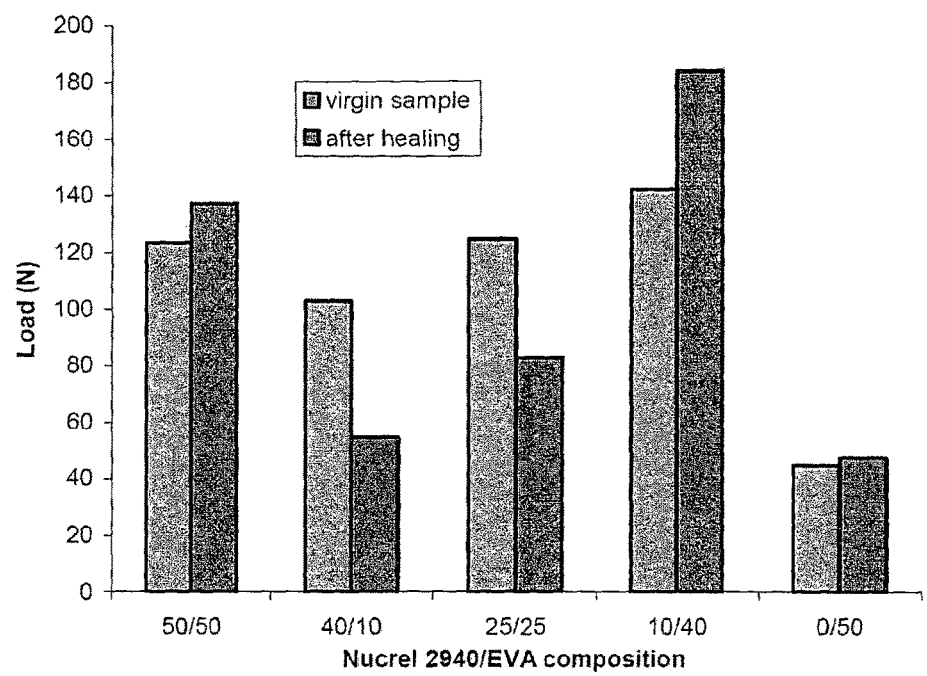
FIG. 39 shows a chart on the peak load data for the adhesive formulation modified with varying ratios of Nucrel 2940/EVA from 50/10 to 0/50.
Figure 40:
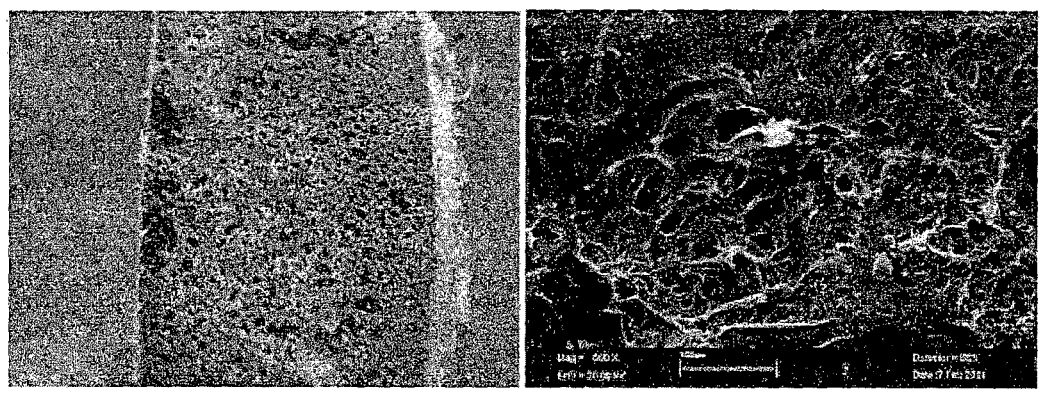
FIG. 40 shows the optical and SEM image of 50:0 EVA:Nucrel 2940 modified adhesive showing the phase separation and bubbles on the polymer surface.

Ethylene vinyl acetate (EVA) was also investigated as a healing agent. In this case, the grafted adhesive was kept at a constant concentration but the ratio of EVA to Nucrel 2940 was systematically varied, from 50/0, 40/10, 25/25, 10/40 to 0/50 of EVA/Nucrel 2940. Data on load versus extension are shown in FIG. 38, while the peak loads before and after healing are shown in FIG. 39. The peak load plots clearly show that EVA is an effective healing agent. Scanning electron images of the failure surface shown in FIG. 40 illustrate the presence of the "pressure delivery healing" mechanism as evidenced by the plethora of bubbles on the surface. This indicates that a number of chemical interactions occurred between the matrix and the EVA which facilitate the healing mechanism.

Applications

Preparation of polyethylene and polypropylene adhesives, which incorporate a self-healing function, have been demonstrated. The self-healing function is capable of being repeated to restore adhesive performance after damage.

The self-healing polymer materials or composite materials thereof have applications for use in self-healing the coatings of pipelines (such as those for transport of oil and gas products), light weight construction structures where durability is required (such as in aerospace and aircraft parts and components), vehicle components, and components for marine use, bridge pipes and energy production (such as wind turbines and blades).

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A polymer composition comprising a first polymer phase and a second polymer phase, wherein:
   a. the first polymer phase comprises a thermoplastic polymer matrix modified with an adhesive functional group or a group which is a precursor of an adhesive functional group, wherein said adhesive functional group or said group which is a precursor of an adhesive functional group comprises a polar functional group; and
   b. the second polymer phase comprises a thermoplastic polymer that is provided in the thermoplastic polymer matrix as a dispersion of discrete portions, that is capable of acting as a self-healing agent and being chemically reactive to form a volatile by-product on healing of the polymer composition, wherein said thermoplastic polymer comprises one or more functional groups selected from the group consisting of amine, acid, hydroxyl, epoxy, ketone, ether, ester, and salts thereof.

2. The polymer composition according to claim 1, wherein the ratio of the thermoplastic polymer of the second polymer phase to the thermoplastic polymer matrix of the first polymer phase is in the range of 4:1 to 1:4, or is 1:1; or
   wherein the thermoplastic polymer matrix of the first polymer phase comprises a non-polar polymer, or a polyolefin; or
   wherein the polyolefin is selected from the group consisting of polyethylene and polypropylene.

3. The polymer composition according to claim 1, wherein the thermoplastic polymer matrix of the first polymer phase comprises:
   a graft copolymer of polyethylene and a monomer selected from the group consisting of maleic anhydride, maleic acid, and mixtures thereof; or
   a graft copolymer of polypropylene and a monomer selected from the group consisting of maleic anhydride, maleic acid, and mixtures thereof.

4. The polymer composition according to claim 1, wherein the thermoplastic polymer matrix of the first polymer phase further comprises a partially neutralized polymer.

5. The polymer composition according to claim 1, wherein the thermoplastic polymer of the second polymer phase comprises an ester, wherein the thermoplastic polymer of the second polymer phase is a functionalized polyolefin or copolymer thereof; or
   wherein the functionalized polyolefin or copolymer thereof is a functionalized polyethylene or copolymer thereof; or
   wherein the functionalized polyethylene or copolymer thereof is polyethylene co-methacrylic acid (EMAA).

6. The polymer composition according to claim 1, wherein the thermoplastic polymer of the second polymer phase is not encapsulated in an encapsulating agent.

7. The polymer composition according to claim 1, further comprising one or more additives, wherein the additive is selected from the group consisting of pimelic acid, citric acid, and mixtures thereof.

8. A coating comprising the polymer composition according to claim 1, wherein the coating comprises a third polymer phase, wherein the third polymer phase comprises a thermoset polymer matrix or one or more polymerizable thermoset agents capable, on curing, of producing the thermoset polymer, wherein optionally the thermoset polymer comprises an epoxy, wherein optionally the thermoset polymer matrix comprises an epoxy based resin, or the one or more polymerizable thermoset agents comprise epoxy resin forming agents, and wherein the epoxy resin forming agents comprise a resin and a hardener.

9. The coating according to claim 8, wherein the thermoplastic polymer of the second polymer phase is provided in the form of one or more layers in between the first polymer phase of the polymer composition and the third polymer phase, wherein optionally each of the one or more layers of the thermoplastic polymer of the second polymer phase has thickness of 150 to 500 µm.

10. The coating according to claim 8, further comprising a fourth polymer phase, wherein the fourth polymer phase comprises a polymer material that is compatible with the first polymer phase of the polymer composition, wherein optionally the fourth polymer phase polymer material is a non-polar polymer material, wherein optionally the fourth polymer phase polymer material is polyolefin, wherein optionally the polyolefin is selected from the group consisting of polyethylene, polypropylene, polybutylene, and mixtures thereof.

11. The coating according to claim 10, wherein the thermoplastic polymer of the second polymer phase of the polymer composition is provided in the form of one or more layers in between the first polymer phase of the polymer composition and the fourth polymer phase, wherein optionally each of the one or more layers of the thermoplastic polymer of the second polymer phase has thickness of 150 to 500 µm.

12. A method for preparing the polymer composition according to claim 1, comprising the steps of:
   a) modifying a thermoplastic polymer with an adhesive functional group or a group which is a precursor of an adhesive functional group, wherein said adhesive functional group or said group which is a precursor of an adhesive functional group comprises a polar functional group, to form the thermoplastic polymer matrix of the first polymer phase; and b) adding to the first polymer phase, a thermoplastic polymer capable of acting as a self-healing agent and being chemically reactive to form a volatile by-product on healing of the polymer composition to form the second polymer phase, wherein said thermoplastic polymer comprises one or more functional groups selected from the group consisting of amine, acid, hydroxyl, epoxy, ketone, ether, ester, and salts thereof.

13. The method according to claim 12, wherein the modification of the thermoplastic polymer in step (a) is conducted at a temperature of at least 140° C., wherein optionally the modification of the thermoplastic polymer in step (a) comprises mixing the thermoplastic polymer with a component providing the adhesive functional group or the group which is a precursor of an adhesive functional group at a speed of at least 160 rpm, wherein optionally the modification of the thermoplastic polymer in step (a) is conducted under solvent-free conditions, wherein the modification of the thermoplastic polymer in step (a) comprises chemically reacting the thermoplastic polymer with the adhesive functional group or the group which is a precursor of an adhesive functional group.

14. The method according to claim 12, wherein prior to step (a), said thermoplastic polymer is mixed with said component providing the adhesive functional group or said group which is a precursor of an adhesive functional group.

15. The method according to claim 12 further comprising step (c) heating said thermoplastic polymer matrix of the first polymer phase and said second polymer phase to form a melt, wherein optionally the method further comprises step (d) cooling said melt to disperse said second polymer phase in said thermoplastic polymer matrix of the first polymer phase.

16. A method of self-healing cracks that form in a coating according to claim 12, comprising the step of applying a stimulus to the coating to cause the thermoplastic polymer of the second polymer phase to at least partially fill said crack, and removing said stimulus to allow the thermoplastic polymer of the second polymer phase to bond the edges of said crack together.

17. The method according to claim 16 wherein the stimulus is selected from the group consisting of heat, pressure, and combinations thereof; or
wherein optionally the heat is applied at a temperature of at least 90° C., or wherein the heat is applied at a temperature that is less than the melting point of the first polymer phase, the third polymer phase, and/or the fourth polymer phase, or wherein optionally the temperature is about 120° C.

18. The polymer composition according to claim 1, wherein said discrete portions are in the form of particles having a diameter that is sufficient to provide a reservoir of said thermoplastic polymer of the second polymer phase for self-healing to occur, wherein said diameter is at least 5 µm.

19. The method according to claim 12, wherein step a) further comprises adding a free radical initiator, wherein the free radical initiator is selected from the group consisting of 1,1-di(tert-butylperoxy)-3,3,5-trimethylcyclohexane (BBTCH), 1,1-di(tert-butylperoxy)cyclohexane (BBCH), dicumyl peroxide (DCP), α,α'-di(tert-butylperoxy)diisopropylbenzene (DIPB), di-tert-butyl peroxide (DBP), 2,5-di(tert-butylperoxy)-2,5-dimethylhexane (DTBH), di(tert-butylperoxy)-2,5-dimethylhexyne (DTBHY), tert-butylhydroperoxide (TBHP), cumyl hydroperoxide (CHP), tert-butyl peroxy benzoate (TBPB), 2-phenylazo-2,4-dimethyl-4-methoxypentanenitrile, dibenzoyl peroxide, lauroyl peroxide, and mixtures thereof; or
wherein step a) further comprises adding a co-agent, wherein the co-agent is selected from the group consisting of stearamide, styrene, methacrylamide and caprolactam.

\* \* \* \* \*